(12) United States Patent
Hunt et al.

(10) Patent No.: US 12,303,875 B2
(45) Date of Patent: May 20, 2025

(54) NOBLE METAL MONOLAYER SHELL COATINGS ON TRANSITION METAL CERAMIC NANOPARTICLE CORES

(71) Applicant: MASSACHUSETTS INSTITUTE OF TECHNOLOGY, Cambridge, MA (US)

(72) Inventors: Sean Thomas Hunt, Houston, TX (US); Yuriy Roman-Leshkov, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/344,544

(22) Filed: Nov. 6, 2016

(65) Prior Publication Data

US 2017/0128917 A1    May 11, 2017

Related U.S. Application Data

(60) Provisional application No. 62/252,401, filed on Nov. 6, 2015.

(51) Int. Cl.
*B01J 27/22* (2006.01)
*B01J 23/46* (2006.01)
(Continued)

(52) U.S. Cl.
CPC ............ *B01J 27/22* (2013.01); *B01J 23/464* (2013.01); *B01J 23/468* (2013.01); *B01J 35/19* (2024.01);
(Continued)

(58) Field of Classification Search
CPC ... B01J 27/04; B01J 27/14; B01J 27/22; B01J 27/24; B01J 23/38; B01J 23/40;
(Continued)

(56) References Cited

U.S. PATENT DOCUMENTS 4,851,206 A * 7/1989 Boudart .................. C01B 21/06
502/200
6,297,185 B1 * 10/2001 Thompson ............. B01J 35/006
502/101

(Continued)

FOREIGN PATENT DOCUMENTS

WO    WO-2011099956 A1 *  8/2011  .............. H01M 4/92

OTHER PUBLICATIONS

Supporting information of Espositio (Low-Cost Hydrogen-Evolution Catalysts Based on Monolayer Platinum on Tungsten Monocarbide Substrates, Angew. Chem. Int. Ed. 2010, 49).*

(Continued)

*Primary Examiner* — Jun Li
(74) *Attorney, Agent, or Firm* — Foley Hoag LLP; Dana M. Gordon; Alexander J. Chatterley

(57) ABSTRACT

Nanoparticles comprising a core including transition metal carbide, nitride, phosphide, sulfide, or boride and a noble metal shell can be made by transforming metal oxide core/noble metal shell materials coated in a ceramic material in a controlled environment. The noble metal shell can be a single monolayer. The self-assembly of metal carbide nanoparticles coated with atomically-thin noble metal monolayers results in a highly active, stable, and tunable catalytic platform.

10 Claims, 91 Drawing Sheets

(51) Int. Cl.
  *B01J 35/00* (2024.01)
  *B01J 35/23* (2024.01)
  *B01J 35/30* (2024.01)
  *B01J 37/02* (2006.01)
  *B01J 37/08* (2006.01)
  *H01M 4/92* (2006.01)
  *H01M 8/10* (2016.01)
  *H01M 12/08* (2006.01)

(52) U.S. Cl.
  CPC ............... *B01J 35/23* (2024.01); *B01J 35/30* (2024.01); *B01J 37/0244* (2013.01); *B01J 37/086* (2013.01); *H01M 4/925* (2013.01); *H01M 2008/1095* (2013.01); *H01M 12/08* (2013.01); *Y02E 60/10* (2013.01)

(58) Field of Classification Search
  CPC ... B01J 23/42; B01J 23/44; B01J 23/46; B01J 23/462; B01J 23/464; B01J 23/468; B01J 23/48; B01J 23/50; B01J 23/52
  See application file for complete search history.

(56) References Cited

U.S. PATENT DOCUMENTS

| | | | | |
|---|---|---|---|---|
| 8,227,372 | B2 * | 7/2012 | Lopez | B22F 1/0018 29/890 |
| 9,138,727 | B2 * | 9/2015 | Greenlee | H01M 4/9041 |
| 9,636,664 | B1 * | 5/2017 | Habas | B01J 27/19 |
| 9,837,668 | B2 * | 12/2017 | Cerri | H01M 4/8657 |
| 2006/0135359 | A1 * | 6/2006 | Adzic | H01M 4/8657 502/326 |
| 2010/0197490 | A1 * | 8/2010 | Adzic | H01M 4/8657 502/326 |
| 2010/0213131 | A1 * | 8/2010 | Linford | B01J 13/02 210/656 |
| 2012/0021331 | A1 * | 1/2012 | Zhu | C04B 35/52 977/773 |
| 2013/0011771 | A1 * | 1/2013 | Merzougui | H01M 4/925 429/532 |
| 2013/0045865 | A1 * | 2/2013 | Thompson | B01J 37/08 502/177 |
| 2013/0281285 | A1 * | 10/2013 | Kotaro | C01B 21/062 502/200 |
| 2014/0106260 | A1 * | 4/2014 | Cargnello | B01J 21/066 502/262 |
| 2015/0105241 | A1 | 4/2015 | Roman-Leshkov et al. | |
| 2015/0147682 | A1 | 5/2015 | Kuttiyiel et al. | |
| 2018/0282885 | A1 * | 10/2018 | Dismukes | C25B 11/075 |
| 2020/0347502 | A1 * | 11/2020 | Dismukes | C25B 9/19 |

OTHER PUBLICATIONS

Nie et al (Nanocrystalline tungsten carbide supported Au—Pd electrocatalyst for oxygen reduction, Journal of Power Sources, 167 (2007) 69-73).*

Michalskyl et al. (Trends in the Hydrogen Evolution Activity of Metal Carbide Catalysts, ACS Catal. 2014, 4, 5, 1274-1278), pulication date Mar. 12, 2014.*

International Search Report dated Jan. 12, 2017, issued in International Application No. PCT/US2016/060755.

Written Opinion of the International Searching Authority dated Jan. 12, 2017, issued in International Application No. PCT/US2016/060755.

Notification of Transmittal of The International Search Report and The Written Opinion of the International Searching Authority, or The Declaration dated Jan. 12, 2017, issued in International Application No. PCT/US2016/060755.

Esposito et al., "Low-Cost Hydrogen-Evolution Catalysts Based on Monolayer Platinum on Tungsten Monocarbide Substrates" Angew. Chem. Int. Ed., vol. 49, No. 51, p. 9859-9862 (2010) p. 9859, 9861.

* cited by examiner

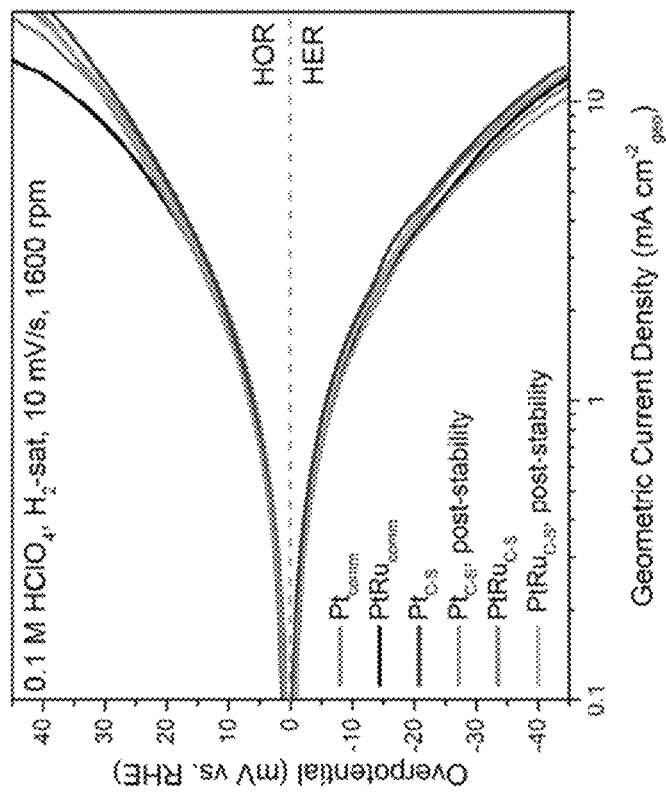
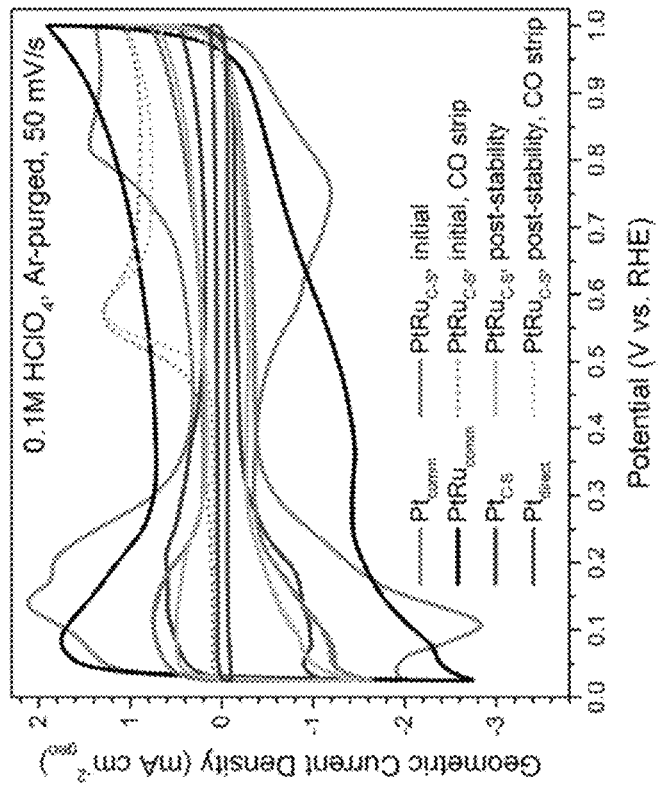
FIG. 9B
FIG. 9A

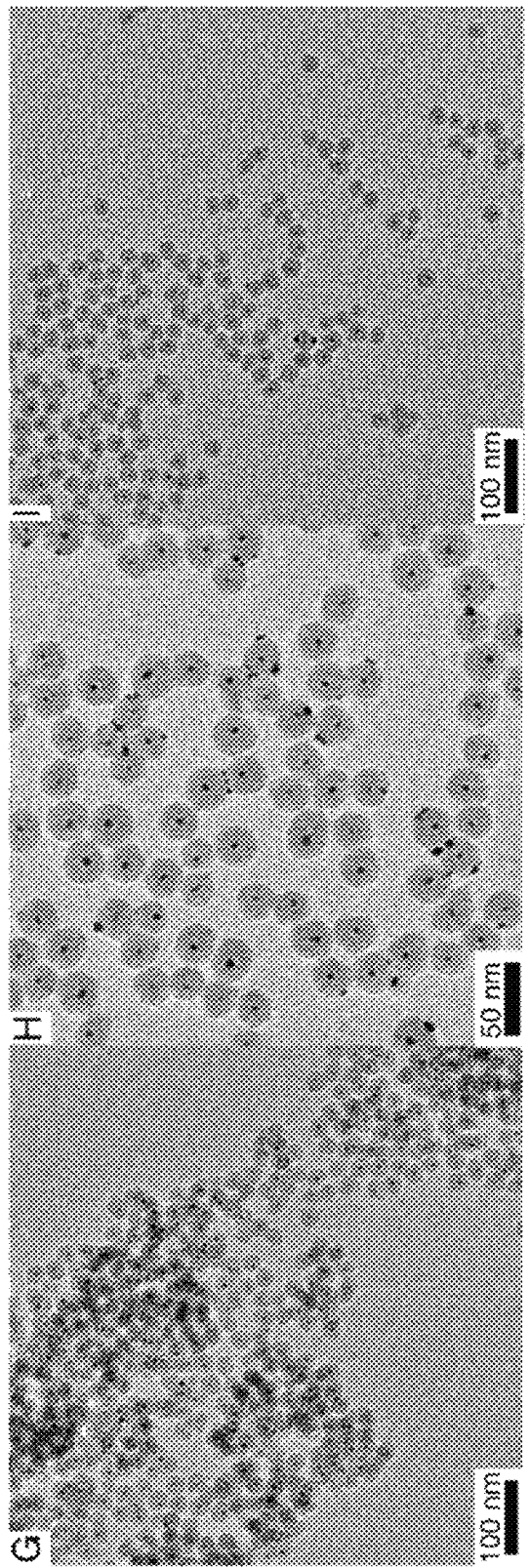

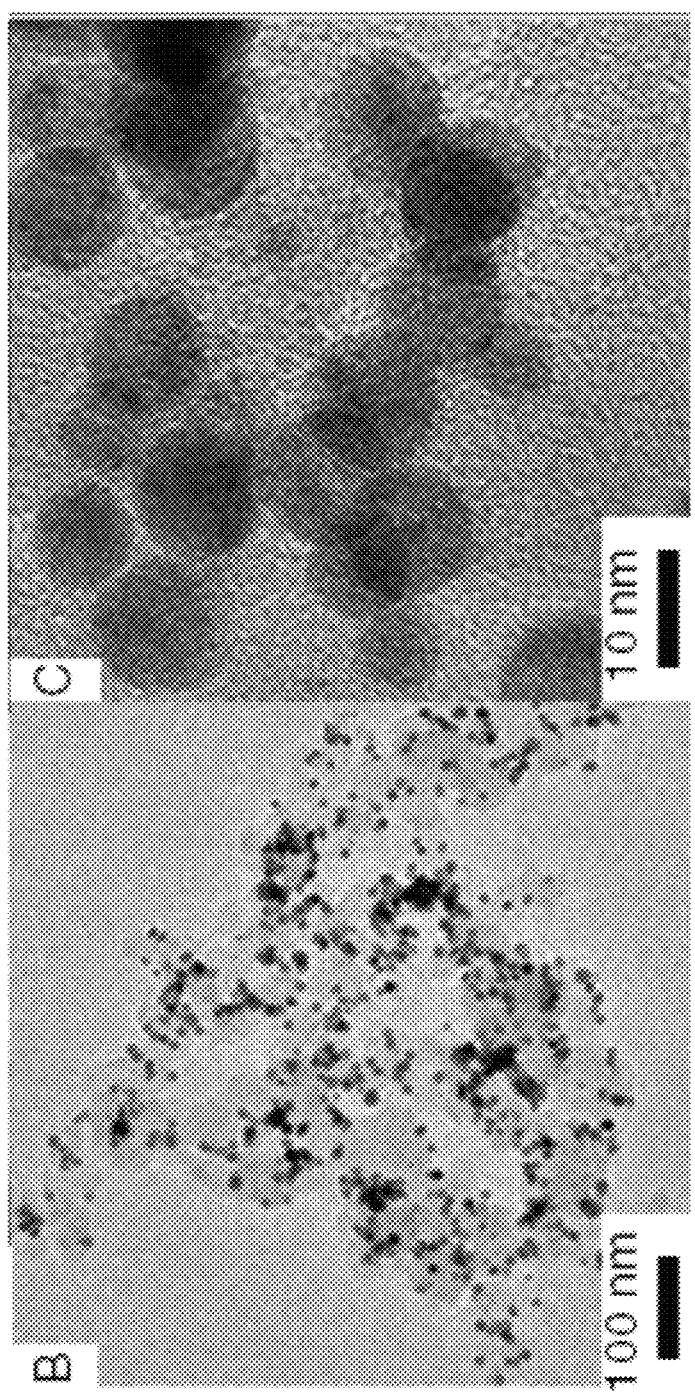

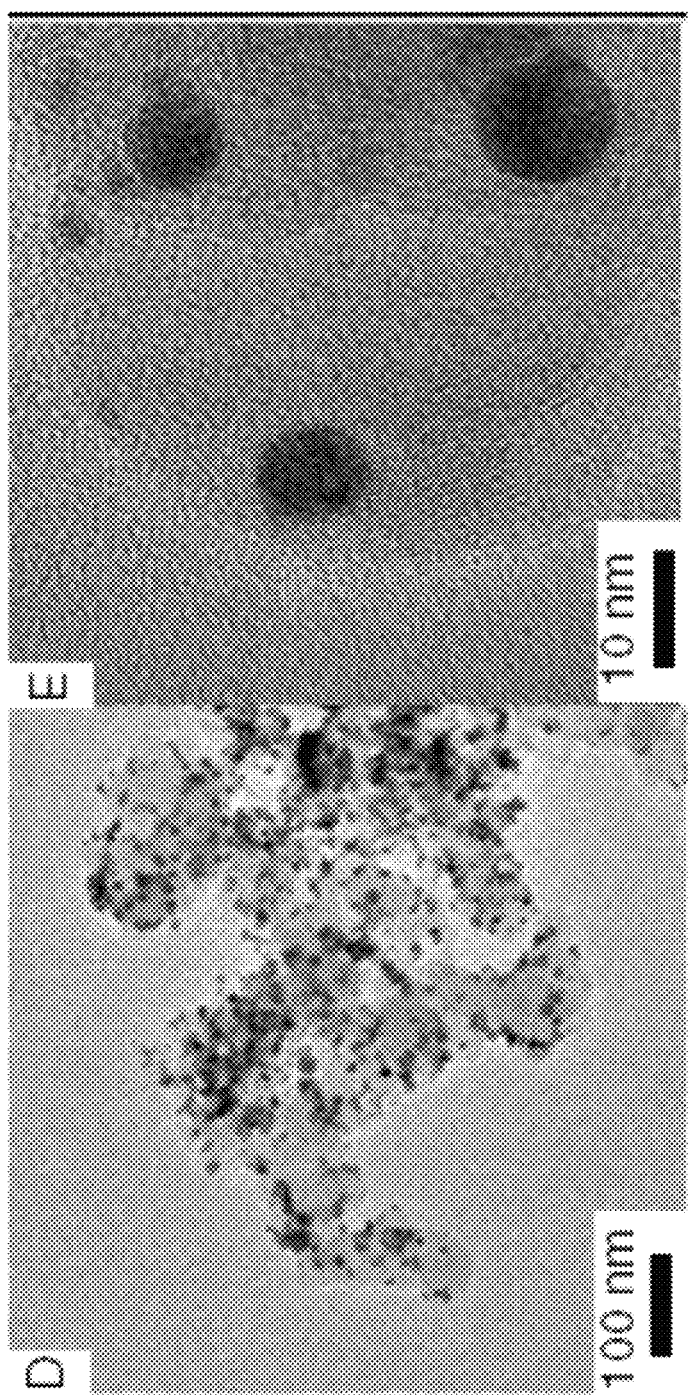

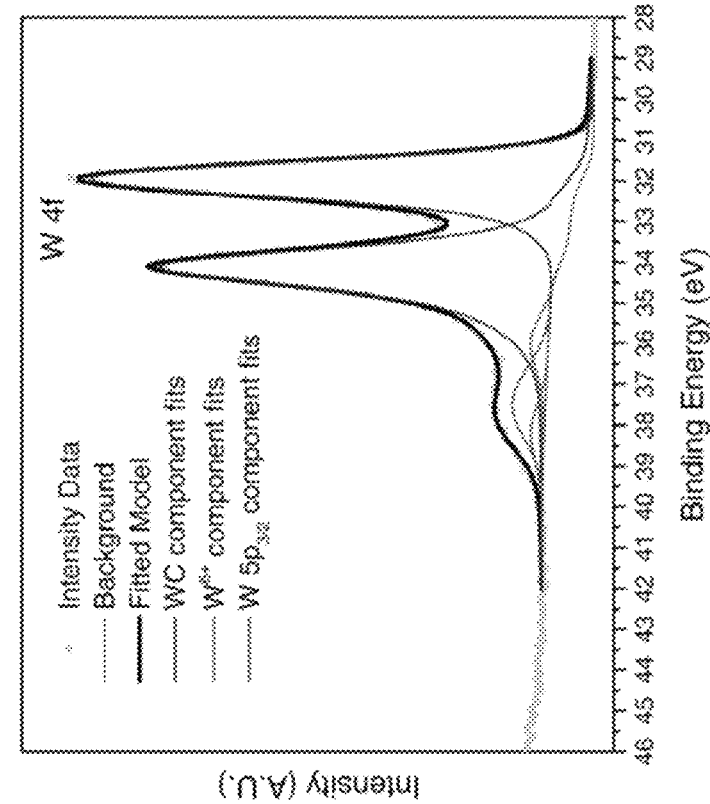
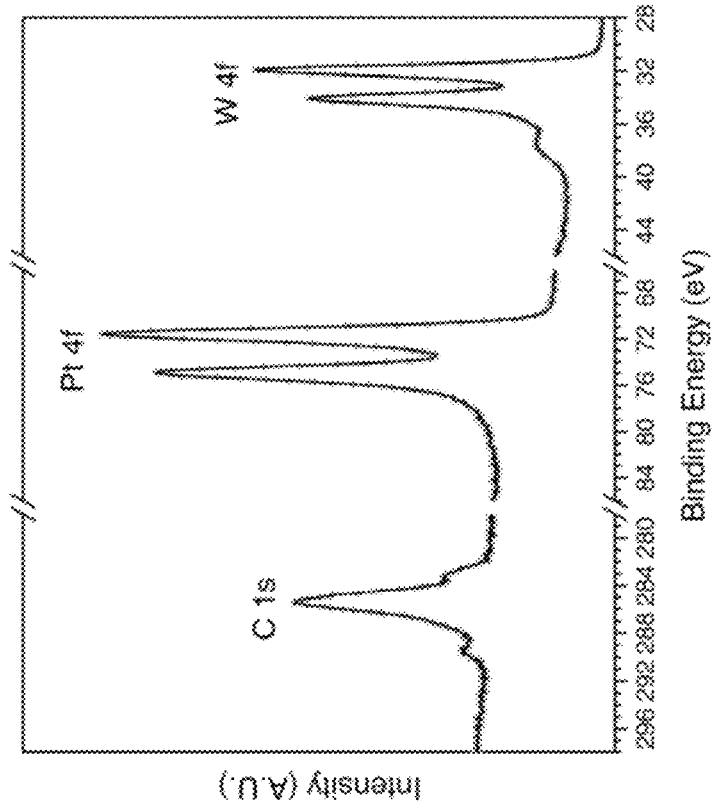
FIG. 19B
FIG. 19A

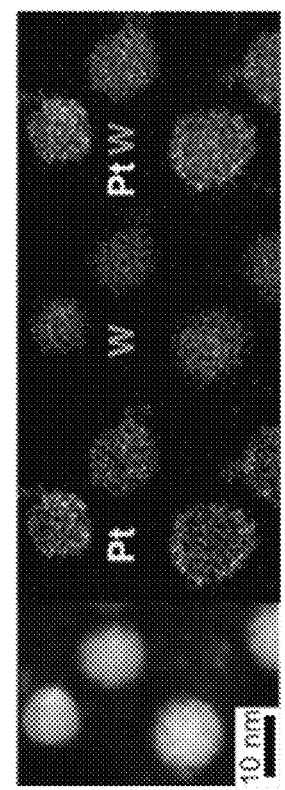
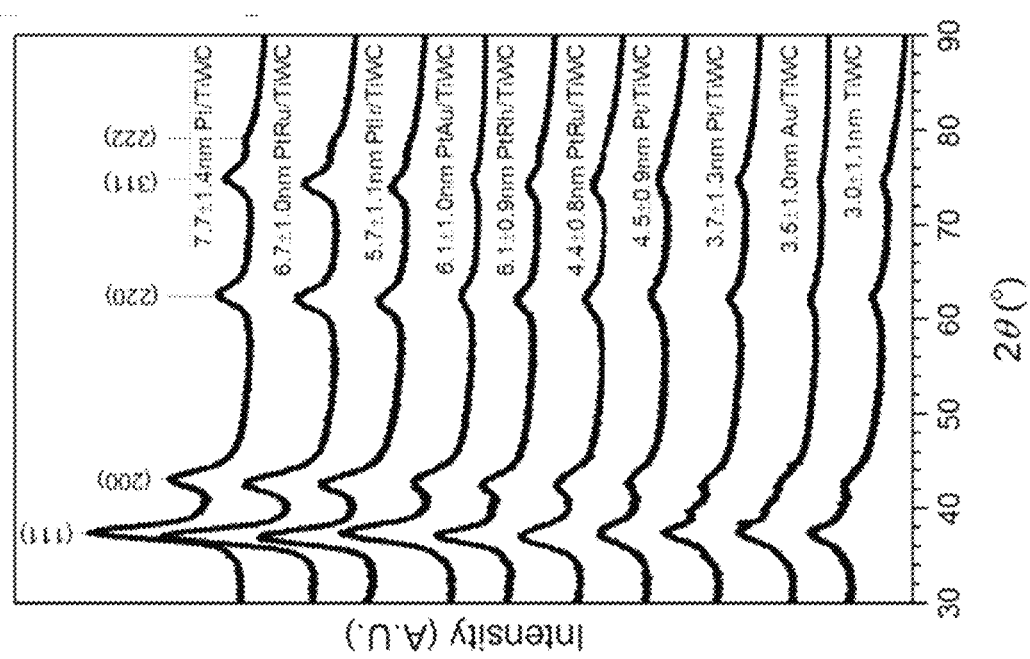
FIG. 42B
FIG. 42A

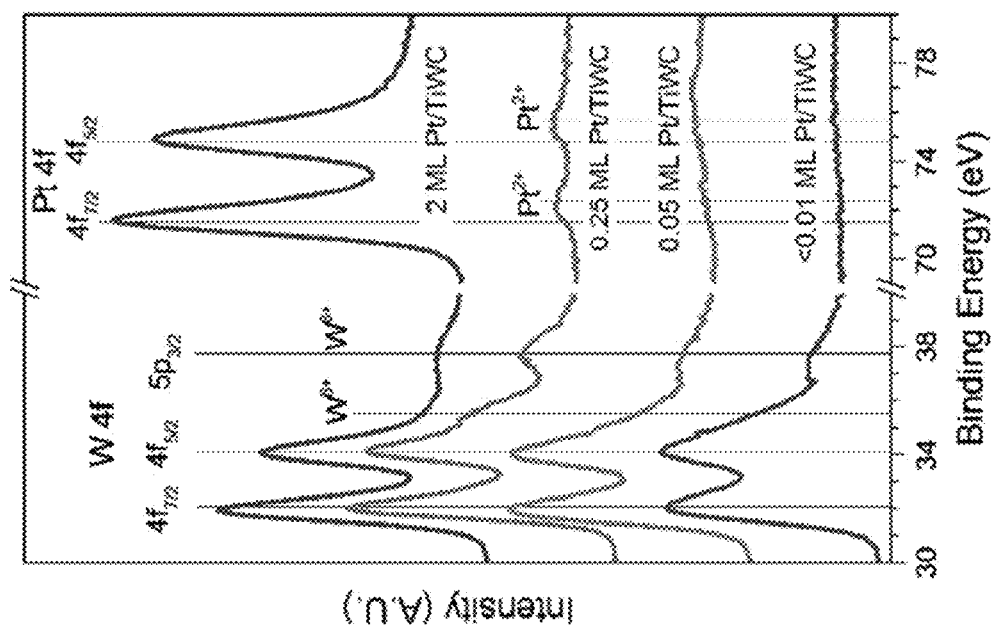
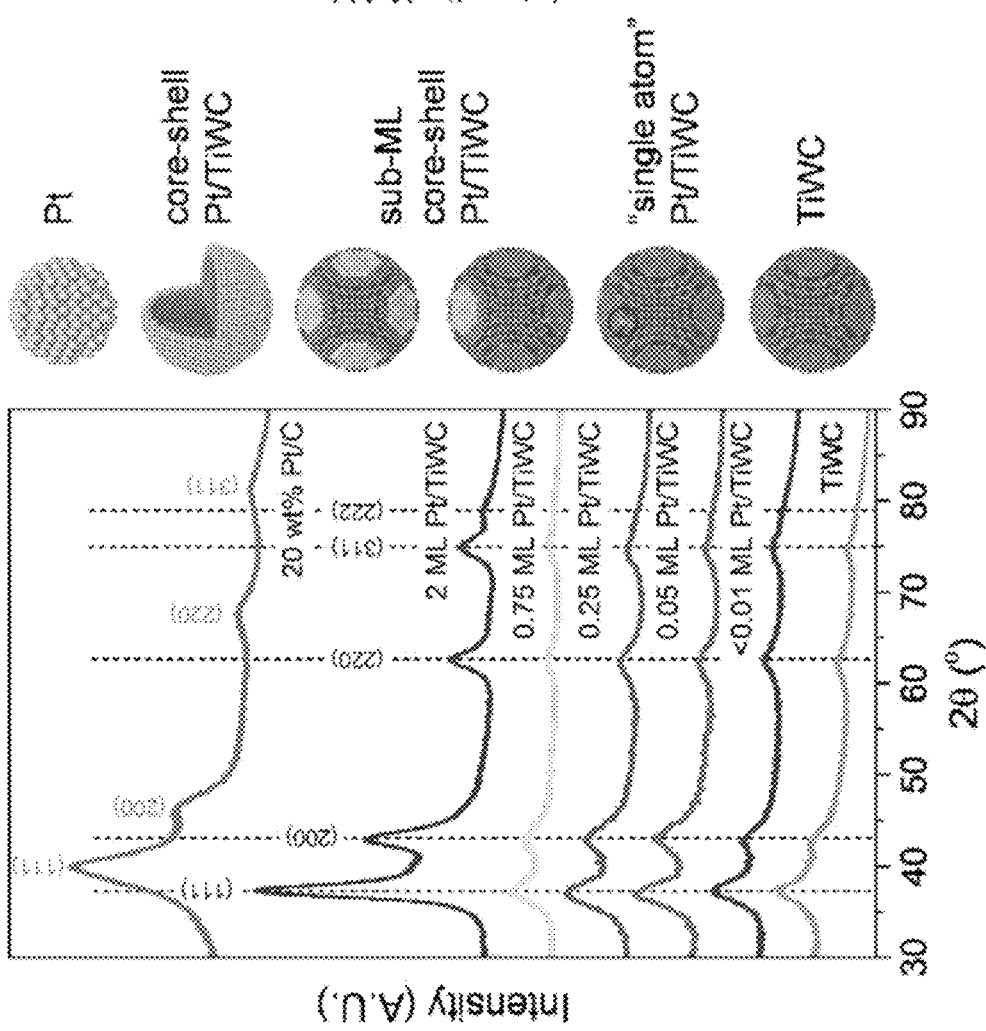
FIG. 44B
FIG. 44A

NOBLE METAL MONOLAYER SHELL COATINGS ON TRANSITION METAL CERAMIC NANOPARTICLE CORES

PRIORITY CLAIM

This application claims priority to U.S. Provisional Application No. 62/252,401, filed Nov. 6, 2015, which is incorporated by reference in its entirety.

STATEMENT REGARDING FEDERALLY SPONSORED RESEARCH OR DEVELOPMENT

This invention was made with government support under Grant No. DE-FG02-12ER16352 and DE-SC0014058, awarded by the Department of Energy, Office of Basic Energy Sciences, Grant No. ACI-1053575, awarded by the National Science Foundation. The government has certain rights in this invention.

TECHNICAL FIELD

The present invention relates to a method of synthesizing nanoparticles.

BACKGROUND

Consisting of ruthenium (Ru), rhodium (Rh), palladium (Pd), silver (Ag), rhenium (Re), osmium (Os), iridium (Ir), platinum (Pt), and gold (Au), the noble metals (NMs) are critical materials. Noble metals (NMs) are expensive and scarce resources that are central to many existing and emerging energy technologies, such as catalytic converters, reforming, fuel cells, metal-air batteries, and water electrolyzers. To enable the global-scale development of inexpensive and sustainable renewable energy technologies, NM catalysts must be improved significantly in three areas: cost, activity, and durability. The high catalytic activity, chemical inertness, and corrosion resistance of NMs makes them indispensable for almost all proposed renewable energy platforms and across various industries. However, the scarcity, high demand, and high cost of NMs make them infeasible for use on a global scale. Importantly, each of these three unique NM properties is a surface property, meaning that materials only need to have NMs present on the surface to acquire NM properties.

SUMMARY

A composition can include a plurality of nanoparticles, each nanoparticle, independently, including a core comprising a transition metal ceramic and a shell comprising a noble metal.

In certain embodiments, the transition metal ceramics can include a transition metal carbide, transition metal nitride, transition metal boride, transition metal sulfide or transition metal phosphide. In certain embodiments, the shell can be a monolayer.

In certain embodiments, the transition metal ceramics can have a composition of formula (I)

$$M1_x M2_y M3_z X1_{w1} X2_{w2} \qquad (I)$$

where each of M1, M2 and M3, independently, is a transition metal element from the group consisting of group 3, group 4, group 5, group 6, 3d block, and f block, and each of X1 and X2, independently, is selected from the group consisting of O, C, N, S, B, and P, at least one of X1 and X2 being C, N, S, B, or P, wherein each of x, y, w1, w2, and z is a number between 0 and 3, where at least one of x, y, z, w1 and w2 is not zero and the combination of x, y, z, w1 and w2 completes the valence requirements of the formula.

In certain embodiments, M1 is tungsten, X1 is carbon, x is 1, w1 is 1, and y=z=w1=w2=0.

In certain embodiments, the transition metal element can include Sc, Y, La, Ce, Nd, Sm, Ti, Zr, Hf, V, Nb, Ta, Cr, Mo, W, Mn, Fe, Co, Ni, Cu, or Zn. The shell can include Au, Pt, Pd, Ru, Rh, Ir, Os, Ag, or any combinations thereof.

In certain embodiments, the size of the nanoparticle can be no more than 10 nm, or no more than 5 nm.

A method of producing a plurality of nanoparticles can include encapsulating nanoparticles comprising a metal oxide or metal core and a noble metal shell within an inorganic matrix, calcining the encapsulated nanoparticles in an oxidizing atmosphere or vacuum, heating the nanoparticles in the presence of a reducing agent, and converting the metal oxide core to metal ceramics including C, N, S, B, or P. In certain embodiments, the method can further include removing the inorganic matrix.

In certain embodiments, converting the nanoparticles can include carburizing the nanoparticles in a methane atmosphere.

In certain embodiments, the inorganic matrix can include silicon oxide, aluminum oxide, germanium oxide, zirconium oxide, cerium oxide, hafnium oxide, gallium oxide or titanium oxide.

The nanoparticle can include a tungsten carbide nanoparticle, a molybdenum carbide nanoparticle, or heterometallic carbide nanoparticle. In certain embodiments, the heterometallic carbide nanoparticle can include a molybdenum tungsten carbide. In certain embodiments the heterometallic carbide nanoparticle can include a titanium tungsten carbide.

In certain embodiments, converting the nanoparticles can include nitridizing, phosphidizing, sulfidizing, or boridizing the nanoparticles.

In certain embodiments, plurality of the nanoparticles can be dispersed on a support. The support can be carbon black, graphene, carbon nanotubes, high-surface area carbide, a metal oxide including silica, alumina, titania, zirconia, ceria, or zeolites.

Other aspects, embodiments, and features will be apparent from the following description, the drawings, and the claims.

BRIEF DESCRIPTION OF THE DRAWINGS

FIG. 1B panel (v) shows STEM image, EDX map, and linescan (Pt signal in green, W signal in red) of a resulting core-shell Pt/WC nanoparticle and a STEM image of Pt/WC formulated on a carbon black support after silica removal.

FIGS. 8A-8B are STEM images and EDS maps of carbon-supported 26% Pt/74% $Cu_{0.2}W_{0.8}C_{0.5}$ NPs (FIG. 8A) and 27% PtRu (2:1)/73% $Ti_{0.1}W_{0.9}C$ (denoted as $PtRu_{C-S}$) (FIG. 8B). FIG. 8C shows PXRD diffractograms of silica-encapsulated NM/TMC NPs of various sizes, compositions, and NM ML coverages. FIG. 8D shows XPS spectra of NM/TMC nanoaggregates showing sub-ML, ML, and multilayer coverages of (a-c) Au, (d-f) Pt, and (g, h) mixed Pt:Au shells self-assembled onto the surface of TiWC NPs. FIG. 8E shows PXRDs of $Pt_{C-S}$ and $Pt_{direct}$ compared to $Pt_{comm}$. FIG. 8F shows XPS comparison of the C 1s, Pt 4f, and W 4f signals of $Pt_{C-S}$ and $Pt_{direct}$. FIG. 8G shows TEM and HR-TEM images of $Pt_{C-S}$, $PtRu_{C-S}$, and $Pt_{direct}$. $Pt_{C-S}$ consists of 28% Pt/72% $Ti_{0.1}W_{0.9}C$ NPs dispersed on carbon black at 28 wt % prepared by silica encapsulation and removal.

FIGS. 9A-9G show electrochemical activity and stability of $Pt_{C-S}$ and $PtRu_{C-S}$ compared to commercial catalysts. FIG. 9A shows CVs showing different $H_{upd}$ and $OH_{ad}$ surface coverages. For $PtRu_{C-S}$, CO-stripping voltammograms are shown before and after stability cycling and regeneration. FIG. 9B shows HOR/HER Tafel plots. FIG. 9C shows HOR LSVs with and without CO contamination. FIG. 9D shows MOR CVs at 50 mV/s normalized by CO-ECSA. The inset displays LSVs at 10 mV/s. FIGS. 9E and 9F Steady-state specific activity and mass activity at fixed potentials after stability cycling and regeneration in alkaline media. FIG. 9G shows TEM images of $Pt_{C-S}$ and $PtRu_{C-S}$ and a STEM image with EDX map of a $Pt_{C-S}$ nanoparticle after stability cycling.

FIG. 11A shows EDX map of $SiO_2/Pt/WO_x$ heat-treated to 200° C. in a 15% $CH_4/H_2$ atmosphere corresponding to FIG. 1B(ii). FIG. 11B shows EDX map of $SiO_2/Pt_xW_y$ heat-treated to 600° C. in a 15% $CH_4/H_2$ atmosphere corresponding to FIG. 1B(iii).

FIG. 13A shows a representative TEM image of a NM/TMC nanoaggregate dispersed in ethanol obtained by dissolving the silica shell without adding either a catalyst support or a surfactant capping agent. FIG. 13B shows a representative TEM image of NM/TMC NPs dispersed in ethanol using oleylamine as a capping agent after removal of the silica template.

FIGS. 15A-15I show TEM analysis of NPs with varying shell composition encapsulated in silica.

FIGS. 18A-18F show microscopic analysis of NPs with varying core compositions. FIG. 18A shows STEM-EDX maps of 26% $Pt/(Cu_{0.2}W_{0.8})_2C$ from FIG. 8A. FIGS. 18B and 18C show the corresponding TEM images of the material supported on carbon black. FIGS. 18D and 18E show TEM images of 23% $Pt/(Co_{0.2}W_{0.8})_2C$ supported on carbon black. FIG. 18F shows STEM-EDX maps of 16% $Pt/(Ni_{0.3}W_{0.7})_2C$ supported on carbon black. The PXRD patterns of these materials are shown in FIG. 8C.

FIGS. 19A-19D show XPS analysis of $Pt_{C-S}$. FIG. 19A shows raw XPS intensity data obtained for 28% Pt/72% $Ti_{0.1}W_{0.9}C$ core-shell NP nanoaggregates ($Pt_{C-S}$ formulated as a nanoaggregate in ethanol without carbon black support added during silica removal to obtain clear C 1s spectrum). FIG. 19B shows XPS peak deconvolution of the W 4f spectrum. FIG. 19C shows XPS peak deconvolution of the C 1s spectrum. FIG. 19D shows XPS peak deconvolution of the Pt 4f spectrum.

FIG. 20A shows raw XPS intensity data obtained for 27% $Pt_{0.67}Ru_{0.33}$/73% $Ti_{0.1}W_{0.9}C$ core-shell NP nanoaggregates ($PtRu_{C-S}$ formulated as a nanoaggregate in ethanol without carbon black support added during silica removal to obtain clear C 1s spectrum). FIG. 20B shows XPS peak deconvolution of the W 4f spectrum. FIG. 20C shows XPS peak deconvolution of the C 1s and Ru 3d spectrum. FIG. 20D shows XPS peak deconvolution of the Pt 4f spectrum.

FIG. 21A shows raw XPS intensity data obtained for 26% $Pt_{0.6}Rh_{0.4}$/74% $Ti_{0.1}W_{0.9}C$ core-shell NP nanoaggregates. FIG. 21B shows XPS peak deconvolution of the W 4f spectrum. FIG. 21C shows XPS peak deconvolution of the Rh 3d spectrum. FIG. 21D shows XPS peak deconvolution of the Pt 4f spectrum.

FIG. 22A shows raw XPS intensity data obtained for 25% $Pt_{0.8}Ir_{0.2}$/75% $Ti_{0.2}W_{0.8}C$ core-shell NP nanoaggregates. FIG. 22B shows XPS peak deconvolution of the W 4f spectrum. FIG. 22C shows XPS peak deconvolution of the Ir 4f spectrum. FIG. 22D shows XPS peak deconvolution of the Pt 4f spectrum.

FIG. 23A shows raw XPS intensity data obtained for 13% $Au/Ti_{0.1}W_{0.9}C$ core-shell NP nanoaggregates. FIG. 23B shows XPS peak deconvolution of the W 4f spectrum. FIG. 23C shows XPS peak deconvolution of the Ti 2p spectrum. FIG. 23D shows XPS peak deconvolution of the Au 4f spectrum.

FIG. 24A shows raw XPS intensity data obtained for 26% $Pt/(Cu_{0.2}W_{0.8})_2C$ core-shell NP nanoaggregates. FIG. 24B shows XPS peak deconvolution of the W 4f spectrum. FIG. 24C shows XPS peak deconvolution of the Cu 2p spectrum. FIG. 24D shows XPS peak deconvolution of the Pt 4f spectrum.

FIG. 40A shows PtRu$_{C-S}$ compared to PtRu$_{comm}$ on a specific activity basis (FIG. 9E). FIG. 40B shows PtRu$_{C-S}$ compared to PtRu$_{comm}$ on a mass activity basis. FIG. 40C shows Pt$_{C-S}$ compared to Pt$_{comm}$ on a specific activity basis. FIG. 40D shows Pt$_{C-S}$ compared to Pt$_{comm}$ on a mass activity basis.

FIGS. 42A-42D show experimental exploration of various core-shell NM/TMC architectures. FIG. 42A shows PXRD diffractograms of NM/TiWC nanoparticles of various sizes, compositions, and NM coverages. FIG. 42B shows STEM image and EDX maps of carbon-supported Pt/(CuW)$_2$C nanoparticles. FIG. 42C shows PXRD diffractograms of Pt monolayers on various bimetallic semicarbide core nanoparticles. FIG. 42D shows XPS spectra of (a-c) Au/TiWC nanoparticles, (d-f) Pt/TiWC nanoparticles, and (g,h) PtAu/TiWC nanoparticles with sub-monolayer, monolayer, and multilayer NM shell thicknesses.

FIG. 43F shows scanning electron micrograph (SEM) of 2 ML Pt/TiWC.

FIGS. 44A-44B show x-ray diffraction patterns of supported catalysts and representative XPS spectra of nanodispersions after silica dissolution for W and Pt signals.

DETAILED DESCRIPTION

Figure 1A:
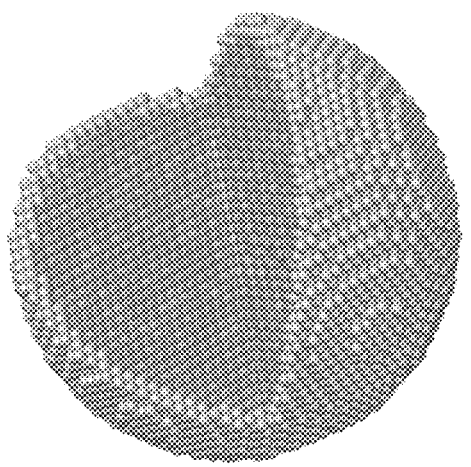
FIG. 1A is a schematic diagram (drawn to scale) of a 5 nm Pt NP in comparison to a 5 nm ML Pt/bimetallic TMC NP cutaway.
Figure 1A:
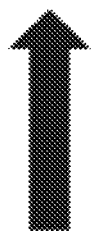
Figure 1A:
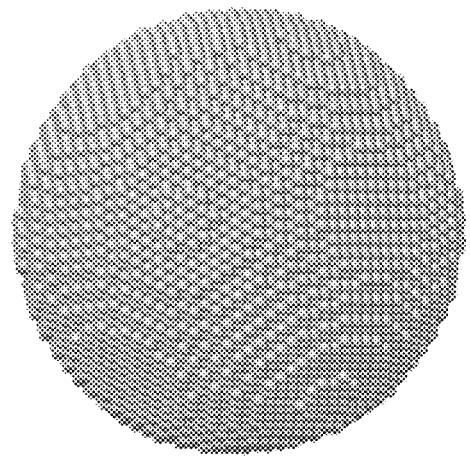

The noble metals (NMs) are nature's universal catalysts. By neither binding reactants too strongly nor too weakly, they are able to efficiently insert or remove electron density from reactants with high turnover numbers. As such, they have been shown to be the best catalysts in almost all industrially-relevant catalytic processes. Beyond catalysis, their chemical inertness and corrosion resistance is now being widely investigated in high resolution sensors and for biomedical applications involving nanoscale drug delivery mechanisms. See Marie-Christine Daniel, D. A. Gold Nanoparticles: Assembly, Supramolecular Chemistry, Quantum-Size-Related Properties, and Applications toward Biology, Catalysis, and Nanotechnology. *Chem. Rev.* 2004, 104, 293-346, which is incorporated by reference in its entirety. However, the high cost and global scarcity of NMs makes them prohibitively expensive and infeasible for use in global-scale industrial applications. See Gordon, R. B.; Bertram, M.; Graedel, T. E. Metal Stocks and Sustainability. *Proc. Natl. Acad. Sci. U.S.A.* 2006, 103, 1209-1214, which is incorporated by reference in its entirety.

In all of these applications, the NMs are formulated as high surface area nanomaterials. See Bell, A. T. The Impact of Nanoscience on Heterogeneous Catalysis. *Science* 2003, 299, 1688-1691, which is incorporated by reference in its entirety. However, the NM functionality persists only at the exposed surface, meaning that the majority of the NM atoms in the bulk are underutilized. For nanoparticles greater than 6 nm, more than 90% of all loaded NM is sub-surface. Therefore, 90% of loaded noble metals do not actively participate in catalytic reactions. Core-shell nanoparticles (NPs) with single monolayer (ML) shells of noble metals offer the opportunity to achieve the minimum required NM loadings across a broad spectrum of technologies. A cutaway schematic diagram of a 5 nm ML core-shell nanoparticle (drawn to scale) is shown in FIG. 1.

Disclosed herein is a new class of materials consisting of atomically thin NM overlayer coatings self-assembled on the surface of inexpensive and earth-abundant early transition metal ceramic (TMX) nanoparticles (NPs). These material can be prepared by the self-assembly of transition metal carbide nanoparticles coated with atomically-thin noble metal monolayers during the carburization of noble metal salt and transition metal oxide mixtures encapsulated in removable silica templates. This approach allows control over the final core-shell architecture, including particle size, monolayer coverage, and heterometallic composition. For examples, carbon-supported $Ti_{0.1}W_{0.9}C$ nanoparticles coated with Pt or bimetallic PtRu monolayers were found to exhibit enhanced resistance to sintering and CO poisoning, achieving an order of magnitude increase in specific activity over commercial catalysts for methanol electrooxidation after 10,000 cycles. These core-shell materials provide a new direction to reduce the loading, enhance the activity, and increase the stability of noble metal catalysts. This monolayer (ML) core-shell configuration enables every NM atom to participate in catalytic surface reactions, achieving the lowest possible limit for NM-utilization in a high surface area heterogeneous catalyst. The scalable and solution-processable method used to generate these NM/TMX core-shell NPs is amenable to the production of multimetallic early TMX cores of tunable sizes with multimetallic NM shells of tunable thicknesses. Such ultra-low loading NM/TMX materials can achieve the required energy:cost ratio for use in PEM fuel cells, direct methanol and higher oxygenate fuel cells, electrolyzers, hybrid supercapacitors, and Li-Air batteries on a global scale.

Core-shell nanoparticles comprised of atomically-thin NM monolayers (MLs) dispersed over a non-precious core have the potential to address these challenges if several rigorous requirements are met. First, the core should consist of earth-abundant, corrosion-resistant, and electrically conductive materials. Second, to prevent sintering, leaching, and undesirable sub-surface NM atom diffusion under reaction conditions, the core must exhibit a high melting point, bind strongly to the NM shell, but remain insoluble in the NM lattice. Finally, to tune the electronic (and thus catalytic properties) of the nanoparticle, the size and composition of both the core and the shell should be easily controlled. While a broad array of tunable core-shell nanoparticle architectures with enhanced properties have been synthesize (see, for example, L. Zhang et al., *Science* 349, 412-416 (2015), X. Huang et al., *Science* 348, 1230-1234 (2015), C. Chen et al., *Science* 343, 1339-1343 (2014), S. Zhang et al., *J. Am. Chem. Soc.* 136, 15921-15924 (2014), K. Sasaki et al., *Electrochim. Acta* 48, 3841-3849 (2003), and J. Zhang et al., *J. Phys. Chem. B* 109, 22701-22704 (2005), each of which is incorporated by reference in its entirety), development of a single core-shell platform that meets all of these design criteria remains a significant challenge.

Figure 2:
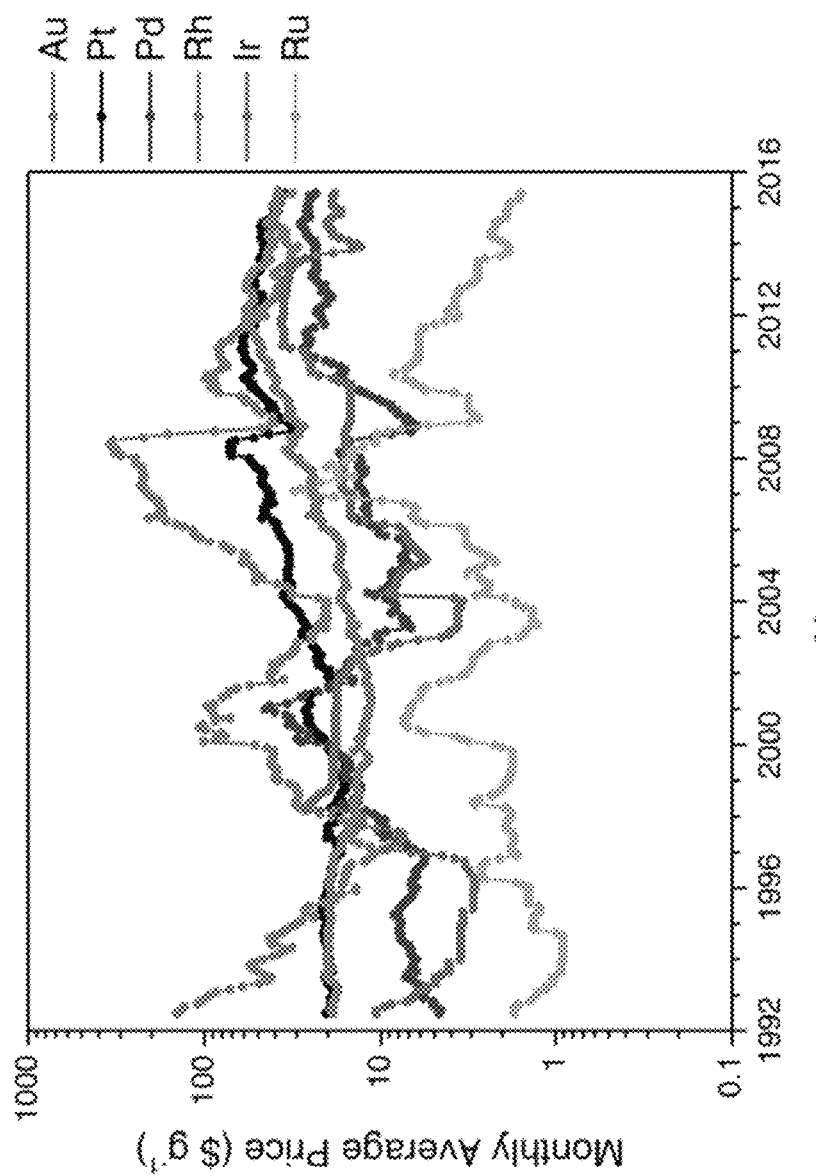
FIG. 2 is a graph depicting inflation-adjusted (to Q2 2015) monthly average prices (in USD) for noble metals.

Transition metal carbides (TMCs) are attractive candidates for supporting NM shells because they satisfy each of the above core requirements. For instance, model thin film studies have shown that tungsten carbide (WC)—a material at least three orders of magnitude less expensive than platinum (Pt) (FIG. 2) with a "Pt-like" surface density of electronic states (DOS)—can host active Pt monolayers for many industrially relevant thermo- and electrochemical reactions. See, D. V. Esposito, S. T. Hunt, Y. C. Kimmel, J. G. Chen, *J. Am. Chem. Soc.* 134, 3025-3033 (2012), E. C. Weigert, a. L. Stottlemyer, M. B. Zellner, J. G. Chen, *J. Phys. Chem. C* 111, 14617-14620 (2007), D. V. Esposito, J. G. Chen, *Energy Environ. Sci.* 4, 3900 (2011), R. B. Levy, M. Boudart, *Science* 181, 547-549 (1973), and Z. Yan, M. Cai, P. K. Shen, *Sci. Rep.* 3, 1646 (2013), each of which is incorporated by reference in its entirety. While NMs are insoluble in TMCs, they can wet metal-terminated TMC surfaces due to strong interfacial binding energies (BEs). For instance, density functional theory (DFT) calculations show interfacial Pt—WC bonding is over 20 kcal/mol stronger than surface Pt—Pt bonding (FIG. 4).

Figure 4:
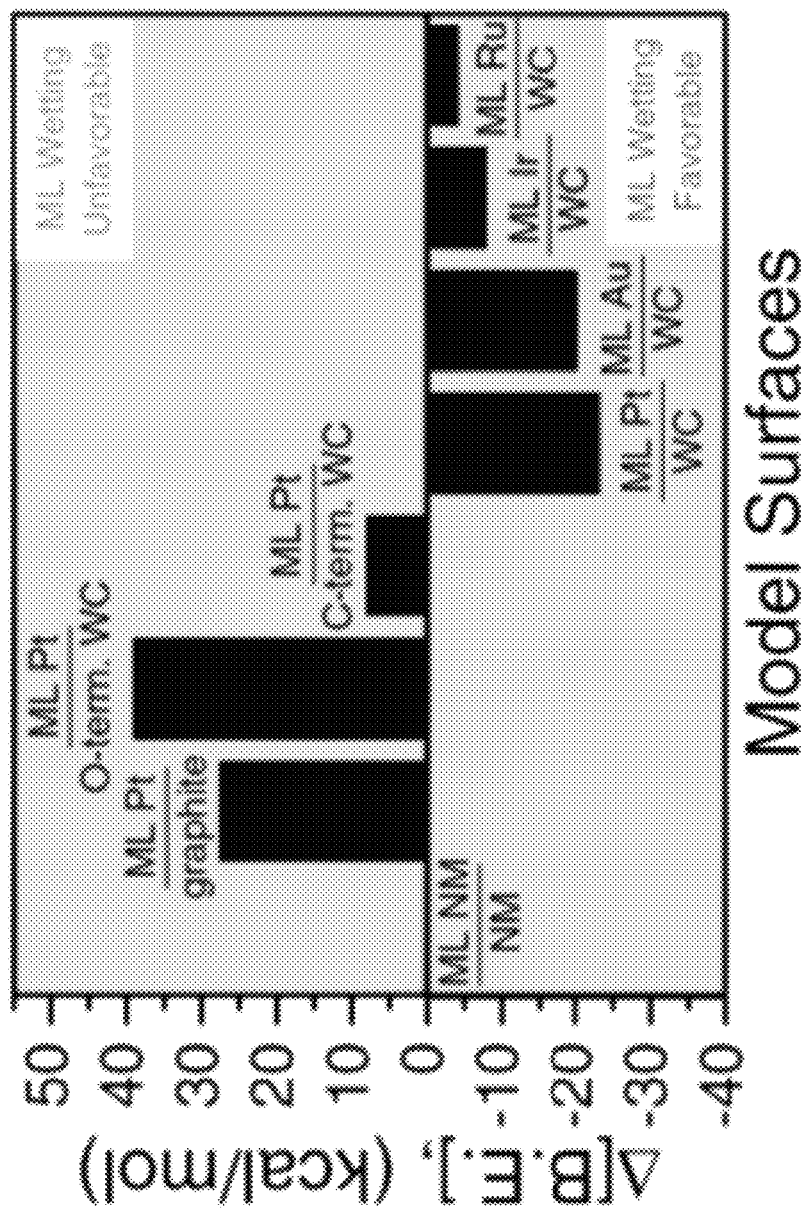
FIG. 4 is a graph depicting a theoretical study of the NM probability to wet various surfaces depicting the difference in B.E.s for NM ML formation on various model surfaces relative to the B.E. on native NM surfaces.

FIG. 4 shows DFT study of the binding energies of noble metal monolayers (NM MLs) on various planar surfaces compared to the binding energies of NM MLs on native NM planar surfaces. Δ[B.E.ML NM/NM-B.E.ML NM/NM] (denoted as Δ[B.E.]) is greater than zero for a ML of Pt adsorbed on graphite, oxygen-terminated WC, and carbidic carbon-terminated WC. This predicts that it is less favorable for Pt to wet these surfaces in a ML fashion than to bind to itself. This is consistent with i) atomic layer deposition (ALD) studies of Pt on high surface area graphitic carbon supports where Pt does not grow layer by layer but instead forms nanoparticles (see, X. Liang, C. Jiang, *J. Nanopart. Res.* 15, 1890 (2013), which is incorporated by reference in its entirety) and ii) the observations that Pt does not wet WC surfaces that are passivated or coated in graphitic carbon but instead form separate fcc Pt crystallites (see, Z. Yan, M. Cai, P. K. Shen, *Sci. Rep.* 3, 1646 (2013), and I. J. Hsu, Y. C. Kimmel, X. Jiang, B. G. Willis, J. G. Chen, *Chemical Communications* 48, 1063-1065 (2012), each of which is incorporated by reference in its entirety). Beyond WC, the inability to wet passivated materials with Pt is well-known, such as the observation that Pt does not wet oxide-terminated Ni nanoparticles. See, S. Zhang et al., *J. Am. Chem. Soc.* 136, 15921-15924 (2014), which is incorporated by reference in its entirety. Δ[B.E.] is less than zero for a ML of Pt, Au, Ir, and Ru adsorbed on the surface of metal-terminated WC, suggesting that it is favorable for these NMs to "wet" metal-terminated WC surfaces in a ML fashion as demonstrated experimentally in the current study.

However, NM/TMC (shell/core) nanoparticles have remained synthetically inaccessible. TMC synthesis typically requires carburizing at temperatures above 700° C. followed by dilute oxygen passivation, resulting in sintered particles covered in both graphitic coke and and/or an oxide surface layer. These surface impurities preclude NM wetting due to the unfavorable BEs between NMs and contaminated TMC surfaces (FIG. 4). Consequently, rather than creating monolayer NM/TMC core-shell nanoparticles, post-synthetic methods, such as wet impregnation or atomic layer deposition, form discrete NM nanoparticles. See, Z. Yan, M. Cai, P. K. Shen, *Sci. Rep.* 3, 1646 (2013), and I. J. Hsu, Y. C. Kimmel, X. Jiang, B. G. Willis, J. G. Chen, *Chemical Communications* 48, 1063-1065 (2012), each of which is incorporated by reference in its entirety.

There are no existing methods to prepare ML NM/TMX NPs. Previously known methods have all focused on post-modification techniques that result in NM NPs forming separately from the TMX NPs due to the presence of passivating surface oxides or graphitic carbon as discussed in FIG. 4. See, Ganesan, R.; Lee, J. S. Tungsten Carbide Microspheres as a Noble-Metal-Economic Electrocatalyst for Methanol Oxidation. *Angew. Chem. Int. Ed.* 2005, 44, 6557-6560, Nie, M.; Shen, P. K.; Wei, Z. Nanocrystalline Tungsten Carbide Supported Au—Pd Electrocatalyst for Oxygen Reduction. *J. Power Sources* 2007, 167, 69-73, Shen, P. K.; Yin, S.; Li, Z.; Chen, C. Preparation and Performance of Nanosized Tungsten Carbides for Electrocatalysis. *Electrochim. Acta* 2010, 55, 7969-7974, Hsu, I. J.; Kimmel, Y. C.; Jiang, X.; Willis, B. G.; Chen, J. G. Atomic Layer Deposition Synthesis of Platinum-Tungsten Carbide Core-Shell Catalysts for the Hydrogen Evolution Reaction. *Chemical communications* (Cambridge, England) 2012, 48, 1063-1065, and Yan, Z.; Cai, M.; Shen, P. K. Nanosized Tungsten Carbide Synthesized by a Novel Route at Low Temperature for High Performance Electrocatalysis. *Sci. Rep.* 2013, 3, 1646, each of which is incorporated by reference in its entirety. As such, these methods result in fundamentally different materials that do not offer substantial reduction in NM loadings.

There are existing methods for preparing ML NM core-shell nanoparticles, but not on TMX cores. Generally, the cores are either other noble metals, such as palladium and silver, or top row 3d transition metals, such as Ni. See, Sasaki, K. et al. Core-Protected Platinum Monolayer Shell High-Stability Electrocatalysts for Fuel-Cell Cathodes. *Angew. Chem. Int. Ed.* 2010, 49, 8602-8607, Sasaki, K. et al. Highly Stable Pt Monolayer on Pdau Nanoparticle Electrocatalysts for the Oxygen Reduction Reaction. *Nat Commun* 2012, 3, 1115, Wojtysiak, S.; Solla-Gullón, J.; Dużewski, P.; Kudelski, A. Synthesis of Core-Shell Silver-Platinum Nanoparticles, Improving Shell Integrity. *Colloids and Surfaces A: Physicochemical and Engineering Aspects* 2014, 441, 178-183, and Chen, Y.; Liang, Z.; Yang, F.; Liu, Y.; Chen, S. Ni—Pt Core-Shell Nanoparticles as Oxygen Reduction Electrocatalysts: Effect of Pt Shell Coverage. *J. Phys. Chem. C* 2011, 115, 24073-24079, each of which is incorporated by reference in its entirety. None of these bare metals satisfy all six criteria given for the ideal core. Other NMs such as Pd and Ag are too expensive while Ni is unstable for catalytic reactions at high potentials or at high temperatures as it sinters and oxidizes readily. In addition, the NM surface shells are fully miscible in these core materials, making such core-shell NPs unsuitable for thermal catalysis at elevated temperatures.

From a fundamental standpoint, the ability to synthesize multimetallic NM shells on multimetallic TMX cores stands to open an entirely new frontier in optimizing the catalytic performance of NM materials by engineering the strain and ligand effects of the sub-surface TMX core using different metals (i.e. combinations of the Group IV-VI early transition metals) or different nonmetals (i.e. C, N, B, or P). This is particularly of interest due to the unique properties of TMX materials in that they break the traditional adsorption "scaling relations" of C, H, and O species on the surfaces of pure metal catalysts. See, Michalsky, R.; Zhang, Y.-J.; Medford, A. J.; Peterson, A. A. Departures from the Adsorption Energy Scaling Relations for Metal Carbide Catalysts. *J. Phys. Chem. C* 2014, 118, 13026-13034, which is incorporated by reference in its entirety. As such, ML NM/TMX NPs stand to offer a new dimension on modifying the C, H, and O binding energies of reactants on NM surfaces to simultaneously optimize catalytic reaction pathways while also substantially reducing noble metal loadings.

Commercial applications include all current and future applications of noble metal nanoparticles where these materials stand ready to reduce NM requirements by ~10 fold without sacrificing catalytic reactivity and stability. These include all current thermo-catalytic applications (i.e. reforming reactions, cracking, isomerizations, hydrogenations, etc.) as well as future renewable energy electrocatalytic applications where the scope of ML NM/TMX materials already synthesized can serve as both the anode and cathode catalysts in water-splitting, hydrogen fuel cells, direct oxygenate fuel cells, Li-Air batteries, hybrid supercapacitors, etc. Beyond the scope of catalysis, these materials could find use in reducing the NM loadings required in sensing technologies as well as in the biomedical application of Au NPs Disclosed herein is a high temperature self-assembly method to synthesize size-tunable TMC nanoparticles (<10 nm) coated with monometallic or heterometallic NM surface shells of controlled thicknesses ranging from sub-monolayer to multilayer coverages. These core-shell materials achieve superior catalytic activity, improved stability, and reduced NM loadings compared to state-of-the-art commercial catalysts for electrochemical applications. The overall synthetic strategy uses a reverse microemulsion (RME) to precipitate combinations of NM chloride salts with monometallic or heterometallic transition metal oxide (TMO) nanoparticles, achieving precise control over nanoparticle composition, size, and NM loading. The composite particles are then encapsulated in silica nanospheres prior to carburization. See, S. T. Hunt, T. Nimmanwudipong, Y. Roman-Leshkov, *Angew. Chem. Int. Ed. Engl.* 53, 5131-5136 (2014), which is incorporated by reference in its entirety.

As shown in FIG. 1A, substantial reduction in Pt loadings is achieved by replacing the entirety of the bulk NP with a ceramic core, such as tungsten carbide (WC). However, on the scale of a single active surface ML, subsurface material selection is critical. While the subsurface metal layers do not actively participate in catalysis, they play a critical role in modulating the catalytic activity and stability of the active surface ML via bimetallic geometric and ligand effects. The ideal subsurface core must be composed of earth-abundant and inexpensive materials, exhibit corrosion-resistance, sinter-resistance, and electrochemical stability, exhibit metallic electrical conductivity, bind strongly to the surface noble metal ML, preferably stronger than the cohesive energy of the noble metal, exhibit electronic similarities to the noble metal ML to mitigate bimetallic ligand effects, exhibit similar lattice geometry to the noble metal ML to mitigate bimetallic lattice strain/compression effects. The NM shell must also be insoluble in the core lattice under reaction conditions.

The only class of materials that simultaneously satisfies all of these criteria are the metallic early transition metal ceramics (TMXs), which include the borides, carbides, nitrides, and phosphides of the Group IV-VI early transition metal d-block elements. In particular, early transition metal carbides (TMCs) such as WC and molybdenum carbide ($Mo_2C$) are notable for exhibiting "platinum-like" electronic properties and have been shown to be active and stable catalysts in a wide variety of reactions. See, Levy, R. B.; Boudart, M. Platinum-Like Behavior of Tungsten Carbide in Surface Catalysis. *Science* 1973, 181, 547-549, and Oyama, S. T. *The Chemistry of Transition Metal Carbides and Nitrides.* (Blackie, 1996), each of which is incorporated by reference in its entirety. Of all of the possibilities, WC is the most attractive due to its high electrochemical stability, "Pt-like" catalytic reactivity, and W has the highest cohesive energy of any element. See, Kittel, C. *Introduction to Solid State Physics.* 8th edn, (John Wiley & Sons, 2005), which is incorporated by reference in its entirety. Furthermore, commercially available W, formulated as ammonium paratungstate (APT) is roughly five orders of magnitude less expensive than Pt. FIGS. 2A-2C show the inflation-adjusted monthly average prices for platinum-group metals as well as for reagent-grade APT powder. Historical prices were obtained from publicly available information. See, "Free market commodity prices, monthly, January 1960-June 2015," United Nations Conference on Trade and Development, (2015), "Gold Price in a Range of Currencies since December 1978," The World Gold Council, (2015), and "Platinum, Palladium, Rhodium, Iridium, Ruthenium Monthly Average Prices between 1 Jun. 1992 and 31 Jul. 2015," Johnson Matthey, (2015), each of which is incorporated by reference in its entirety.

While noble metal monolayers supported on TMX cores (denoted as ML NM/TMX NPs) have been a long sought-after material, there are no known methods of preparing these materials despite several attempts by other researchers. See, Ganesan, R.; Lee, J. S. Tungsten Carbide Microspheres as a Noble-Metal-Economic Electrocatalyst for Methanol Oxidation. *Angew. Chem. Int. Ed.* 2005, 44, 6557-6560, Nie, M.; Shen, P. K.; Wei, Z. Nanocrystaline Tungsten Carbide Supported Au—Pd Electrocatalyst for Oxygen Reduction. *J. Power Sources* 2007, 167, 69-73, Shen, P. K.; Yin, S.; Li, Z.; Chen, C. Preparation and Performance of Nanosized Tungsten Carbides for Electrocatalysis. *Electrochim. Acta* 2010, 55, 7969-7974, Hsu, I. J.; Kimmel, Y. C.; Jiang, X.; Willis, B. G.; Chen, J. G. Atomic Layer Deposition Synthesis of Platinum-Tungsten Carbide Core-Shell Catalysts for the Hydrogen Evolution Reaction. *Chemical communications* (Cambridge, England) 2012, 48, 1063-1065, and Yan, Z.; Cai, M.; Shen, P. K. Nanosized Tungsten Carbide Synthesized by a Novel Route at Low Temperature for High Performance Electrocatalysis. *Sci. Rep.* 2013, 3, 1646, each of which is incorporated by reference in its entirety. A scalable, solution-phase route of preparing size-tunable WC NPs that exhibit "Pt-like" catalytic activity has been recently disclosed. See, Hunt, S. T.; Nimmanwudipong, T.; Roman-Leshkov, Y. Engineering Non-Sintered, Metal-Terminated Tungsten Carbide Nanoparticles for Catalysis. *Angew. Chem. Int. Ed. Engl.* 2014, 53, 5131-5136, and Roman-Leshkov, Y.; Hunt, S. T. Process for the Production of Non-Sintered Transition Metal Carbide and Nitride Nanoparticles, U.S. Patent Application Publication No. 2015/0105241 A1, each of which is incorporated by reference in its entirety. Recently, by modifying the procedure, the first ML NM/TMX NPs has been synthesized. Moreover, the method remains scalable and solution-processable while both the size and composition of the cores and of the shells is tunable. To date, ML Au/Ti$_x$W$_{1-x}$C NPs, Pt/Ti$_x$W$_{1-x}$C NPs, Pt/Ni$_x$W$_{1-x}$C NPs, PtAu/WC, PtRu/WC, PtRh/WC NPs, and PtIr/WC NPs have been synthesized. The further development of this method will be critically enabling to the commercialization of 21$^{st}$ century renewable energy platforms as well as allow other research groups to perform detailed experimental studies on a host of multimetallic NM shells on various mono- and multi-metallic TMX core materials for various applications beyond electrocatalysis.

Figure 3:
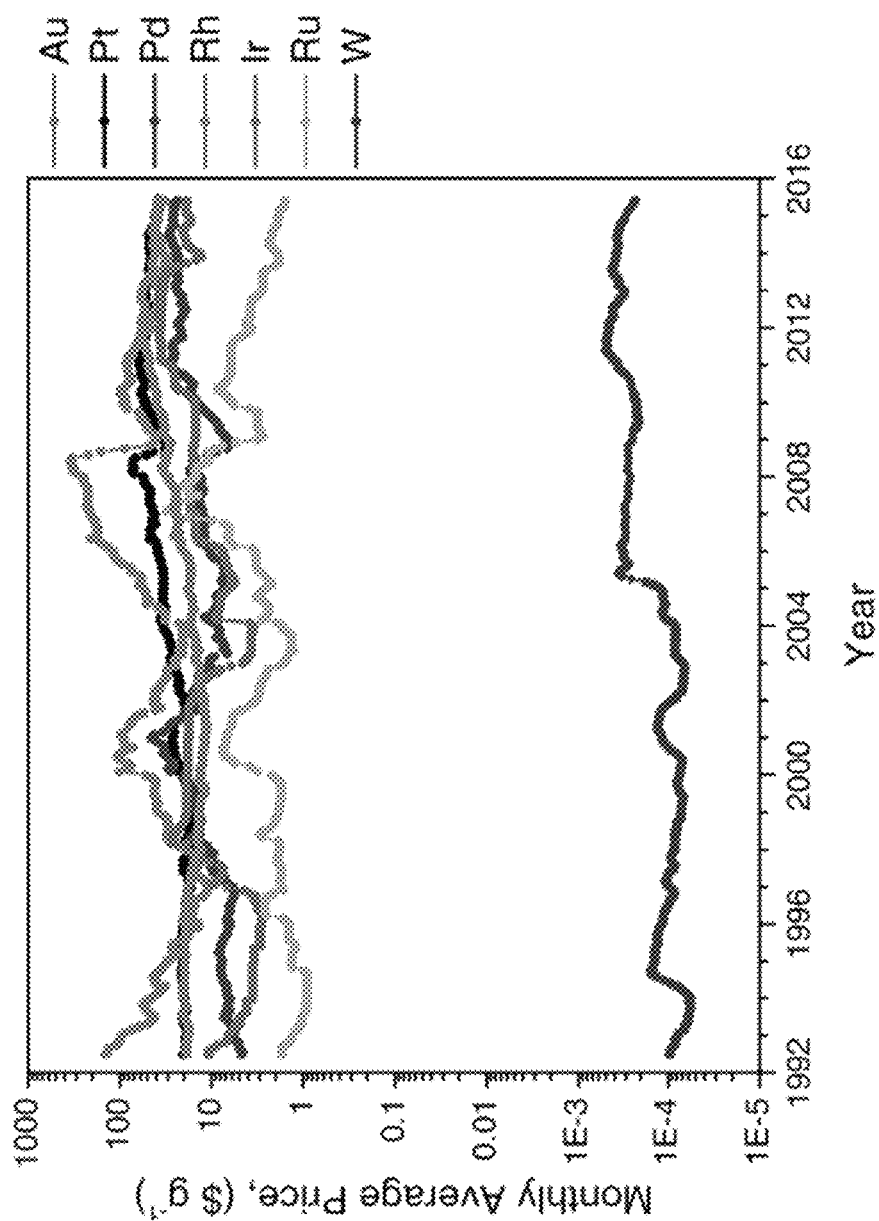
FIG. 3 is a graph depicting inflation-adjusted (to Q2 2015) monthly average prices (in USD) for noble metals in comparison to reagent-grade ammonium paratungstate.

All prior attempts at preparing ML NM/TMX NPs have focused on post-modification whereby TMX nanomaterials are first prepared and then subsequently doped with NMs. This has several intrinsic issues. The first is that TMX materials can only be synthesized at high temperatures (greater than ca. 700° C.). This often leads to sintering and loss of surface area, but critically it leads to excess surface impurity deposition, such as graphitic carbon. See Kimmel, Y. C.; Esposito, D. V.; Birkmire, R. W.; Chen, J. G. Effect of Surface Carbon on the Hydrogen Evolution Reactivity of Tungsten Carbide (WC) and Pt-Modified WC Electrocatalysts. *Int. J. Hydrogen Energy* 2012, 37, 3019-3024, which is incorporated by reference in its entirety. Once exposed to ambient air, TMX materials are irreversibly passivated with a stable oxide layer. See Weidman, M. C.; Esposito, D. V.; Hsu, I. J.; Chen, J. G. Electrochemical Stability of Tungsten and Tungsten Monocarbide (Wc) over Wide Ph and Potential Ranges. *J. Electrochem. Soc.* 2010, 157, F179, which is incorporated by reference in its entirety. On doping with NMs, core-shell NPs are not thermodynamically favorable. FIG. 3 shows density functional theory (DFT) calculations for the binding energy (B.E.) of Pt (relative to itself) in comparison with graphite, oxide-terminated WC, carbidic carbon-terminated WC, and metal-terminated (W-terminated) WC. As shown, the desired strong anchoring of Pt to the WC surface can only be obtained if the surface is metal-terminated with W atoms. Only in this configuration is it thermodynamically feasible for Pt to wet the surface to form the desired core-shell ML Pt/WC NPs. In all of the other configurations, it is thermodynamically more favorable for Pt to bind to itself and form separate NPs, resulting in underutilized bulk Pt. DFT calculations were performed using the Vienna Ab-Initio Simulation Package (VASP) using the Perdew-Wang 91 generalized gradient approximation functional and an energy cutoff of 396 eV. In all cases, a 5×5×1 Monkhorst-Pack automatic K-point mesh was used. Calculations were performed on 3×3 supercells with 6 layers of atoms and 18 layers of vacuum separating the slabs. The lower 4 layers were fixed in the bulk geometry while the top 2 surface layers were allowed to relax.

A method for manufacturing non-sintered and metal-terminated TMX NPs using a scalable solution-processable technique has been recently disclosed. See, Hunt, S. T.; Nimmanwudipong, T.; Roman-Leshkov, Y. Engineering Non-Sintered, Metal-Terminated Tungsten Carbide Nanoparticles for Catalysis. *Angew. Chem. Int. Ed. Engl.* 2014, 53, 5131-5136, and Roman-Leshkov, Y.; Hunt, S. T. Process for the Production of Non-Sintered Transition Metal Carbide and Nitride Nanoparticles. U.S. Patent Application Publication No. 2015/0105241 A1, each of which is incorporated by reference in its entirety. The method allows for the synthesis of both mono- and multi-metallic TMX NPs with tunable sizes and crystal phases. As such, this was the critical first step towards the ultimate goal of ML NM/TMX NPs. As experienced by other research groups, initial attempts at preparing ML NM/TMX NPs via post-modification were unsuccessful, ostensibly due to oxygen passivation in ambient conditions. Instead, a new and scalable procedure has been developed for producing ML NM/TMX NPs using the previously published and patented method without any additional processing steps. Instead of post-modification, commercial NM salts are precipitated onto the surface of transition metal oxide NPs and encapsulated within silica nanospheres prior to carburization as shown in FIG. 4. On high temperature carburization, ML NM/TMX NPs self-assemble for the following reasons. First, the noble metals cannot form stable borides, carbides, nitrides, phosphides, etc. See, Ono, S.; Kikegawa, T.; Ohishi, Y. A High-Pressure and High-Temperature Synthesis of Platinum Carbide. Solid State Commun. 2005, 133, 55-59, which is incorporated by reference in its entirety. Therefore, on high temperature carburization, they remain phase-segregated from the crystallizing TMX NPs. Second, at these high temperatures, the formed WC NPs are in a reducing environment and are therefore metal-terminated without an oxide or graphitic carbon surface layer. Therefore, it is thermodynamically favorable for the noble metals, such as Pt, to wet the WC surface and self-assemble into ML Pt/WC NPs as shown in FIG. 3. Third, at lower temperatures before carburization, when the transition metal oxide (TMO) NPs are transitioning through metallic and substoichiometric carbide phases, the Pt does not bind strongly to the surface and remain as separate Pt NPs, which easily sinter. The silica nanospheres efficiently prevent sintering and ensure that each TMC NP is evenly and uniformly coated with similar amounts of noble metal.

FIG. 4 shows a schematic of the original, three-step method for preparing non-sintered and metal-terminated TMX NPs as well as a new method for preparing ML NM/TMX NPs via high temperature self-assembly. In the first step heptane, a non-ionic commercial surfactant (Brij® L4), and water are mixed together to form a reverse microemulsion (RME) consisting of water nanodroplets dispersed in oil. Through sequential addition, it is possible to prepare silica-encapsulated noble metal/transition metal oxide ($SiO_2$/NM/TMO) NPs. The composite material is precipitated from the emulsion by addition of methanol and recovered via decantation. The material is then directly heated in a 15%/85% $CH_4$/$H_2$ atmosphere at 900° C. for 4 hours. After cooling to room temperature, the silica-encapsulated noble metal/transition metal carbide ($SiO_2$/NM/TMC) NPs are dispersed in a room-temperature ethanol solution for 18 hours with dilute HF added to it such that the molar ratio of HF:Si is 6:1. This solution is effectively 1 wt % HF initially and around 0.3 wt % HF once all of the $SiO_2$ is removed as $SiF_4$. This results in NM/TMC NPs, which can then be stored as a nanodispersion, precipitated as a nanopowder, or dispersed on any desired high surface area catalytic support material, such as carbon black, graphene, carbon nanotubes, alumina, etc.

Figure 1B:
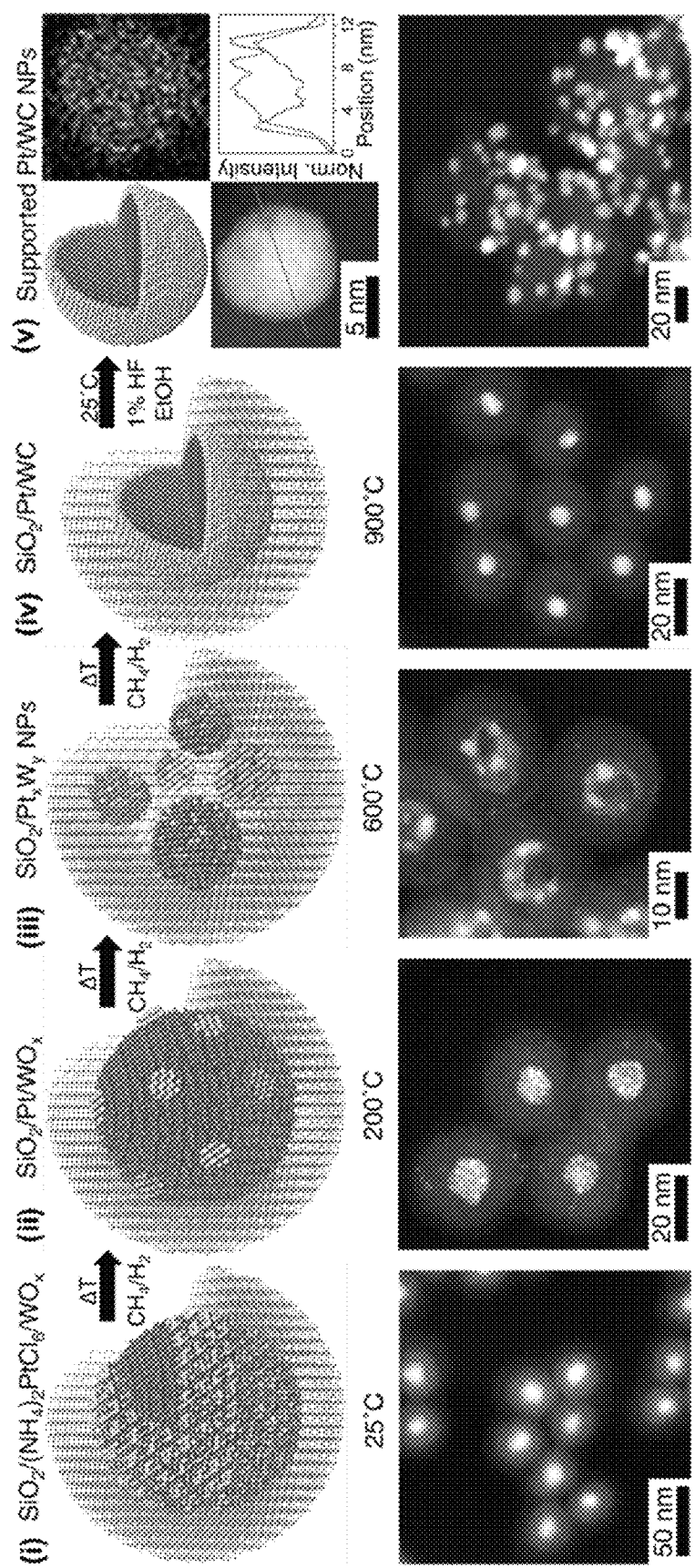
FIG. 1B shows schematic representations and corresponding STEM images of high temperature self-assembly of (i) silica-encapsulated $(NH_4)_2PtCl_6/WO_x$ nanoparticles synthesized in a one-pot reactor at room-temperature and subsequently heated to (ii) 200° C., (iii) 600° C., and (iv) 900° C. in a $CH_4/H_2$ atmosphere.
Figure 12:
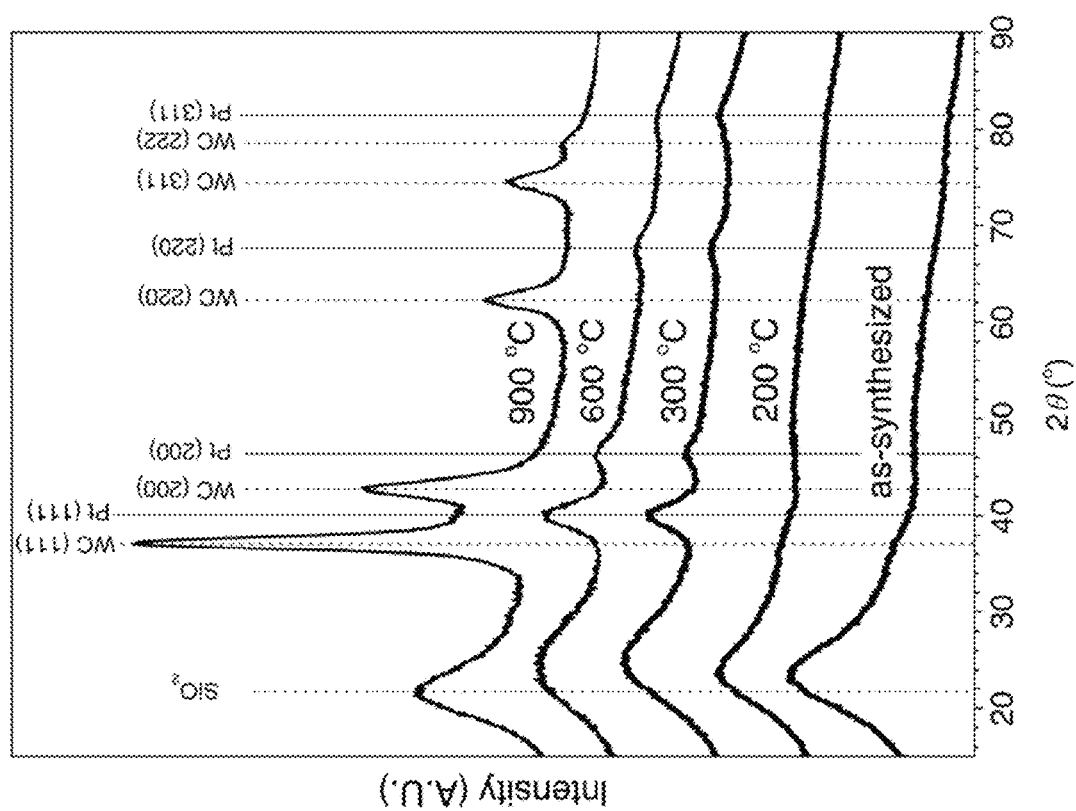
FIG. 12 shows a PXRD study of the core-shell NP self-assembly process during carburization.

All characterization of the materials are indicative of ML NM/TMC core-shell NPs. FIG. 1B shows aberration-corrected scanning transmission electron microscopy (STEM) images depicting the stages of the NM/TMC core-shell self-assembly process as a function of temperature using Pt/WC nanoparticle formation as a representative example. Discrete $SiO_2$/$(NH_4)_2PtCl_6$/$WO_x$ nanoparticles (15 wt % metals basis in $SiO_2$) were prepared using the RME method and subjected to a temperature ramp under a 15% $CH_4$/85% $H_2$ gas flow (FIG. 1B(i)). At temperatures under 200° C., the Pt salt reduces to form Pt nanoclusters over the WO, domains (FIG. 1B(ii) and FIG. S3). By 600° C., the central $WO_x$ nanoparticles reduce and separate, resulting in metallic mixtures of Pt and W trapped within the silica nanospheres (FIGS. 1B(iii), 11, and 12). FIG. 12 shows PXRD diffractograms of as-synthesized $SiO_2$/$(NH_4)_2PtCl_6$/$WO_x$ after heating to 200° C., 300° C., 600° C., and 900° C. in a 15% $CH_4$/85% $H_2$ atmosphere with a heating ramp of 2° C./min. The sample heated to 900° C. was kept at this temperature for 5 h. The PXRD diffractograms for the materials as-synthesized (i.e. 25° C.), 200° C., 600° C., and 900° C. correspond to the materials presented in FIG. 1B(i)-(iv).

Near 900° C., these small metallic clusters sinter to form single central nanoparticles while carbon from methane decomposition intercalates into the W-rich domains, forming WC (FIG. 1B(iv)). Note that Pt is insoluble in the WC lattice and cannot form a stable crystalline carbide at atmospheric pressures. See, A. L. Ivanovskii, *Russ. Chem. Rev.* 78, 303-318 (2009), S. Ono, T. Kikegawa, Y. Ohishi, *Solid State Commun.* 133, 55-59 (2005), and A. Jain et al., *APL Materials* 1, 011002 (2013), each of which is incorporated by reference in its entirety. Consequently, Pt phase-segregates from the WC domains and wets the central carbide core as an atomically-thin layer, resulting in the self-assembly of uniform NM/TMC core-shell nanoparticles—shown in FIG. 1B(v) by an energy-dispersive X-ray spectroscopy (EDX) map and linescan. The final architecture of the Pt/WC nanoparticles is controlled by the Pt:W and W:$SiO_2$ ratios of the $SiO_2$/$(NH_4)_2PtCl_6$/$WO_x$ material prior to heating. The silica template can then be dissolved at room temperature, and the resulting nanoparticles can be dispersed in solution with or without a capping agent (FIG. 13) or dispersed onto a high surface area matrix (FIG. 1B(v)).

Figures 13A, 13B:
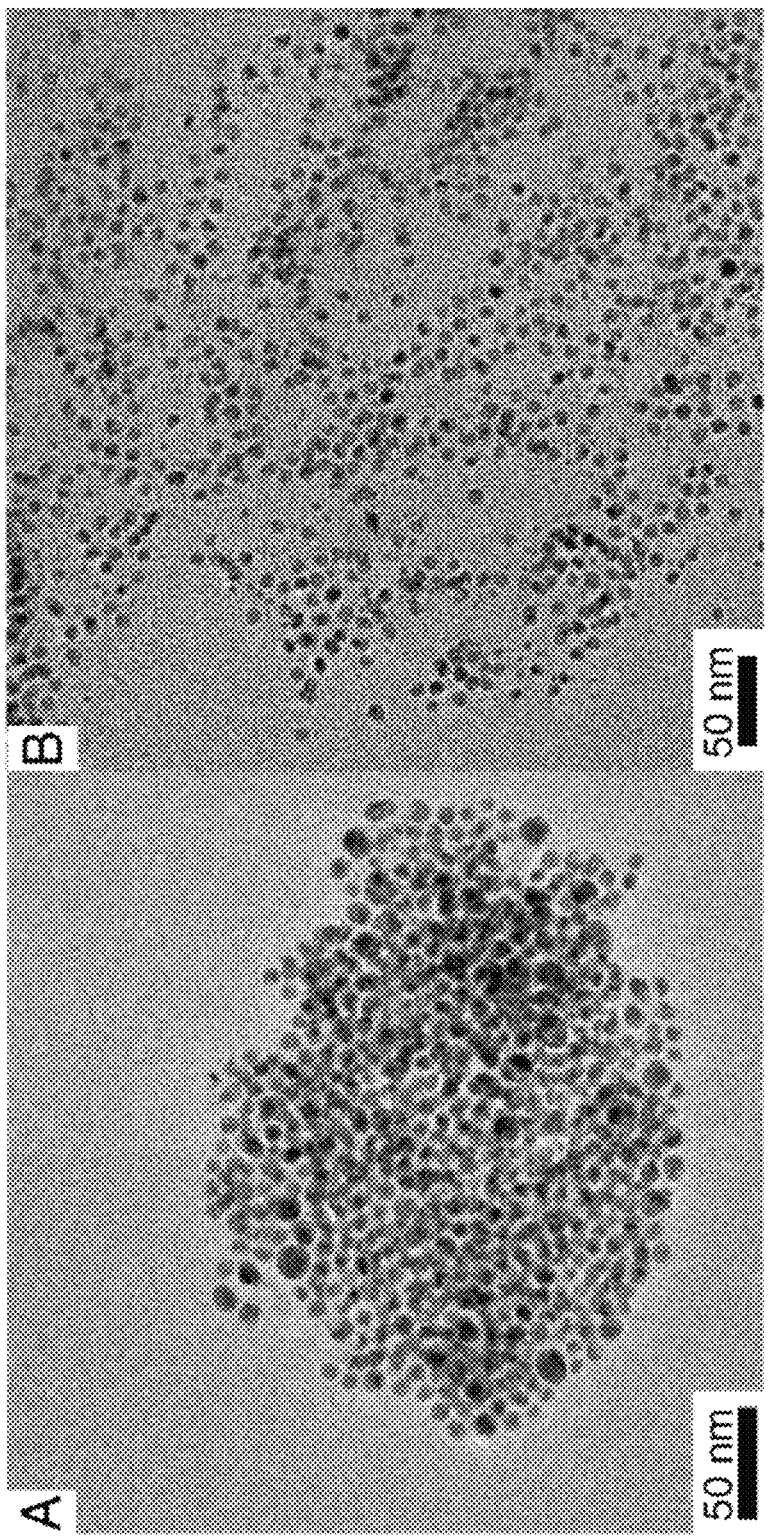
FIGS. 13A-13B show Microscopic analysis of the core-shell NM/TMC nanodispersion.

FIG. 13A shows a representative TEM image of a NM/TMC nanoaggregate dispersed in ethanol obtained by dissolving the silica shells without adding either a catalyst support or a surfactant capping agent. The material is Pt/$Ti_{0.1}W_{0.9}C$ core-shell NPs corresponding to $Pt_{C-S}$ and is typical of the material formulation used for XPS analysis of NM/TMC NPs. FIG. 13B shows a representative TEM image of NM/TMC NPs dispersed in ethanol using oleylamine as a capping agent after removal of the silica template. The above material consists of PtRu(1:1)/$Ti_{0.1}W_{0.9}C$ core-shell NPs.

Figure 5:
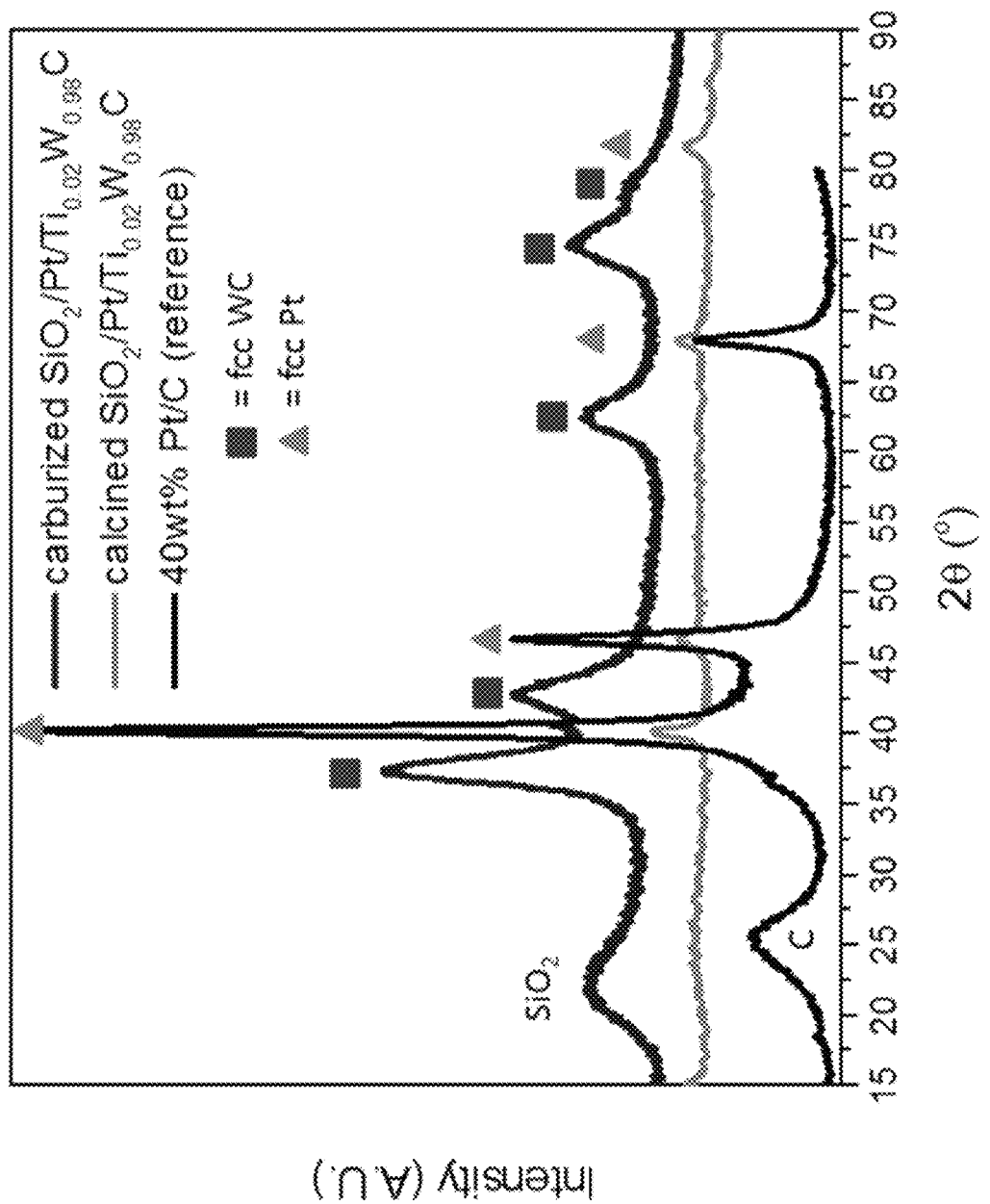
FIG. 5 is a graph depicting PXRD Diffractograms of $SiO_2/Pt/Ti_{0.02}W_{0.98}C$ after carburization (blue) and before carburization if the material is instead calcined in air at 400° C. (red).

FIG. 5 shows powder x-ray (PXRD) diffractograms for $SiO_2$/Pt/$Ti_{0.02}W_{0.98}C$ after carburization (in blue) and before carburization if the material is heated in a $CH_4$/$H_2$ atmosphere to 400° C. and then cooled. For comparison, commercial 40 wt % Pt/C is included. Here, it is clear that at lower temperatures, the Pt forms a separate fcc Pt phase and does not wet the $WO_x$ NPs. After carburization when $WO_x$ has converted to WC, there is no longer any fcc Pt phase detectable. This is to be expected if a ML core-shell configuration is obtained as the surface Pt ML is necessarily in the same crystalline phase as the subsurface fcc WC core.

Figure 6:
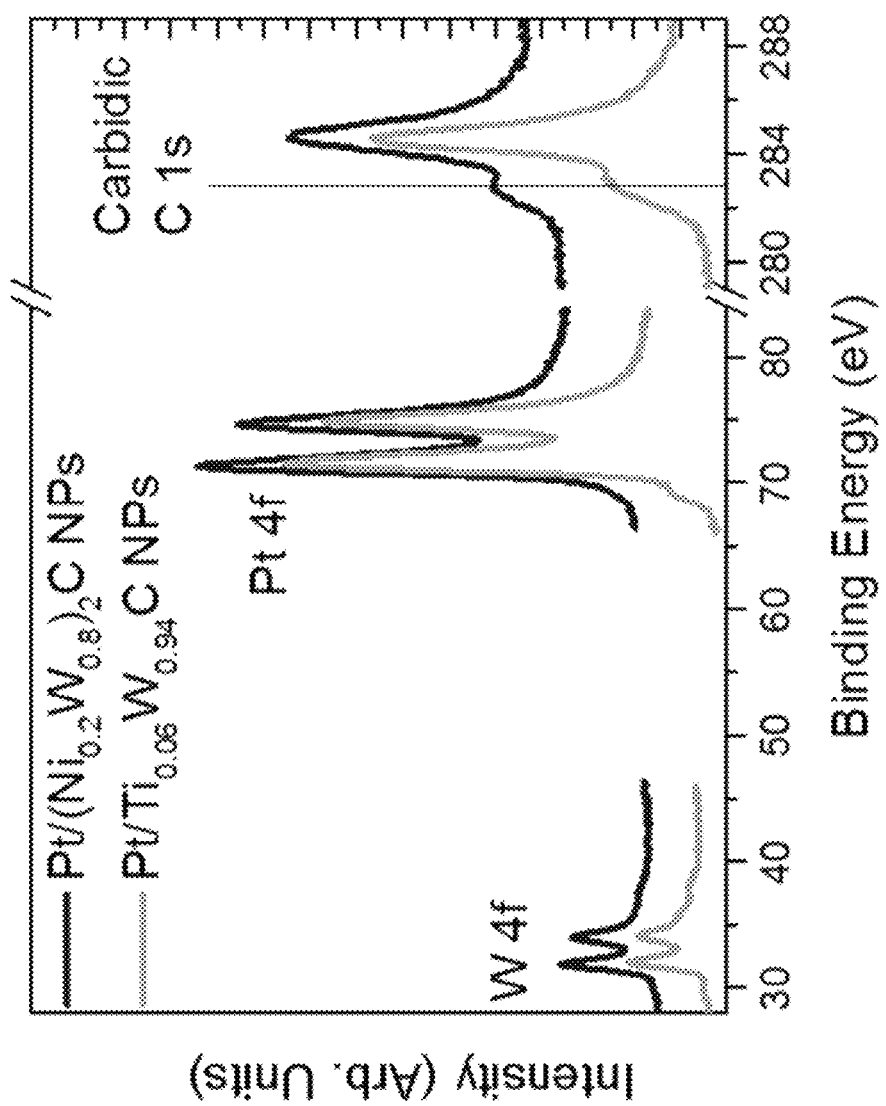
FIG. 6 is a graph depicting W 4f, Pt 4f, and C 1s XPS signals for nanopowders of $Pt/(Ni_{0.2}W_{0.8})_2C$ and $Pt/Ti_{0.06}W_{0.94}C$.
Figure 7:
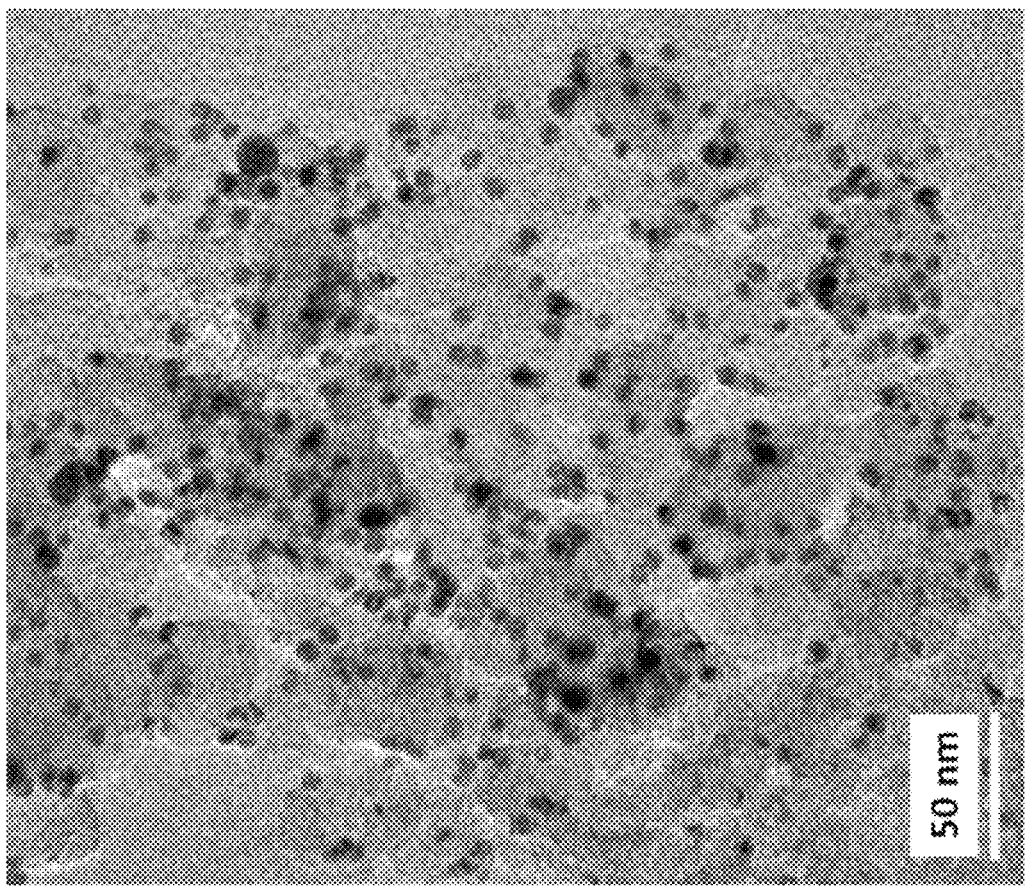
FIG. 7 is an image depicting ML $Pt/Ti_{0.1}W_{0.9}C$ NPs dispersed at ~20 wt % on Vulcan® XC-72r carbon black.

In a separate experiment, the silica shells were removed in a 20 wt % room temperature ammonium bifluoride (ABF) solution over 2 hours and a Pt/TMC nanopowder was obtained. This was done for two proof-of-concept test syntheses: ML Pt/($Ni_{0.2}W_{0.8}$)$C_{0.5}$ (crystallized in a $W_2C$ lattice) and ML Pt/$Ti_{0.06}W_{0.94}C$ (crystallized in an fcc WC lattice). Using inductively coupled plasma-atomic emission spectroscopy (ICP-AES), both materials were 15 mol % Pt (metals basis). The nanopowder was then analyzed using X-ray Photoelectron Spectroscopy (XPS) to determine the surface composition, which is shown in FIG. 6. If a core-shell configuration was achieved, the surface element would substantially screen the signal of the sub-surface elements, resulting in the atomic concentration being greater than the bulk molar composition determined using ICP-AES. See, Cumpson, P. J.; Seah, M. P. Elastic Scattering Corrections in Aes and Xps. Ii. Estimating Attenuation Lengths and Conditions Required for Their Valid Use in Overlayer/Substrate Experiments. *Surf. Interface Anal.* 1997, 25, 430-446, which is incorporated by reference in its entirety. Indeed, by integrating the Pt 4f signals and comparing them to the W 4f signals (and adjusting for the R.S.F. for each element) that the material composition was 80 mol % Pt, much greater than the bulk composition of 15 mol % determined using ICP-AES. This result is further evidence that the configuration of Pt is in a ML core-shell. Importantly, the W 4f signal consists entirely of reduced metallic W without an observable surface passivating oxide, potentially indicating that the surface Pt ML is protecting the WC core, yielding a favorable and strong Pt—WC interaction. In addition, a carbidic C 1s signal was observed, indicating that the subsurface core is indeed carbidic. The Ni and Ti signals were nearly nonexistent, in agreement with other work performed on bimetallic TMC NPs that suggest these metals persist in a subsurface configuration even without a noble metal ML.

Figure 8A:
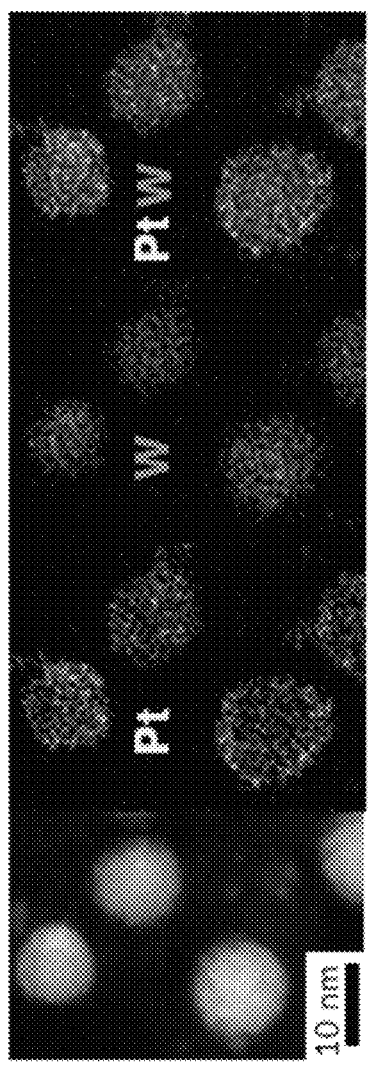
FIGS. 8A-8G show experimental corroboration of core-shell structure.
Figure 8B:
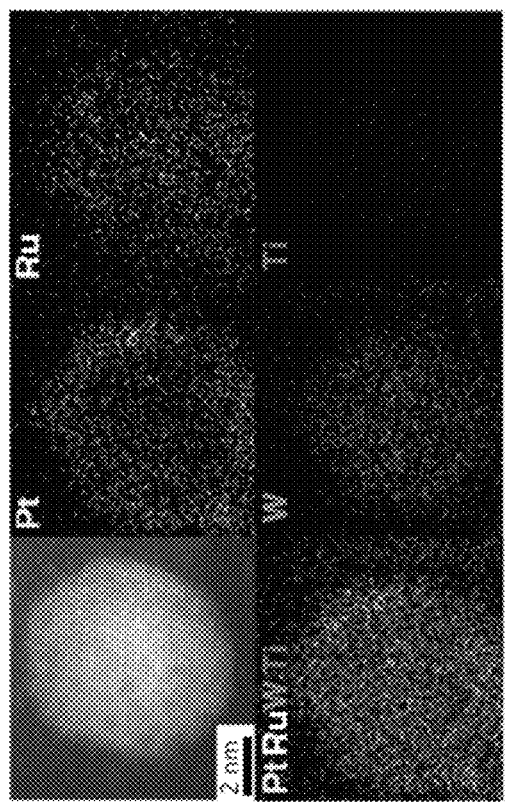
Figure 8D:
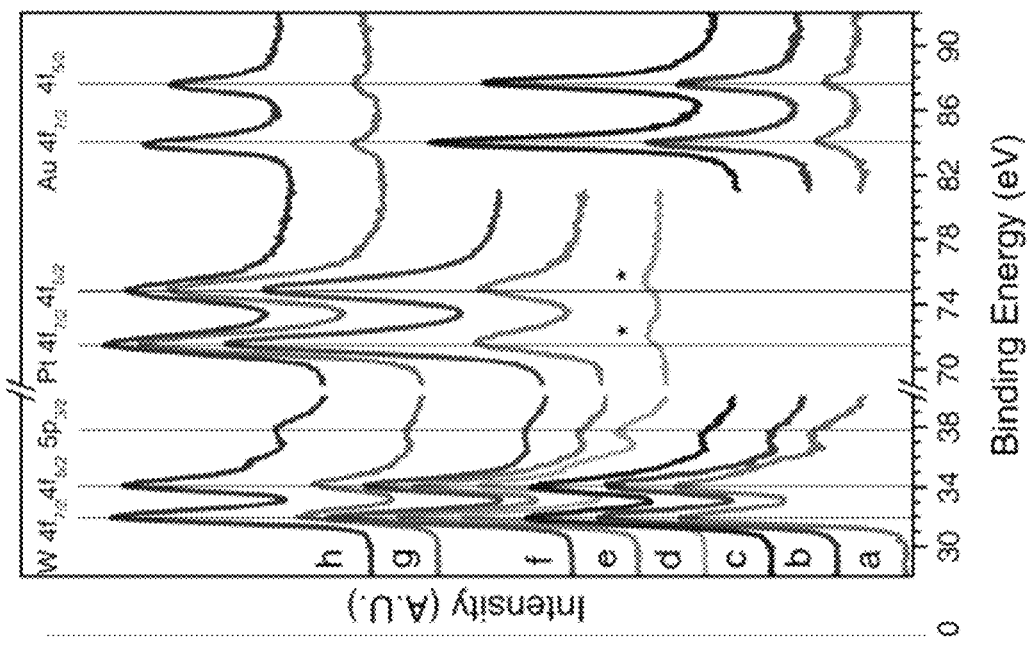
Figure 8C:
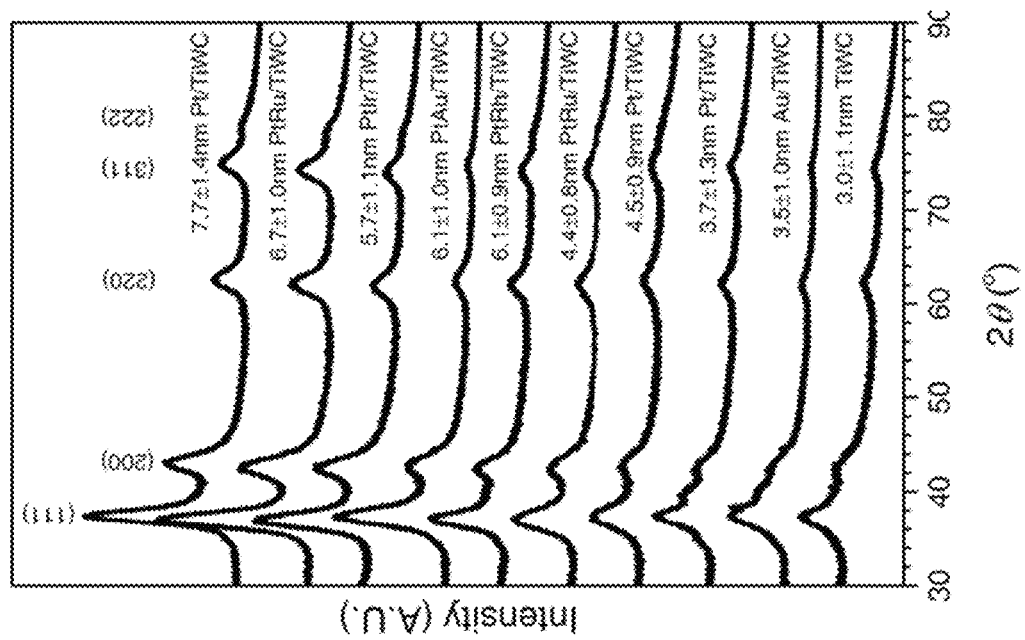
Figure 8F:
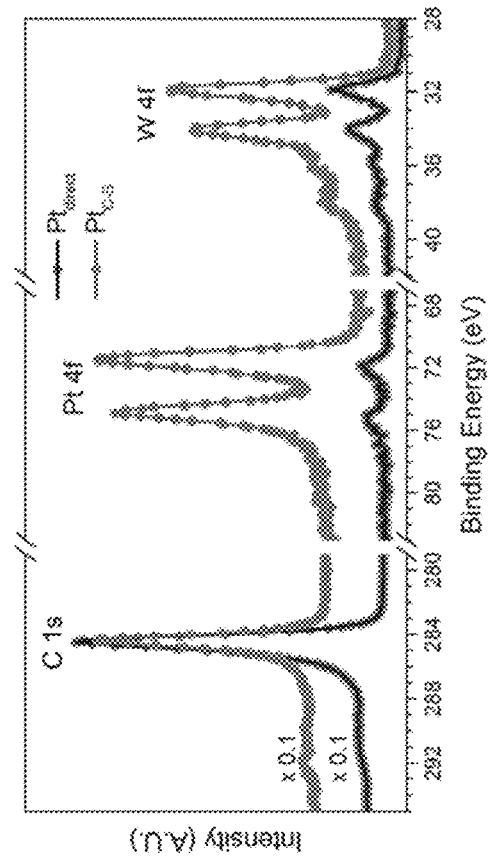
Figure 8E:
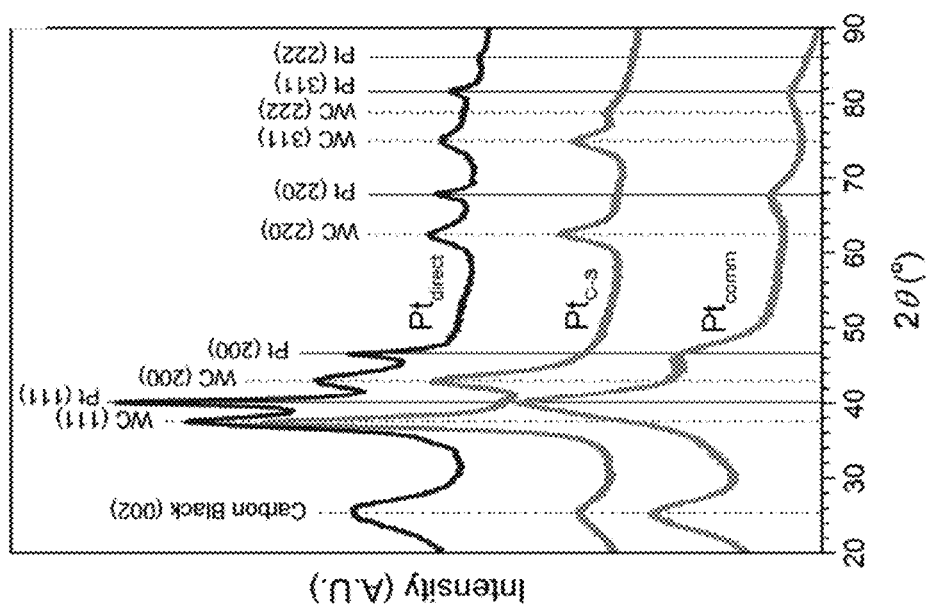
Figure 8G:
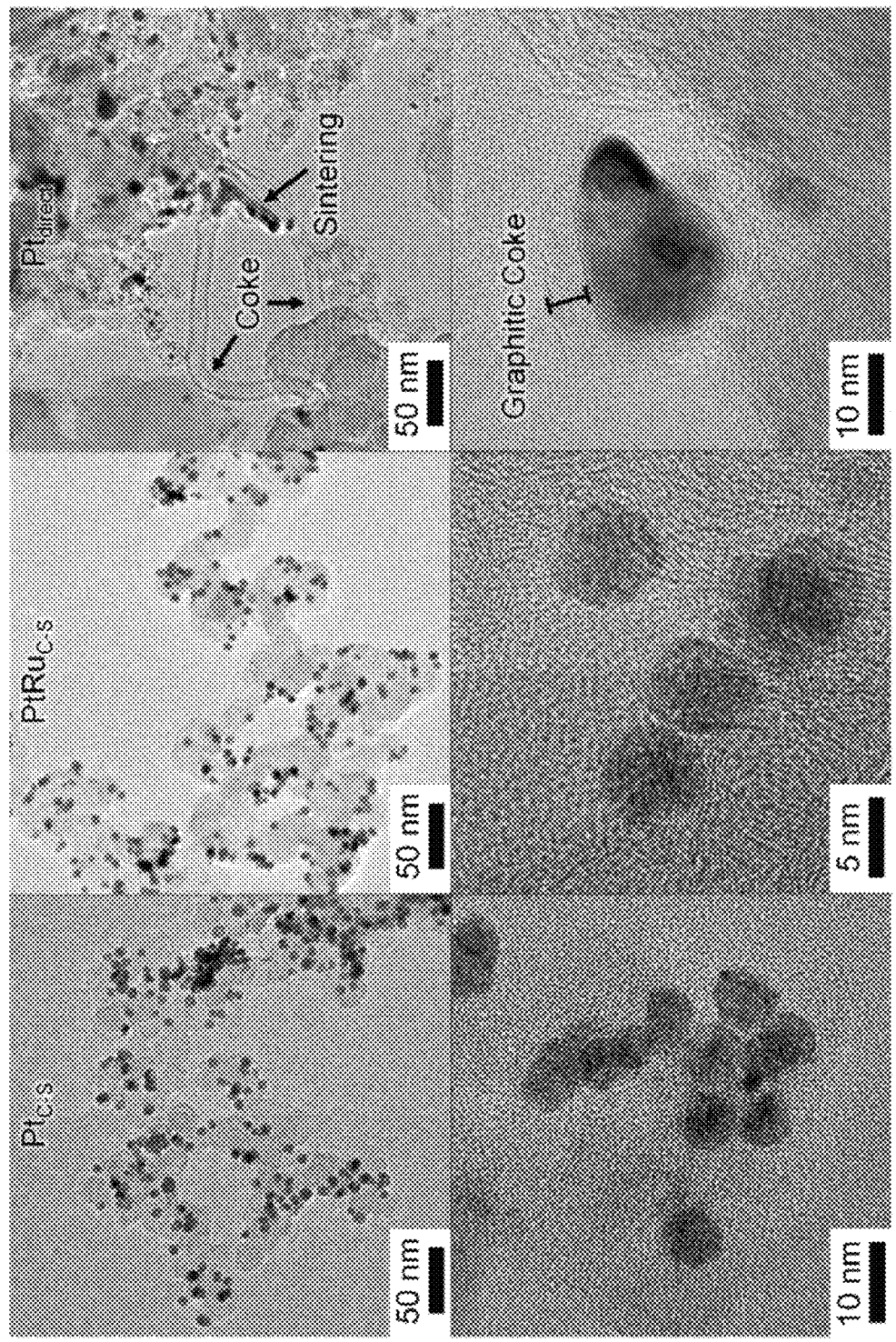

Silica encapsulation is critical for controlling core-shell nanoparticle formation. FIGS. 8E-8G compares two NM/TMC materials, one with silica encapsulation (denoted as $Pt_{C-S}$, 28% Pt/72% $Ti_{0.1}W_{0.9}C$ loaded at 28 wt % on carbon black), the other without silica encapsulation (denoted as $Pt_{direct}$, 20% Pt/80% $Ti_{0.1}W_{0.9}C$ loaded at 20 wt % on carbon black). Because TiC is the most electrochemically stable carbide (see, Y. C. Kimmel, X. Xu, W. Yu, X. Yang, J. G. Chen, *ACS Catal.* 4, 1558-1562 (2014), which is incorporated by reference in its entirety), a bimetallic TiWC core was used to enhance stability without significantly affecting the WC lattice parameter. The powder X-ray diffraction (PXRD) pattern for $Pt_{C-S}$ shows reflections consistent with phase-pure fcc WC (PDF #00-020-1316) without additional fcc Pt reflections, whereas the pattern for $Pt_{direct}$ exhibits distinct, sintered fcc Pt crystallites (FIG. 8E). These data are consistent with core-shell formation for $Pt_{C-S}$ and Pt phase-segregation for $Pt_{direct}$. In addition, $Pt_{C-S}$ shows a difference between the bulk and surface Pt:TiW ratios (28% vs. 49% as determined by inductively coupled plasma mass spectrometry [ICP] and X-ray photoelectron spectroscopy [XPS], respectively). This surface ratio enhancement is indicative of Pt monolayers screening a TiW-rich core. In contrast, such surface screening was not observed for $Pt_{direct}$ where the bulk and surface Pt:TiW ratios were 20% and 18%, respectively.

Silica encapsulation prevents undesirable coking during carburization, as verified by a 6-fold decrease in the carbon-to-metal surface ratio for $Pt_{C-S}$ compared to $Pt_{direct}$ (FIG. 8F). Characteristic graphitic coke fibrils and sintered nanoparticles encapsulated in 4-5 nm of graphitic coke are visible in the transmission electron microscopy (TEM) images of $Pt_{direct}$ (FIG. 8G). $Pt_{direct}$ consists of 28% Pt/72% $Ti_{0.1}W_{0.9}C$ NPs dispersed on carbon black at 20 wt % and carburized directly on the carbon black support without using silica encapsulation and removal. $Pt_{comm}$ is 20 wt % Pt/C commercial catalyst supplied by Premetek® (Wilmington, DE). In contrast, $Pt_{C-S}$ shows well-dispersed crystalline nanoparticles with a uniform particle size distribution (PSD) of 6-8 nm and the absence of detectable graphitic coke layers. A heterometallic 27% $Pt_{0.67}Ru_{0.33}$/73% $Ti_{0.1}W_{0.9}C$ material (denoted as $PtRu_{C-S}$) was synthesized analogously to $Pt_{C-S}$ and exhibits similar physico-chemical properties (FIGS. 8G, 19, 20, and 36). Its core-shell structure is clearly visible on the aberration-corrected STEM-EDX map shown in FIG. 8B. In, FIG. 36, PXRD patterns of $Pt_{C-S}$ and $PtRu_{C-S}$ show phase-pure fcc WC lattices without additional reflections associated with metallic Pt or Ru.

Figures 25A, 25B:
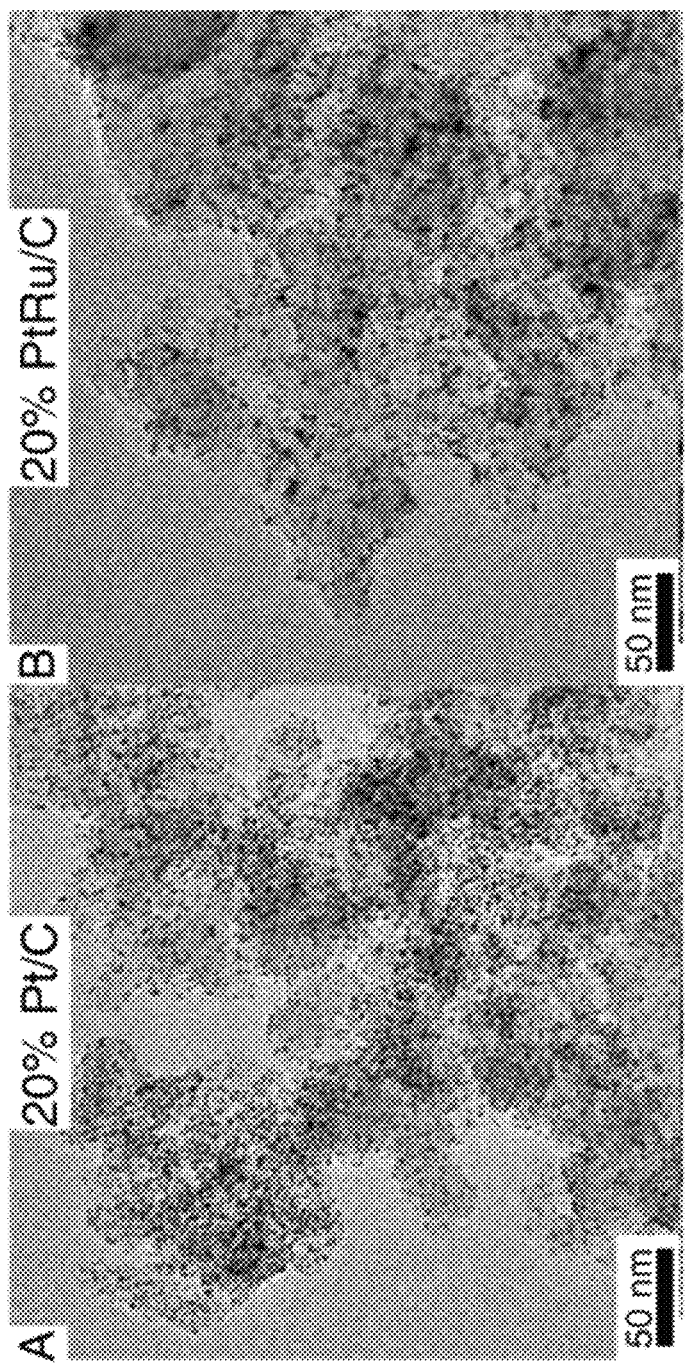
FIGS. 25A-25E shows characterization of commercial $Pt_{comm}$ and $PtRu_{comm}$ catalysts. Wide-view TEM and HR-TEM images of (A,C) $Pt_{comm}$ and (B,D) $PtRu_{comm}$. (E) PXRD patterns of $Pt_{comm}$ and $PtRu_{comm}$.
Figures 25C, 25D:
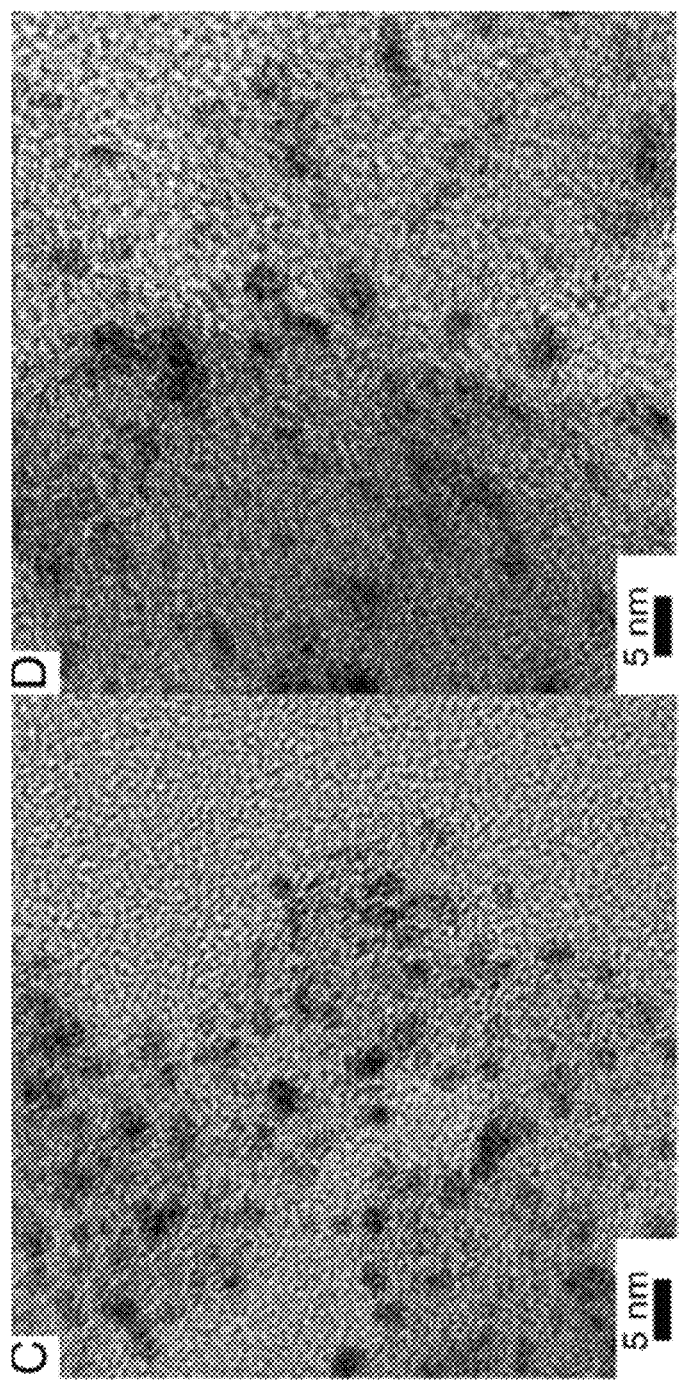
Figure 25E:
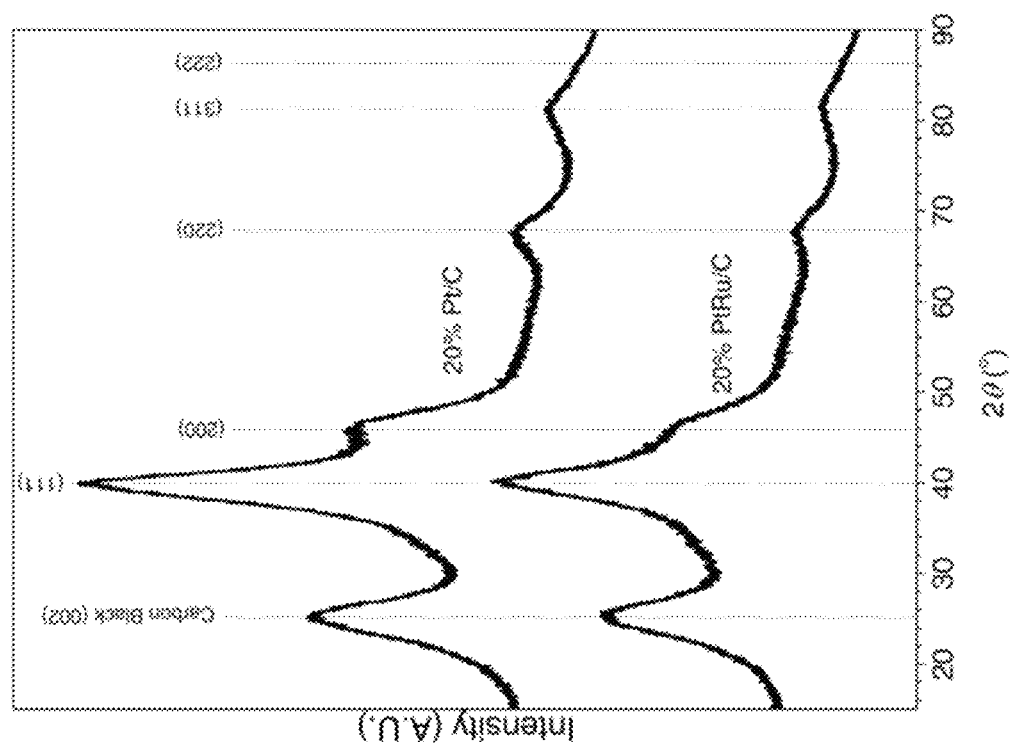
Figures 26A, 26B:
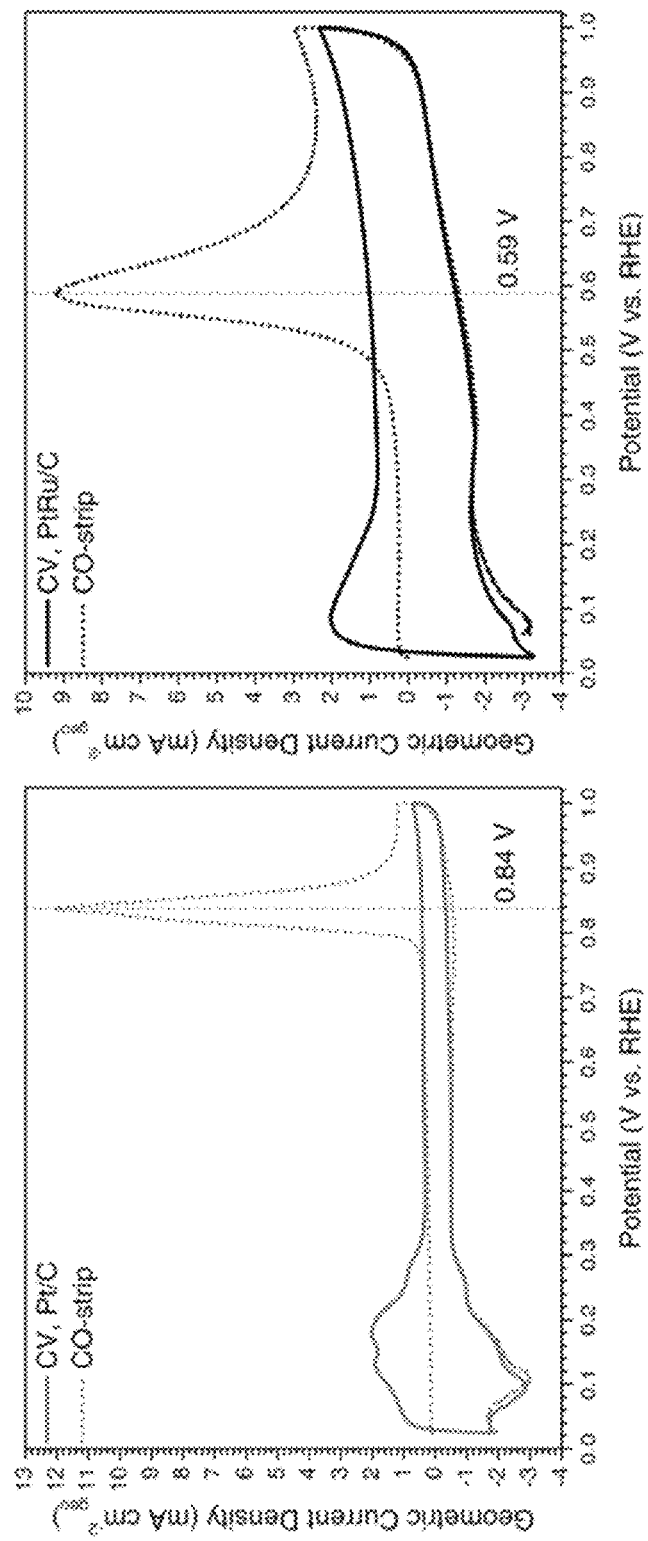
FIGS. 26A-F show CO stripping voltammograms for various catalysts and controls.
Figure 26D:
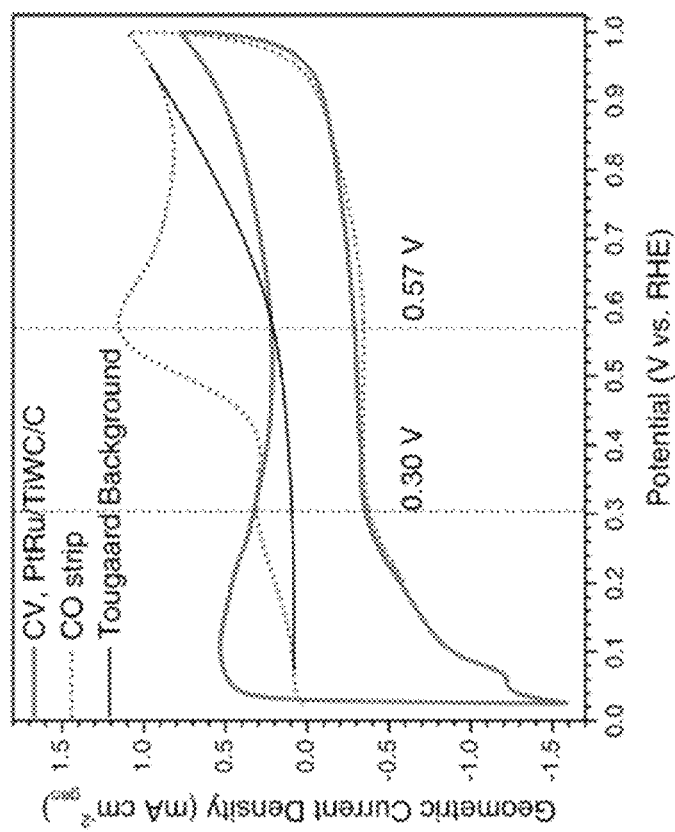
Figure 26C:
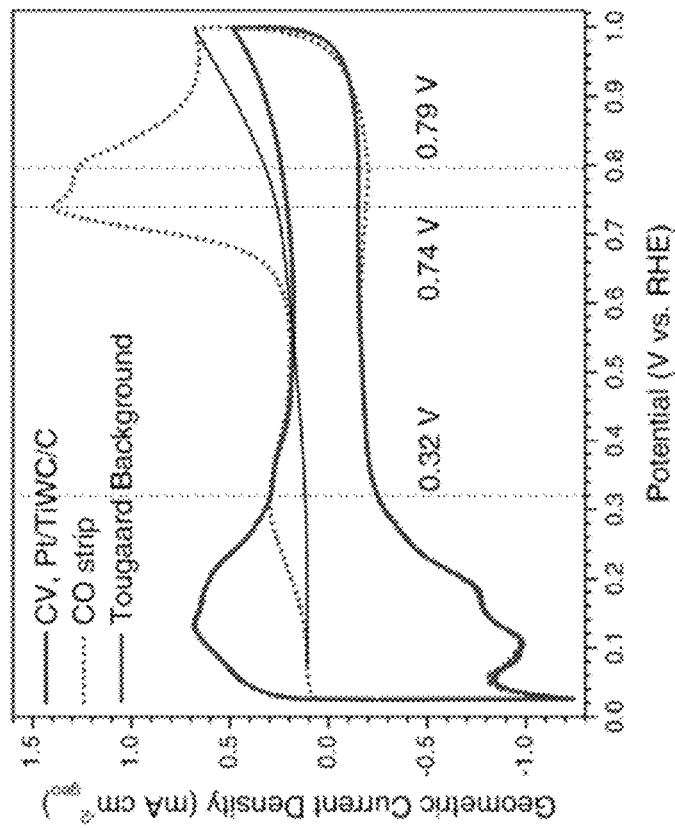
Figures 26E, 26F:
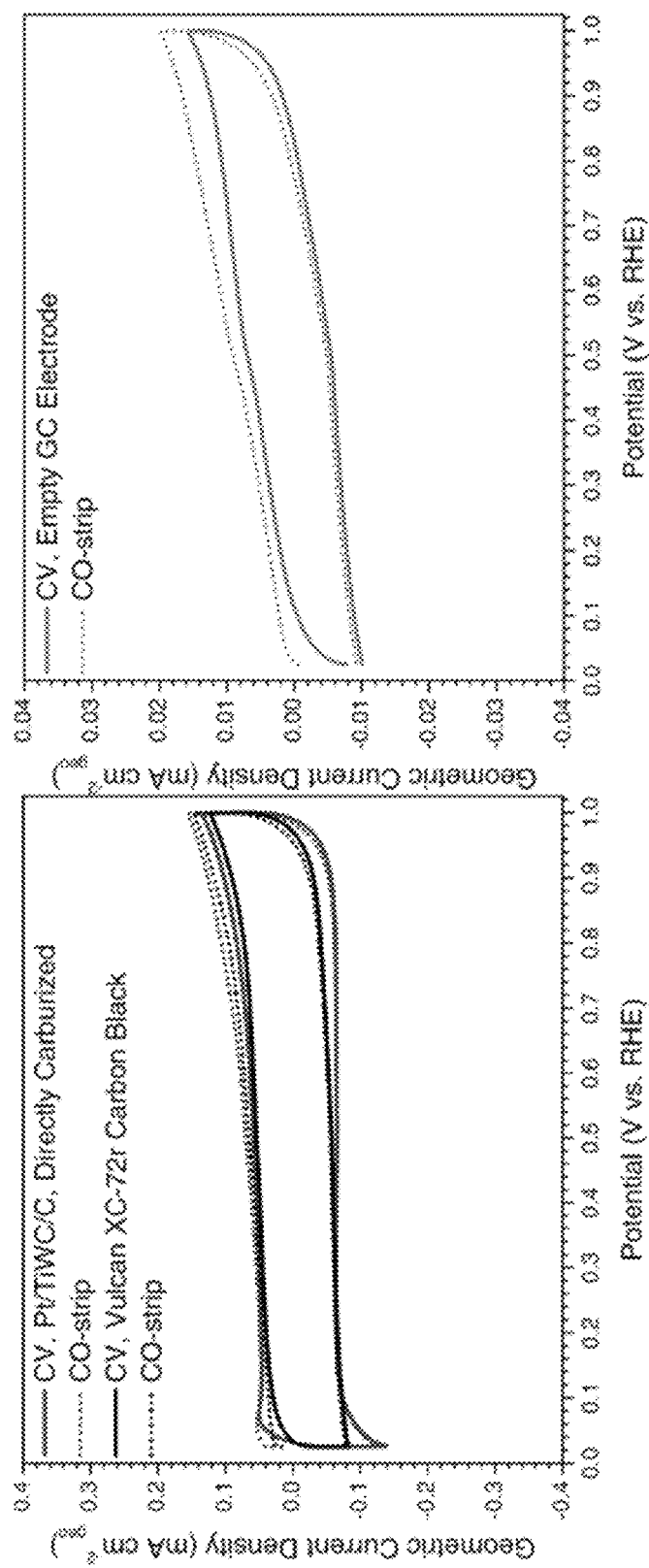

The electrocatalytic properties of $Pt_{C-S}$ and $PtRu_{C-S}$ (8 wt % NM) were compared to 20 wt % carbon-supported commercial (Premetek) electrocatalysts, denoted as $Pt_{comm}$ and $PtRu_{comm}$. Carbon monoxide stripping voltammetry measurements were used to determine the electrochemical active surface area (CO-ECSA) of all materials (Table 1, FIGS. 26A-F). FIGS. 26A-F show CO-stripping voltammograms of (A) $Pt_{comm}$, (B) $PtRu_{comm}$, (C) $Pt_{C-S}$, (D) $PtRu_{C-S}$, (E) $Pt_{direct}$ and carbon black, and (F) empty GC electrode, collected by holding the working electrode potentiostatically at +0.025 V vs. RHE in CO-saturated 0.1 M $HClO_4$ at 30° C. under a rotation rate of 1600 rpm followed by an Ar-purge and scanning at 50 mV/s with iR compensation. The reported CVs are the second scan obtained immediately after the first CO-stripping scan. Due to the complex pre-peak of the core-shell samples, an optimized Tougaard background was used when integrating the charge under the CO-stripping voltammograms instead of standard linear backgrounds. CO stripping was performed as the last step in all experimental sequences, after conditioning scans, HER, HOR, CO/HOR, and MOR studies. See, S. Rudi, C. Cui, L. Gan, P. Strasser, *Electrocatalysis* 5, 408-418 (2014), which is incorporated by reference in its entirety. Both $Pt_{comm}$ and $PtRu_{comm}$ consist of 1-3 nm nanoparticles (FIG. 25) and have high CO-ECSAs of 68±6 $m^2$ $g^{-1}_{NM}$ and 99±7 $m^2$ $g^{-1}_{NM}$, respectively.

Figure 27:
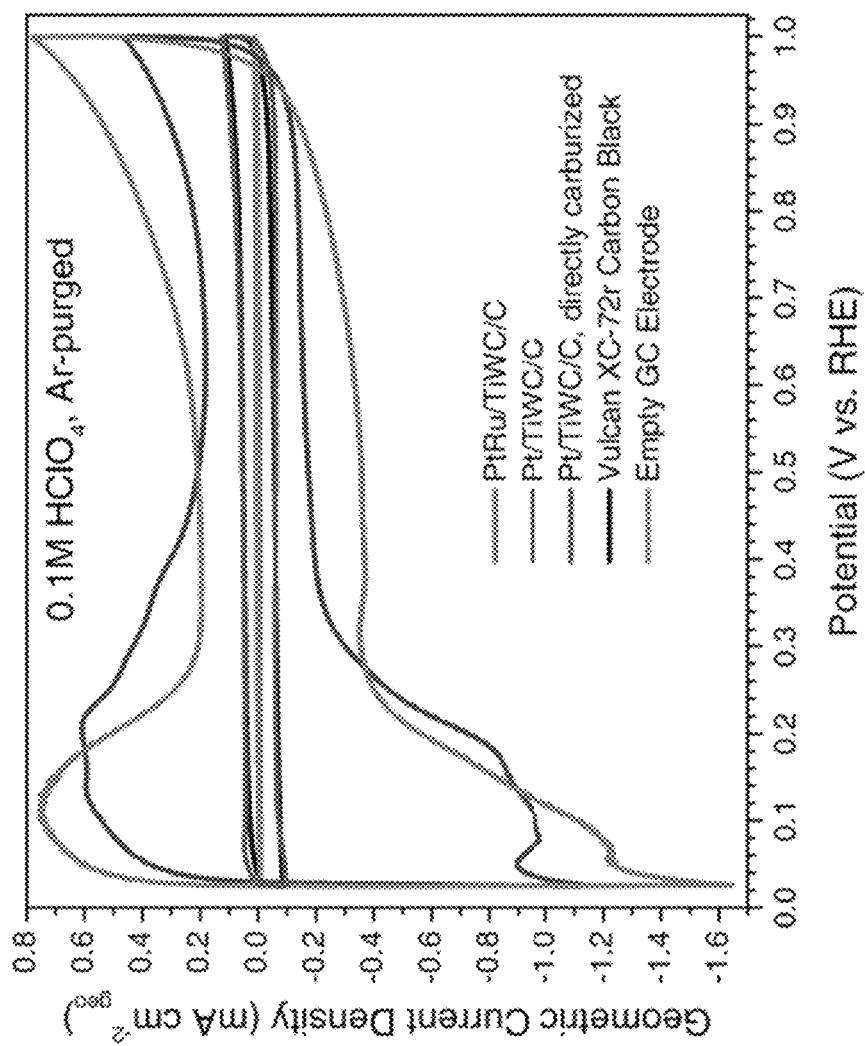
FIG. 27 shows post-conditioning CVs for various catalysts and controls.

Despite larger PSDs (6-8 nm), both $Pt_{C-S}$ and $PtRu_{C-S}$ achieve comparable CO-ECSAs: 50±2 $m^2$ $g^{-1}_{NM}$ and 73±2 $m^2$ $g^{-1}_{NM}$, respectively. Note that $Pt_{direct}$ did not exhibit a measureable CO-ECSA (FIGS. 26A-F), indicating that the extensively coked Pt surface sites were inaccessible to CO. As a result, $Pt_{direct}$ is electrochemically analogous to carbon during cyclic voltammetry (CV) from 0.025 V to 1 V (FIGS. 9A and 27). FIG. 27 shows post-conditioning CVs collected from +0.025 V to 1.0 V at 50 mV/s in Ar-saturated 0.1 M $HClO_4$ at 30° C. under a rotation rate of 1000 rpm. $Pt_{direct}$ exhibits similar electrochemical behavior as the Vulcan® XC-72r carbon black control, in agreement with the TEM and XPS analysis (FIG. 8) illustrating particle sintering and blockage of active sites by graphitic coke.

In contrast, CVs for $Pt_{C-S}$ and $PtRu_{C-S}$ exhibit high capacitance and characteristic peaks for hydrogen adsorption/desorption ($H_{upd}$) below 0.4 V, but with notable differences from $Pt_{comm}$ and $PtRu_{comm}$. Specifically, the characteristic region of OH adsorption/desorption ($OH_{ad}$) observed for $Pt_{comm}$ above 0.6 V is suppressed on both core-shell materials. Furthermore, the distinct pseudocapacitance of surface $RuO_x$ species is less pronounced on $PtRuc_{C-S}$ compared to $PtRu_{comm}$. These differences suggest TiWC cores modulate the electrochemical behavior of Pt and PtRu, which was characterized further using density functional theory (DFT) and various probe reactions including hydrogen evolution (HER), hydrogen oxidation (HOR), HOR under CO contamination, and methanol electrooxidation (MOR).

TABLE 1

Electrochemical active surface areas of core-shell and commercial catalysts.

Electrochemical active surface areas determined from triplicate electrode mountings using CO-stripping voltammetry (CO-ECSA) and under-potentially deposited hydrogen ($H_{upd}$-ECSA). The CO-ECSA/$H_{upd}$-ECSA ratio is also provided where appropriate. $H_{upd}$-ECSA is not reported for $PtRu_{comm}$ as it is poorly defined for this material (see, E. C. Weigert, A. L. Stottlemyer, M. B. Zellner, J. G. Chen, *J. Phys. Chem. C* 111, 14617-14620 (2007), which is incorporated by reference in its entirety).

| Catalysts | CO-ECSA ($m^2/g_{NM}$) | $H_{upd}$-ECSA ($m^2/g_{NM}$) | CO-ECSA/$H_{upd}$-ECSA |
|---|---|---|---|
| $Pt_{comm}$ | 67.9 ± 5.8 | 68.0 ± 7.0 | 1.00 ± 0.02 |
| $PtRu_{comm}$ | 98.9 ± 7.1 | N.R. | N.R. |
| $Pt_{C-S}$ | 49.9 ± 2.2 | 54.9 ± 6.6 | 0.92 ± 0.07 |
| $PtRu_{C-S}$ | 72.8 ± 1.5 | 46.4 ± 2.0 | 1.53 ± 0.05 |

N.R.—not reported

Figures 28A, 28B:
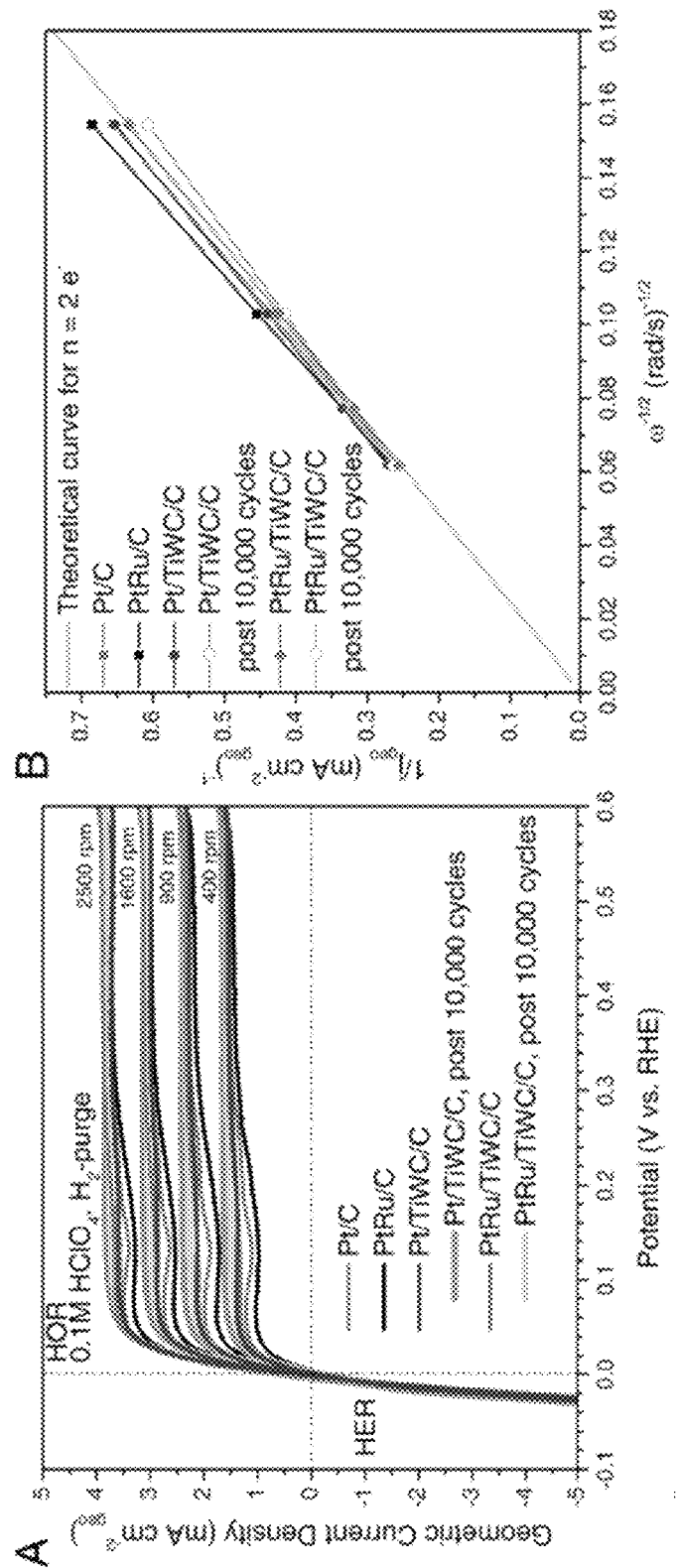
FIGS. 28A-28D show HOR and HER activity analysis.
Figures 28C, 28D:
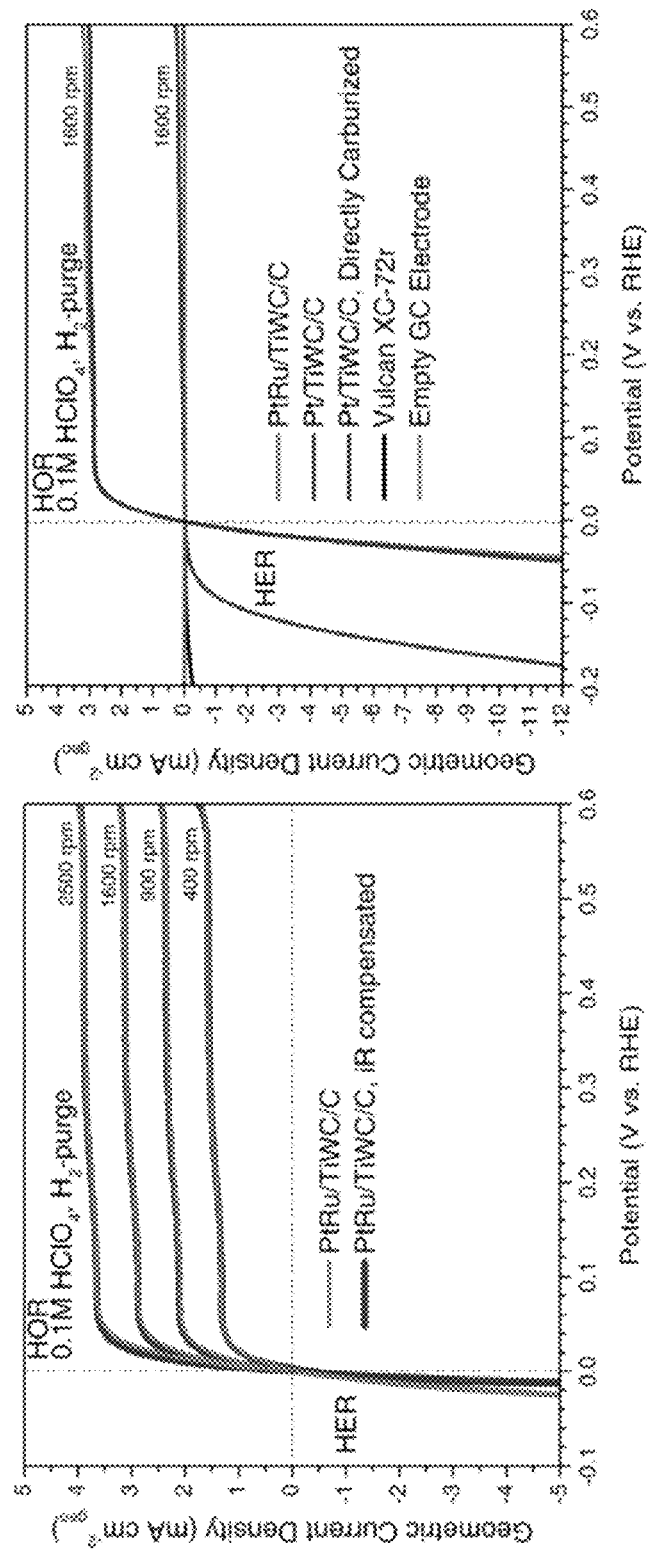

Both $Pt_{C-S}$ and $PtRu_{C-S}$ exhibited improved specific activity for HER and HOR, suggesting TiWC cores are excellent supports for NM monolayers and can favorably alter catalytic activity. Despite a 60% reduction in NM loading, $Pt_{C-S}$ and $PtRu_{C-S}$ exhibited the same symmetric activity profile during HER and HOR linear sweep voltammetry (LSV) as that observed for the commercial catalysts (FIG. 9B). Both core-shell materials exhibited HER and HOR Tafel slopes of ca. 30 mV $dec^{-1}$ even after 10,000 cycles between −50 and 600 mV (Table 2 and FIG. 28). In FIG. 28, all measurements were performed in $H_2$-saturated 0.1 M $HClO_4$ at 30° C. and 10 mV/s using various rotation rates listed on each panel. FIG. 28A shows raw LSV data collected for various catalysts before and after 10,000 potential cycles without iR compensation. These data were used to obtain the Tafel plots in FIG. 9B. FIG. 28B shows a Koutecky-Levich plot obtained from the LSVs shown in FIG. 28A using the current densities at 0.5 V and various rotation rates. The theoretical line was constructed for a two-electron transfer process using a diffusion coefficient of $4.5 \cdot 10^{-5}$ cm$^2$/s, a solution viscosity of 0.008 cm$^2$/s at 30° C., and a concentration of $7.2 \cdot 10^{-7}$ mol H$_2$/cm$^3$ electrolyte. FIG. 28C show Raw LSV data obtained for PtRu$_{C-S}$ at various rotation rates showing representative data for how instrument-applied iR compensation affects the shapes of the LSV curves during data acquisition. FIG. 28D shows raw LSV data obtained at 1600 rpm for Pt$_{C-S}$ and PtRu$_{C-S}$ compared to empty Vulcan® XC-72r carbon black, an empty GC electrode, and Pt$_{direct}$. The extensive coking and sintering suppresses both the HER and HOR activity of Pt$_{direct}$ in comparison with the core-shell materials prepared using silica encapsulation/removal.

TABLE 2

Tafel analysis of the HOR and HER LSVs.

Exchange current densities ($j_o$) and Tafel slopes ($\beta$) as determined from both the HOR and HER LSVs (shown in FIG. 9B) obtained at 10 mV/s in H$_2$-saturated 0.1M HClO$_4$ at 30° C. under a rotation rate of 1600 rpm without iR compensation. Linear fits for all materials were performed at overpotentials from 15 to 30 mV. The reported errors are propagated from the standard errors in the regression. The kinetic HOR current was obtained from the Koutecky-Levich equation.

| Catalyst | HOR $j_o$ (mA/cm$^2$) | HER $j_o$ (mA/cm$^2$) | HOR $\beta$ (mV/dec) | HER $\beta$ (mV/dec) |
|---|---|---|---|---|
| Pt$_{comm}$ | 1.14 ± .04 | 1.13 ± .04 | 30.6 ± .6 | 32.4 ± .9 |
| PtRu$_{comm}$ | 1.14 ± .04 | 1.14 ± .03 | 33.8 ± .7 | 33.5 ± .7 |
| Pt$_{C-S}$ | 1.06 ± .03 | 1.03 ± .05 | 28.3 ± .4 | 32.4 ± 1.0 |
| Pt$_{C-S}$ post 10,000 | 1.09 ± .02 | 1.29 ± .04 | 28.3 ± .3 | 31.8 ± .9 |
| PtRu$_{C-S}$ | 1.11 ± .03 | 1.16 ± .04 | 29.6 ± .5 | 31.3 ± .8 |
| PtRu$_{C-S}$ post 10,000 | 1.03 ± .03 | 1.25 ± .04 | 28.5 ± .4 | 29.6 ± .7 |

Figure 37:
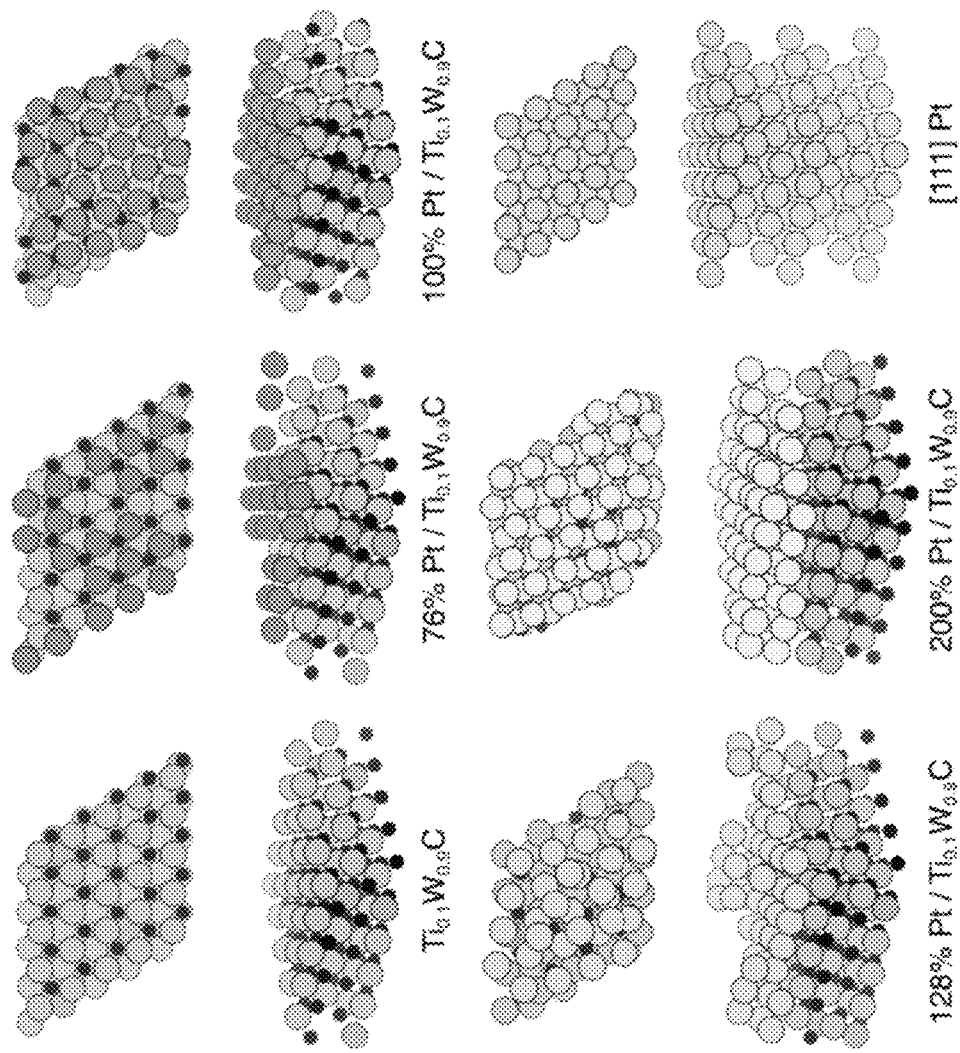
FIG. 37 shows model surfaces obtained from high temperature DFT equilibration.
Figure 38:
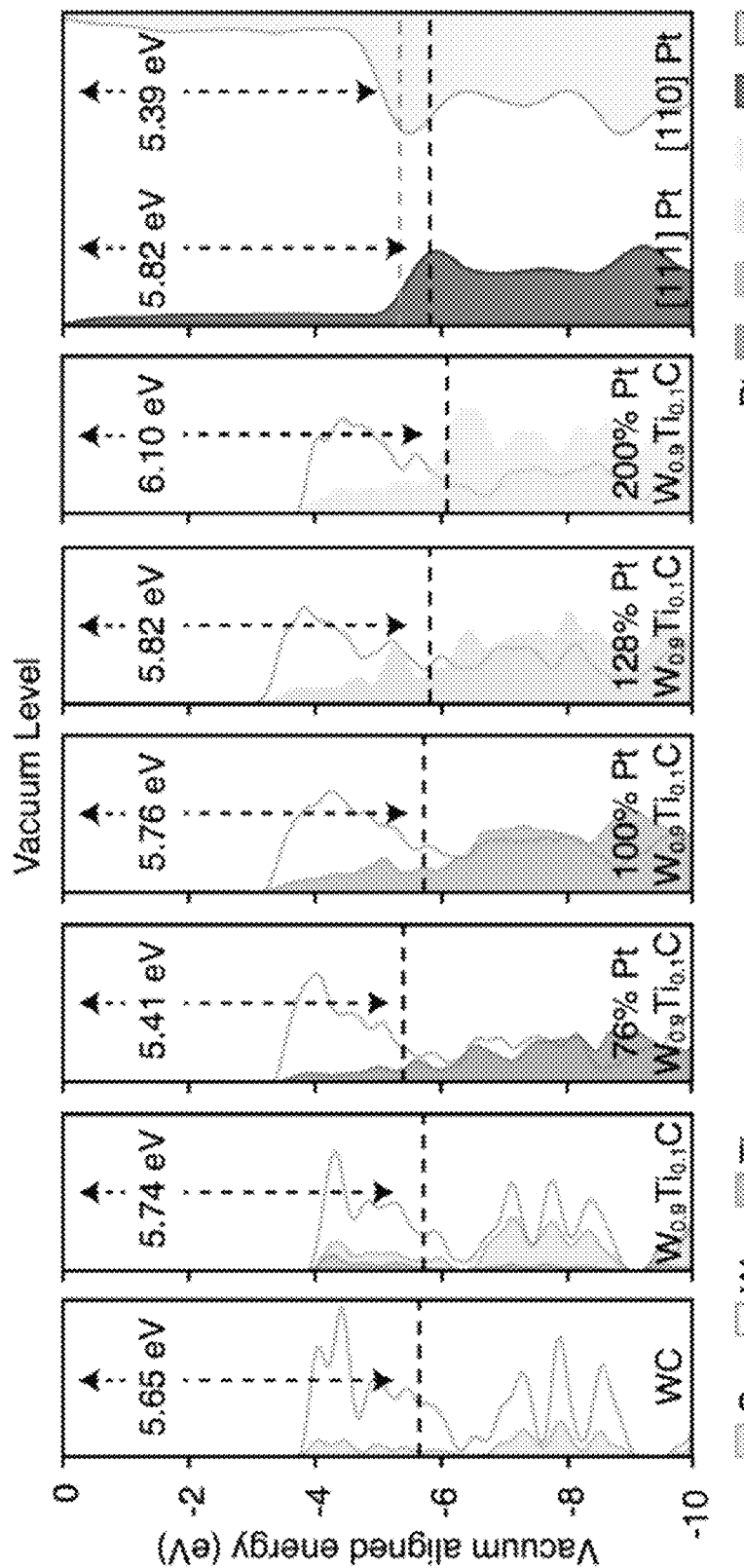
FIG. 38 shows elemental projected density of states aligned to the vacuum level.
Figure 39B:
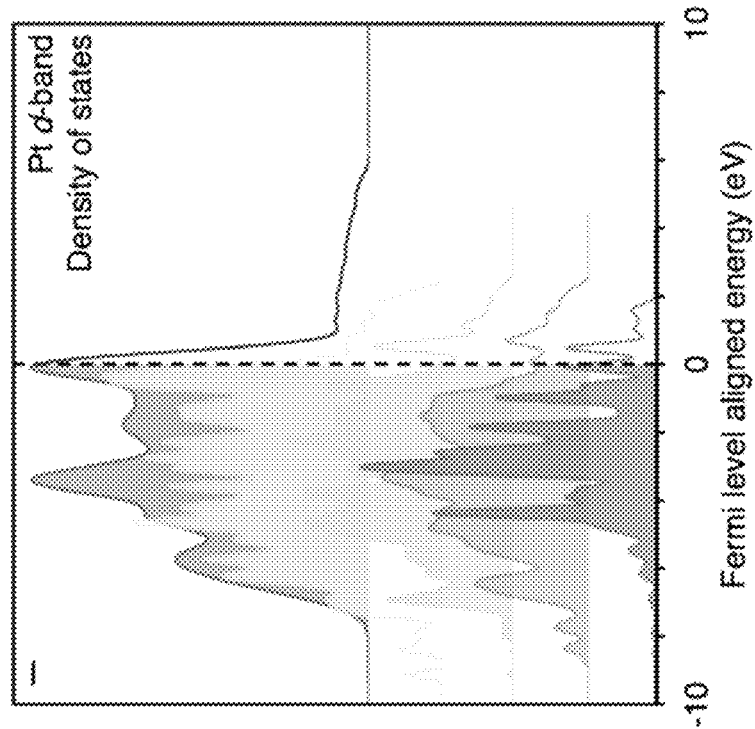
FIGS. 39A-39B show a comparison of Pt d-band centers from projected density of states.
Figure 39A:
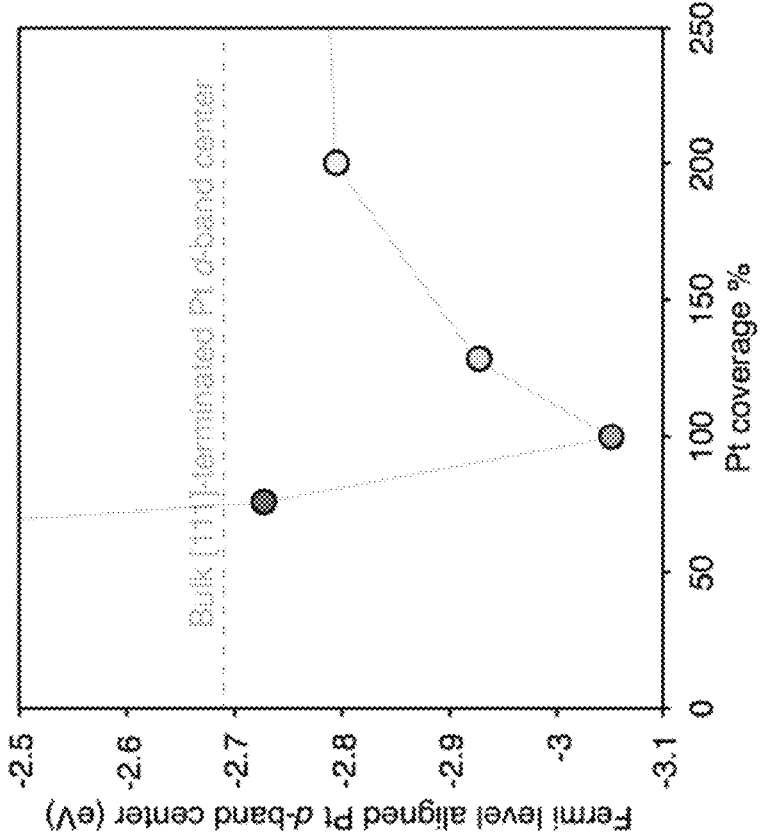

Note that the theoretical Tafel slope is 30 m/dec for a two-electron reaction where the rate-limiting step is Tafel recombination. Furthermore, the equivalent $j_o$ and $\beta$ for HER and HOR imply a symmetric charge transfer coefficient ($\alpha$) of 0.5. All materials tested above exhibit Tafel slopes close to the theoretical value. The similarity between the HOR and HER $j_o$ and $\beta$ values implies near-symmetric charge transfer for all materials.

and a 3-fold improvement in mass activity over the commercial catalysts (Table 3), and this enhancement is maintained after cycling. Enhanced catalytic activity is corroborated by DFT calculations for thermally equilibrated Pt/TiWC slabs. Specifically, it is shown that Fermi level matching causes minimal alterations to the workfunction of surface Pt by subsurface TiWC (see, W. Schottky, *Annalen der Physik* 362, 541-567 (1918), which is incorporated by reference in its entirety) (FIGS. 37 and 38), but the d-band center favorably downshifts from −2.7 eV to −2.8 eV for 2 ML Pt (FIG. 39). FIG. 37 shows the [111] terminated TiWC slab model with various surface concentrations of Pt. The structures shown are the result of the high temperature equilibrated ab initio molecular dynamics simulations on the slabs. FIG. 38 shows the elemental projected density of states (Fermi level depicted in dotted lines) for the materials examined herein. The rightmost DOS arise from the pure [111] and [110] surface terminated bulk Pt. The low loading of Pt results in low density, similar to the [110] Pt surface, whereas increased loading provokes the surface Pt to obtain a workfunction nearer to bulk [111] Pt. The decrease in workfunction beyond bulk [111] observed in the 200% loading is attributed to the increase in Pt—Pt packing density (91% more dense), which is favored in both the high temperature kinetic modeling and from DFT. FIG. 39 shows that the Pt d-band can be directly correlated to the CO binding. See, J. K. Nørskov, F. Studt, F. Abild-Pedersen, T. Bligaard, *Fundamental concepts in heterogeneous catalysis*. (John Wiley & Sons, 2014), which is incorporated by reference in its entirety. The d-band center, as obtained by the mean of the integral of the pDOS, is Morse-like: At low loading levels, the Pt acts highly localized and the d-band descriptor breaks down. At monolayer and greater loading the d-band center progresses to that of bulk [11] Pt. This downshift corresponds to a ca. 10 kcal/mol weaking in the CO binding energy (see, B. Hammer, Y. Morikawa, J. Norskov, *Phys. Rev. Lett.* 76, 2141-2144 (1996), which is incorporated by reference in its entirety), potentially making Pt$_{C-S}$ and PtRu$_{C-S}$ resistant to CO poisoning.

TABLE 3

HER activity determined using chronopotentiometry (CP) and chronoamperometry (CA).

The measurements performed in H$_2$-saturated 0.1M HClO$_4$ at 30° C. under a rotation rate of 2500 rpm. Initial activities were averaged from triplicate electrode mountings. $\eta@j_{geo-10}$ is the overpotential required to drive a geometric current density of 10 mA/cm$^2$ as determined by CP measurements. Conversely, $j_{geo}@\eta$ = 50 mV is the geometric current density achieved at a fixed overpotential of 50 mV as determined by CA measurements. The achieved current densities were also normalized by surface sites (determined from CO-stripping measurements) to obtain $j_{specific}@\eta$ = 50 mV and by mass of NM loaded to obtain $j_{mass}@\eta$ = 50 mV. The specific activity was used to determine the turnover frequency (TOF@$\eta$ = 50 mV), where the TOF is given as mol H$_2$ per mol of surface sites per second.

| Catalyst | $\eta@j_{geo-10}$ (mV) | $j_{geo}@\eta$ = 50 mV (mA/cm$^2_{geo}$) | $j_{specific}@\eta$ = 50 mV ($\mu$A/cm$^2_{CO-ECSA}$) | $j_{mass}@\eta$ = 50 mV (mA/mg$_{NM}$) | TOF@$\eta$ = 50 mV (1/s) |
|---|---|---|---|---|---|
| Pt$_{comm}$ | 39.4 ± .7 | 13.1 ± .2 | 379 ± 33 | 258 ± 4 | 0.80 ± 0.08 |
| PtRu$_{comm}$ | 42.4 ± .8 | 13.7 ± .3 | 272 ± 20 | 269 ± 6 | 0.65 ± 0.05 |
| Pt$_{C-S}$ | 37.5 ± .9 | 15.1 ± .4 | 1482 ± 76 | 740 ± 20 | 3.53 ± 0.18 |
| Pt$_{C-S}$ post 10,000 | 43.8 ± .7 | 12.4 ± .1 | 1221 ± 5 | 610 ± 3 | 2.91 ± 0.01 |
| PtRu$_{C-S}$ | 38.1 ± 1.2 | 13.9 ± .7 | 987 ± 58 | 719 ± 40 | 2.35 ± 0.14 |
| PtRu$_{C-S}$ post 10,000 | 38.2 ± .3 | 14.4 ± .1 | 1226 ± 8 | 742 ± 4 | 3.01 ± 0.02 |
| Pt$_{direct}$ | 148 ± 4 | 0.45 ± .03 | N.R. | N.R. | N.R. |
| Vulcan Carbon | 594 ± 6 | 0.03 ± .00 | N.R. | N.R. | N.R. |

N.R.—not reported

Figures 29A, 29B:
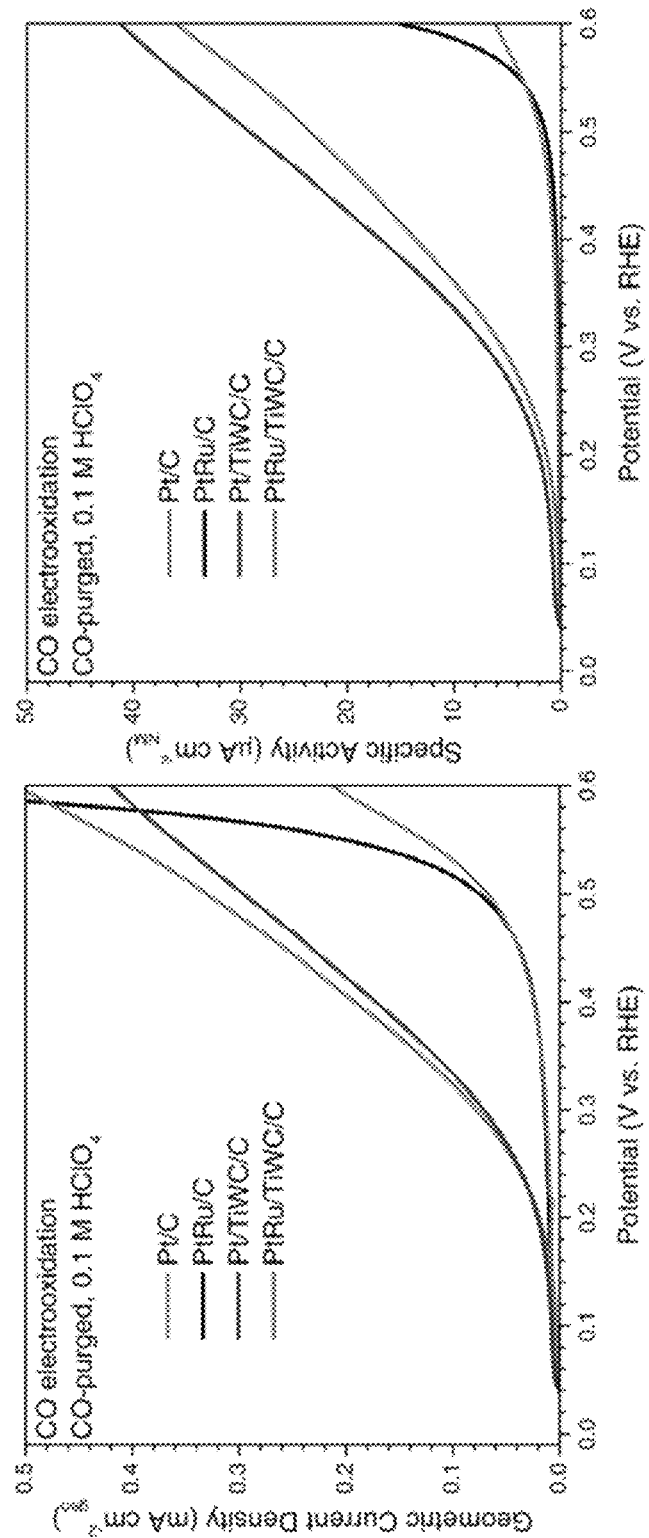
FIGS. 29A-29B show CO electrooxidation activity: LSVs with iR compensation showing geometric current densities (FIG. 29A) and specific activities (FIG. 29B) for various catalysts.

At an HER overpotential of 50 mV, both core-shell materials exhibit a 4-fold improvement in specific activity Indeed, HOR experiments performed in the presence of CO confirm that the TiWC cores mitigate the poisoning effect of CO on Pt and PtRu monolayers. While 1000 ppm of CO contamination markedly increases the HOR overpotential by ca. 400 mV for $PtRu_{comm}$ (FIG. 9C) and by ca. 200 mV for a state-of-the-art Pt/PtSn core-shell catalyst (see, Z. Liu, G. S. Jackson, B. W. Eichhorn, *Angew. Chem. Int. Ed. Engl.* 49, 3173-3176 (2010), which is incorporated by reference in its entirety), both $Pt_{C-S}$ and $PtRu_{C-S}$ catalyze HOR with an overpotential as low as 50 mV. Under pure CO, both $Pt_{C-S}$ and $PtRu_{C-S}$ showed an approximately 200 mV lower onset potential and a 30-fold enhancement in specific activity for CO electrooxidation at 400 mV when compared to the commercial catalysts (FIG. 29). FIG. 29 shows LSVs with iR compensation showing geometric current densities (FIG. 29A) and specific activities (FIG. 29B) for various catalysts performing CO electrooxidation in CO-saturated 0.1 M $HClO_4$ at 30° C. and 2 mV/s under a rotation rate of 1600 rpm. For comparison, the LSV current density at +0.4 V is improved by a factor of 8 for the NM/TMC core-shell materials relative to $PtRu_{comm}$ on a geometric basis and by a factor of 30 on a specific activity basis.

Figure 9D:
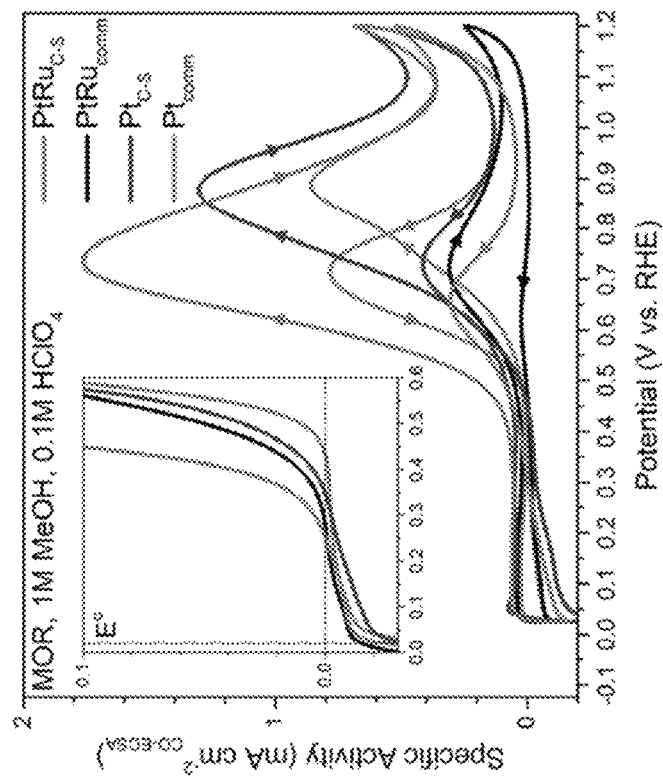
Figure 9C:
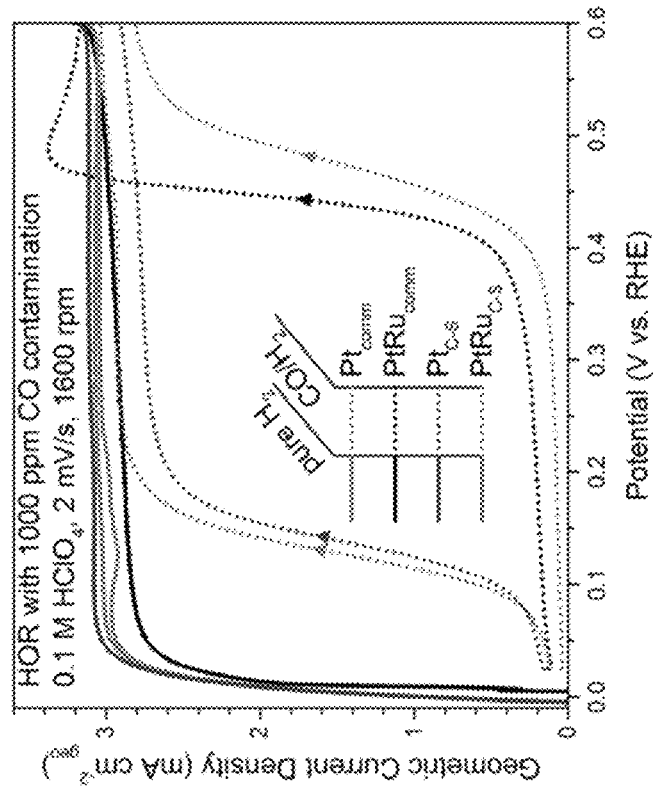

By decreasing the CO binding strength, the TiWC core is responsible for the enhanced MOR kinetics observed for $PtRu_{C-S}$ compared to $PtRu_{comm}$, which display steady-state turnover frequencies (TOF) of 15.9 $min^{-1}$ and 3.6 $min^{-1}$ at 0.6 V, respectively (Table 4). The low onset potential (ca. 250 mV) for both $PtRu_{C-S}$ and $PtRu_{comm}$ (FIG. 9D, inset and FIG. 30) originates in the bifunctional MOR mechanism, which is known to enhance the performance of PtRu materials compared to a monometallic Pt catalyst. See, T. J. Schmidt, H. A. Gasteiger, R. J. Behm, *Electrochem. Commun.* 1, 1-4 (1999), and A. V. Tripković et al., *Electrochim. Acta* 47, 3707-3714 (2002), each of which is incorporated by reference in its entirety. A higher specific activity over a wide potential window and ca. 100 mV lower onset potential for $Pt_{C-S}$ relative to $Pt_{comm}$ further supports favorable modulation of Pt monolayers by the TiWC core (FIGS. 9D, 30, and 40).

Figure 30B:
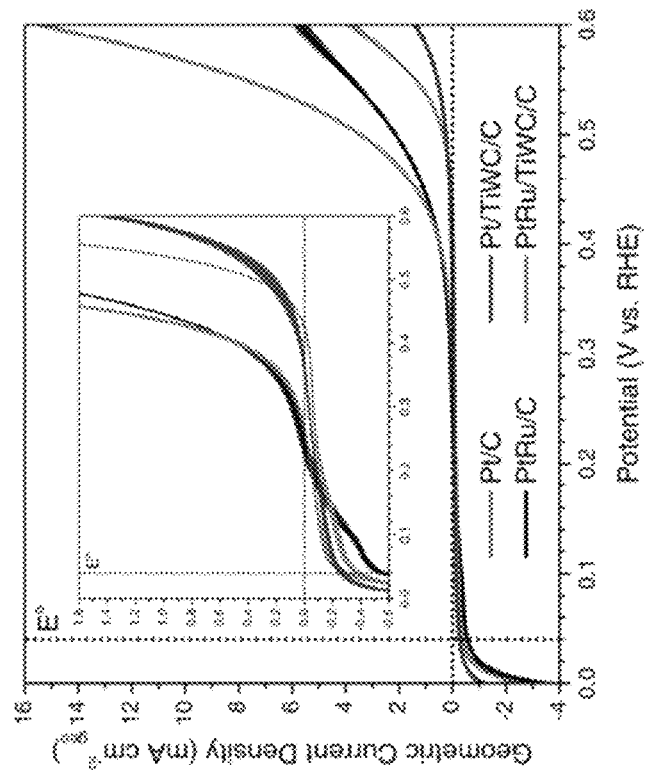
FIGS. 30A-30D show MOR Initial Activity Comparison and Reproducibility Study.
Figure 30A:
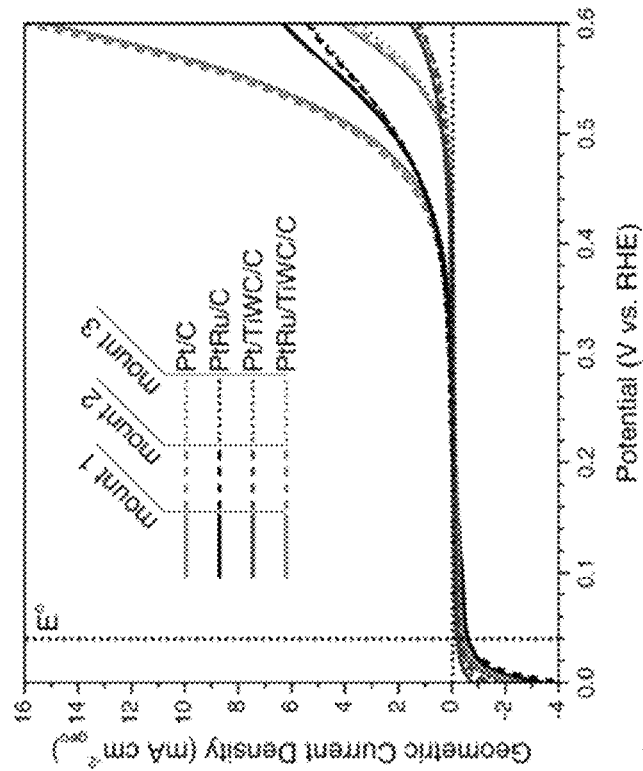
Figure 30C:
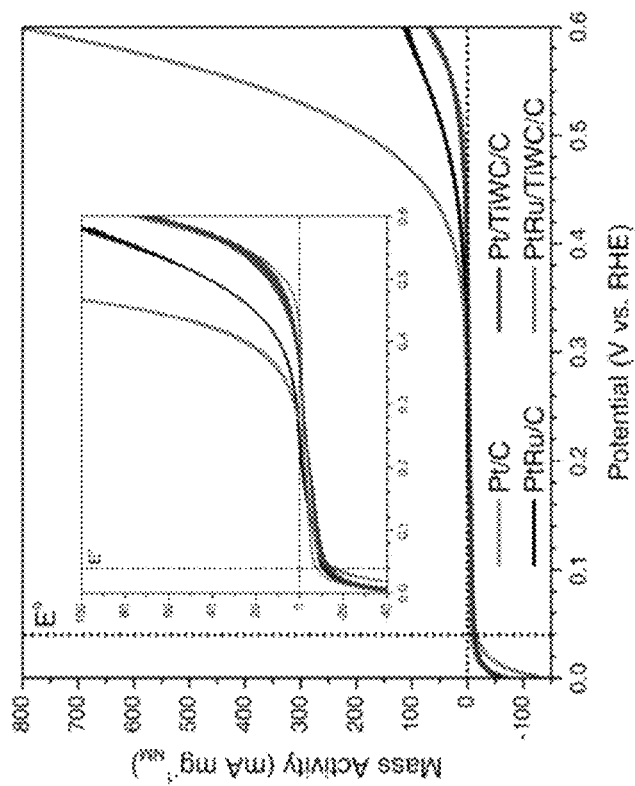
Figure 30D:
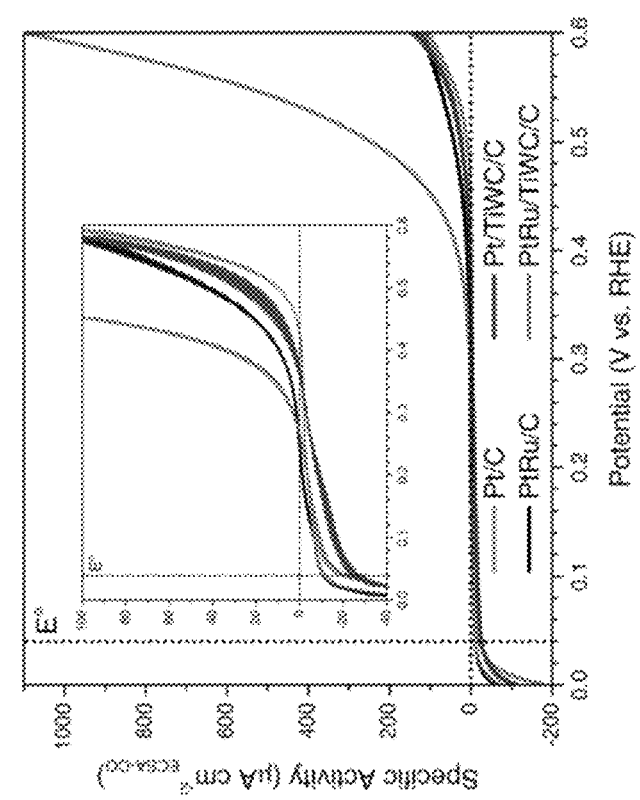

FIG. 30A shows LSVs with iR compensation normalized by geometric current density for the NM/TMC core-shell catalysts and commercial controls at 10 mV/s in 1 M MeOH and 0.1 M $HClO_4$ at 30° C. and 1000 rpm. Each catalyst ink was mounted on three separate electrodes to examine measurement reproducibility. The vertical line represents $E_0$, the thermodynamic reversible potential for MOR, which is 0.02 V vs. RHE. FIG. 30B shows the LSVs from FIG. 30A with the triplicate runs averaged at each 1 mV interval. The line thickness includes standard deviation error bars. The inset panel is magnified to show differences in the onset potential for MOR. FIG. 30C shows the LSVs from FIG. 30B normalized by specific surface area determined from CO stripping. The errors in the specific surface area measurements are propagated with the errors from the triplicate runs. The inset panel is magnified to show differences in the onset potential for MOR. FIG. 30D shows the LSVs from FIG. 30B normalized by loaded NM mass with errors propagated. The inset panel is magnified to show differences in the onset potential for MOR.

Figure 40B:
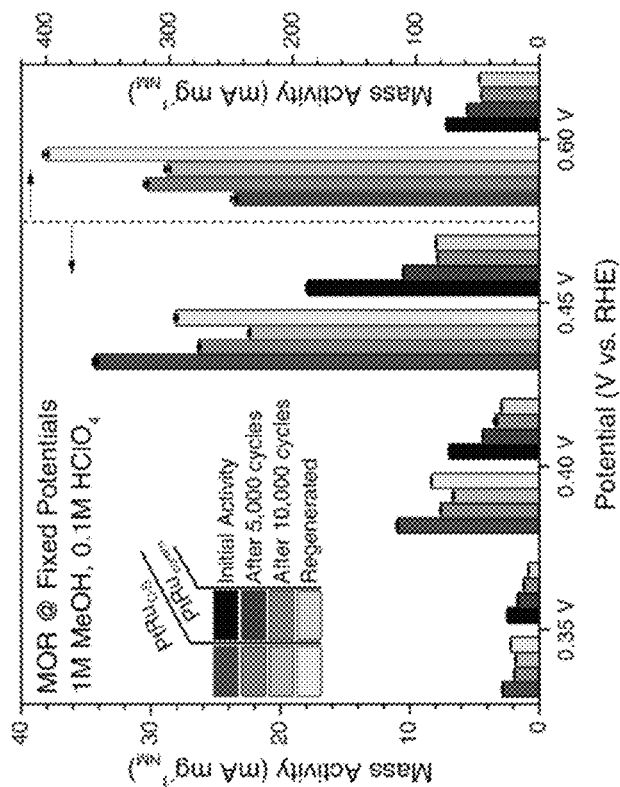
FIGS. 40A-40D show MOR Stability Study.
Figure 40A:
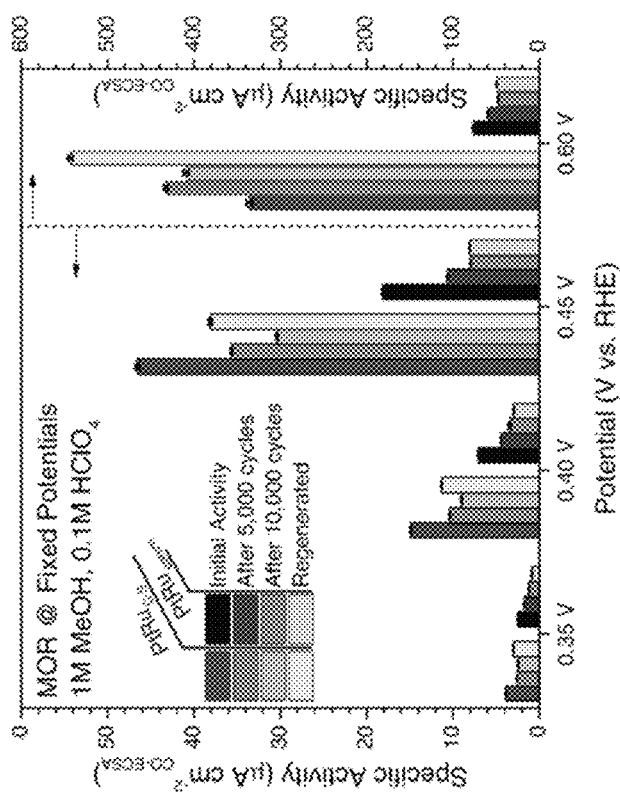
Figures 40C, 40D:
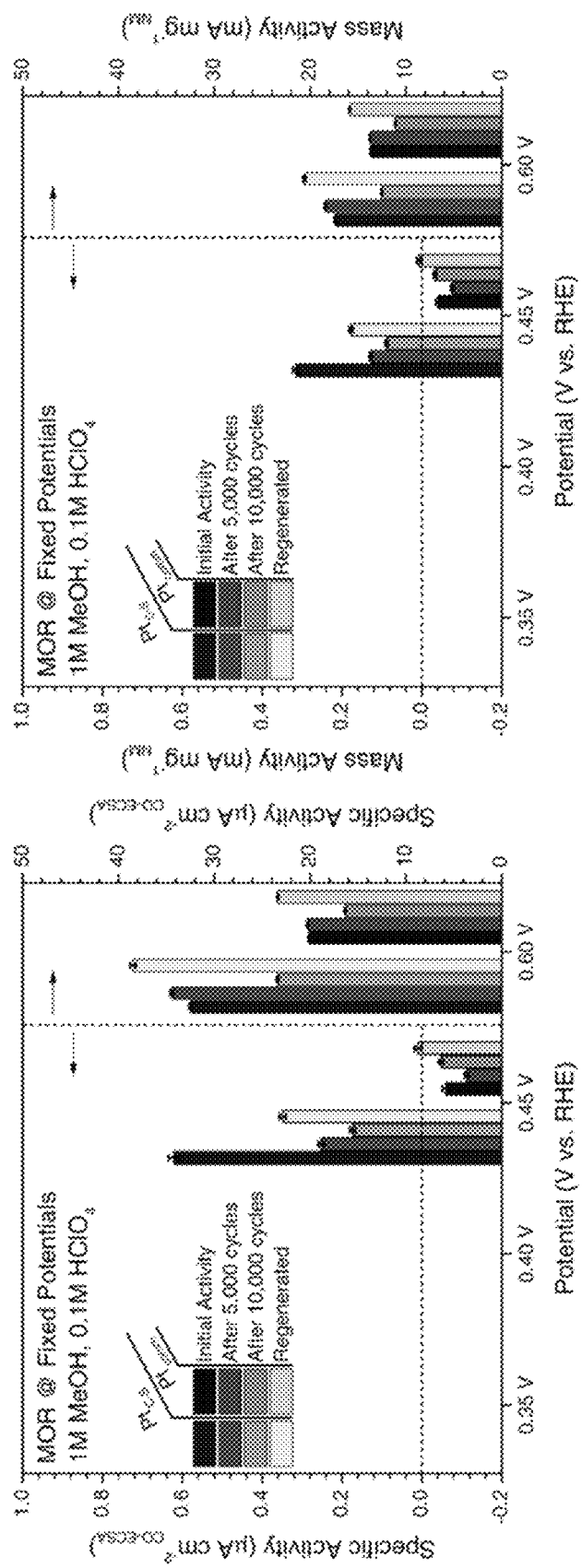

FIG. 40 shows Chronoamperometry studies held at fixed potentials for 15 min intervals in 1 M MeOH and 0.1 M $HClO_4$ at 30° C. and 1000 rpm (0.35, 0.4, and 0.45 V) or 2500 rpm (0.6 V). The final current density was averaged over the last 1 min of the measurement. Initial activity measurements were performed after conditioning cycles. The chronoamperometry measurements were repeated after performing 5,000 cycles from −50 to 600 mV at 100 mV/s, after 10,000 cycles from −50 to 600 mV at 100 mV/s, and after regeneration (dipping the electrode for 2 min in 0.1 M NaOH solution).

TABLE 4

MOR initial and post-stability steady-state kinetic estimates

Figures 9E, 9F:
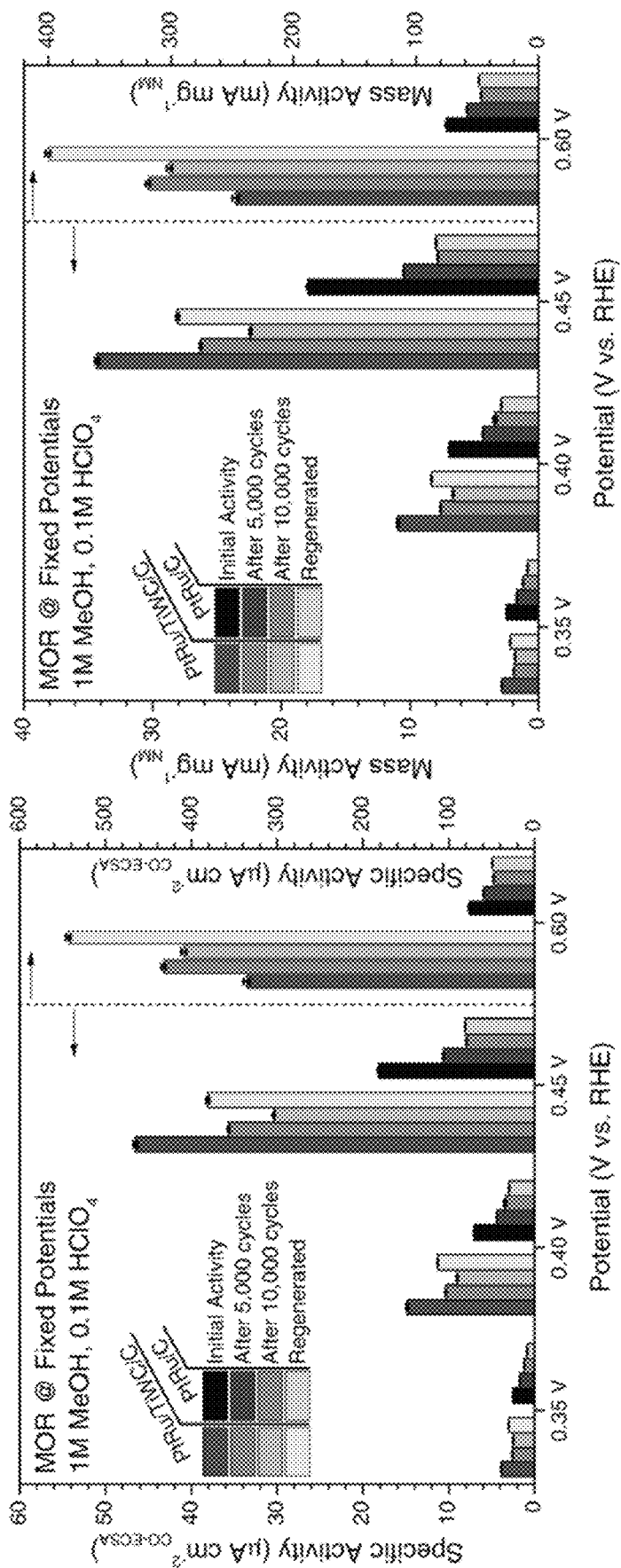

Kinetic estimates were obtained from steady-state chronoamperometry measurements performed over 15 min intervals held at fixed potentials. The data is shown in FIG. 9E and FIG. 40. Turnover frequencies (TOFs) were estimated from the specific activity measurements at 0.45 V and 0.6 V assuming complete 6 electron transfer oxidations. This assumption is reasonable for $PtRu_{comm}$ and $PtRu_{C-S}$ at both 0.45 and 0.6 V (see, E. C. Weigert, a. L. Stottlemyer, M. B. Zellner, J. G. Chen, *J. Phys. Chem. C* 111, 14617-14620 (2007), which is incorporated by reference in its entirety). As such, TOF is given as mol $CO_2$ per mol of surface sites per minute.

| Catalyst | TOF@0.45 V Initial ($min^{-1}$) | TOF@0.45 V Post 10,000 and Regeneration ($min^{-1}$) | TOF@0.6 V Initial ($min^{-1}$) | TOF@0.6 V Post 10,000 and Regeneration ($min^{-1}$) |
|---|---|---|---|---|
| $Pt_{comm}$ | 0.00 ± .00 | 0.00 ± .00 | 0.96 ± .08 | 1.11 ± .10 |
| $Pt_{C-S}$ | 0.03 ± .00 | 0.02 ± .00 | 1.55 ± .07 | 1.83 ± .08 |
| $PtRu_{comm}$ | 0.86 ± .06 | 0.38 ± .03 | 3.65 ± .26 | 2.35 ± .17 |
| $PtRu_{C-S}$ | 2.20 ± .05 | 1.80 ± .04 | 15.87 ± .37 | 25.69 ± .53 |

$PtRu_{C-S}$ also demonstrates enhanced stability compared to $PtRu_{comm}$ (FIGS. 9E, 31 and 40). After 10,000 cycles, $PtRu_{comm}$ loses more than 50% of its steady-state activity at 0.35 V, 0.4 V, and 0.45 V, whereas $PtRu_{C-S}$ decreases by only 35% at these potentials and actually improves at 0.6 V. Notably, a simple 2 min alkaline dip partially regenerated the activity of $PtRu_{C-S}$ at all potentials, but had no appreciable benefit for $PtRu_{comm}$. After regeneration, the overall loss in activity at low potentials for $PtRu_{C-S}$ was 20%. The final TOF at 0.6 V after 10,000 cycles and regeneration was 25.7 $min^{-1}$ for $PtRu_{C-S}$ and 2.3 $min^{-1}$ for $PtRu_{comm}$, representing an order of magnitude improvement of our core-shell material over the commercial catalyst.

Figures 31A, 31B:
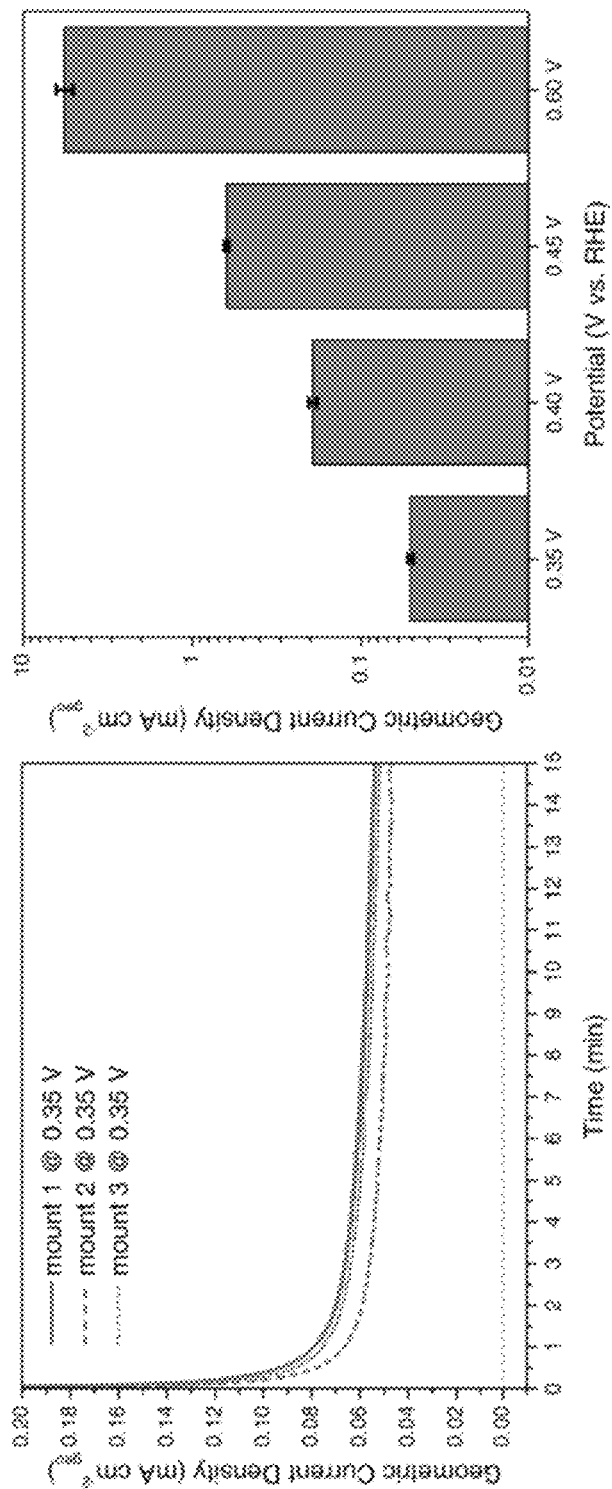
FIGS. 31A-31F show detailed analysis of PtRu$_{C-S}$ performance for MOR.
Figures 31C, 31D:
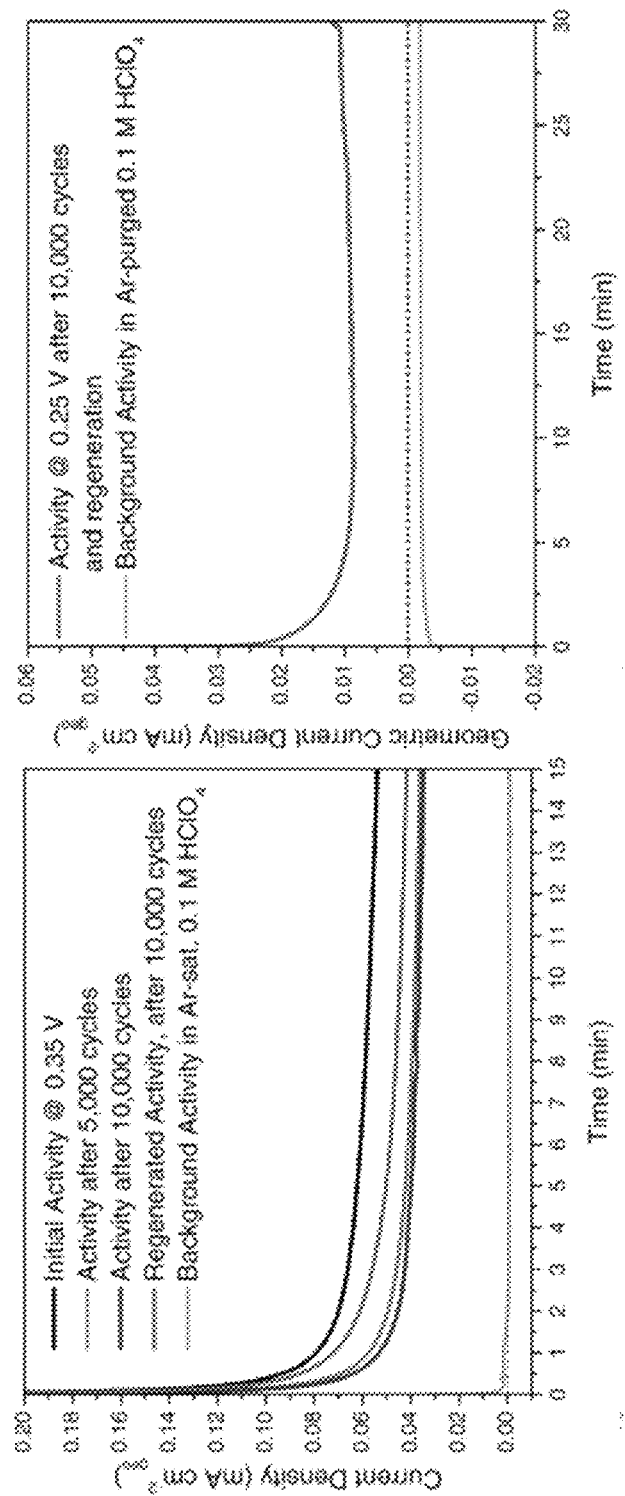
Figures 31E, 31F:
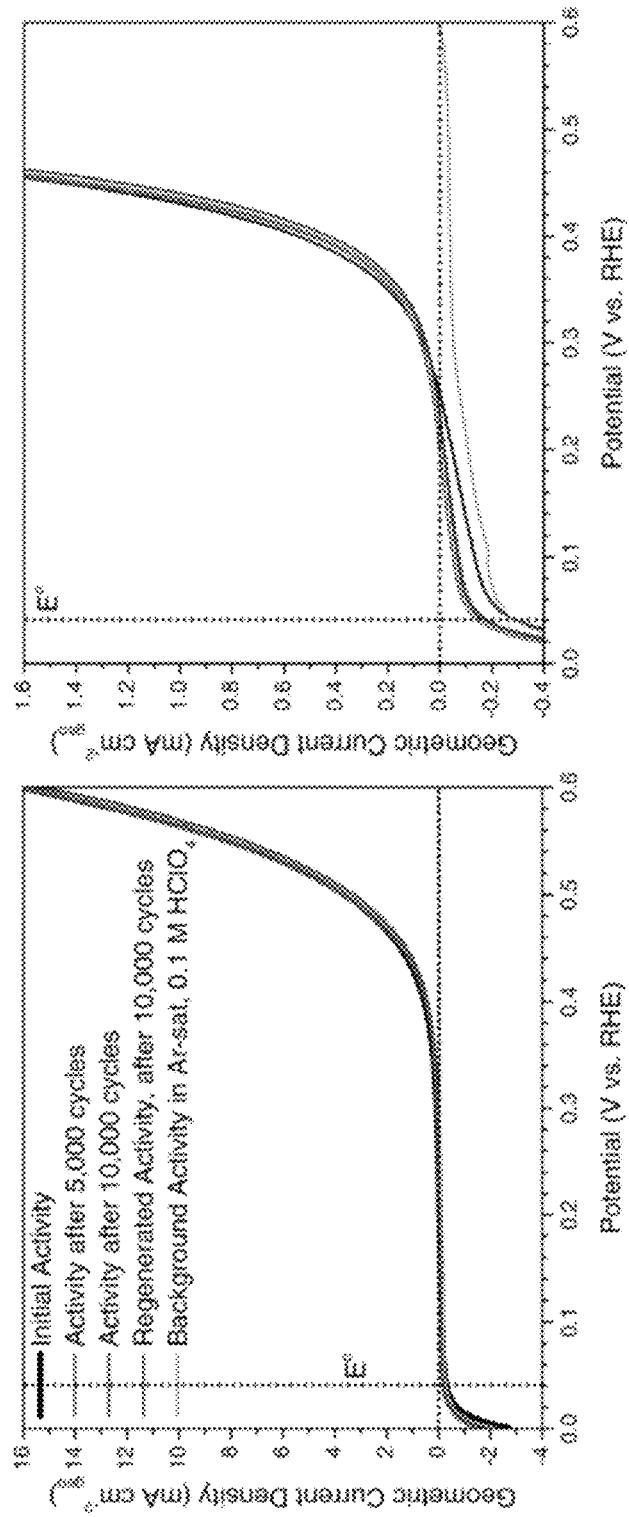

In FIG. 31, All measurements were performed in 1 M MeOH and 0.1 M $HClO_4$ at 30° C. under a rotation rate of 1000 rpm with iR compensation applied. FIG. 31A shows initial activity CA curves at 0.35 V for triplicate mountings. FIG. 31B shows initial activity reproducibility study obtained from averaging the current response over the last minute of CA data collected for 15 min for triplicate electrode mountings. Representative raw CA data is shown in FIG. 31A. FIG. 31C shows representative CA data collected at 0.35 V over 15 min before, during, and after stability cycling as well as regeneration. The background current is obtained in the absence of MeOH. Data averaged over the last minute at various potentials are presented in FIG. 9E-9G. FIG. 31D shows after 10,000 cycles and regeneration in alkaline media, $PtRu_{C-S}$ maintains a positive current density even at the low potential of 0.25 V over 30 min, while it did not exhibit any activity at 0.25 V before stability cycling (data not shown). FIG. 31E shows LSVs at 10 mV/s before, during, and after stability cycling as well as regeneration. FIG. 31F shows a magnified version of panel FIG. 31E showing the onset potential for MOR.

Figure 9G:
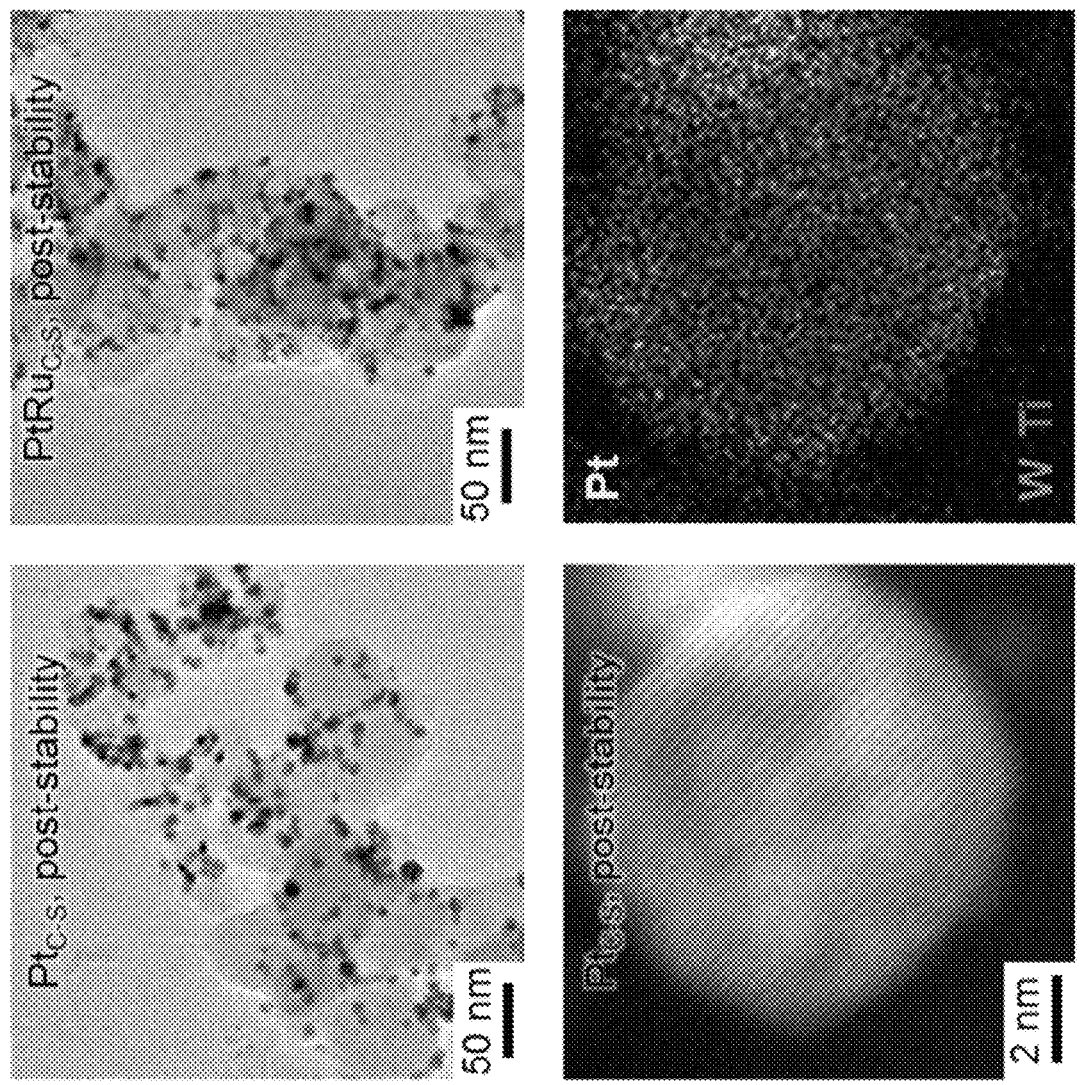
Figures 10A, 10B, 10C, 10D:
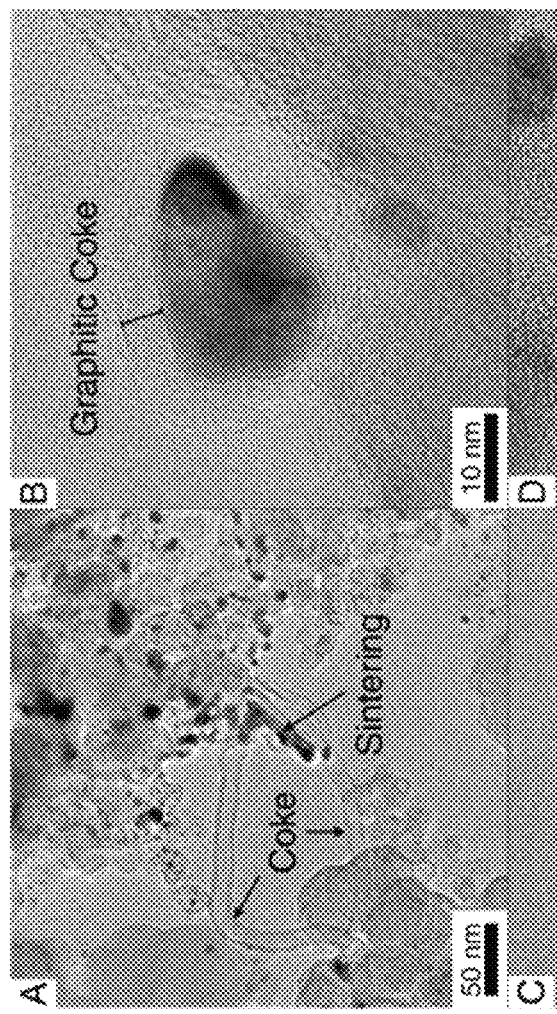
FIGS. 10A-10F show comparison of core-shell Pt/TiWC/C NPs obtained via the silica-encapsulation and removal method vs. Pt/TiWC/C prepared by directly carburizing carbon-supported $(NH_4)_2PtCl_6/TiWO_x$ NPs.
Figure 10E:
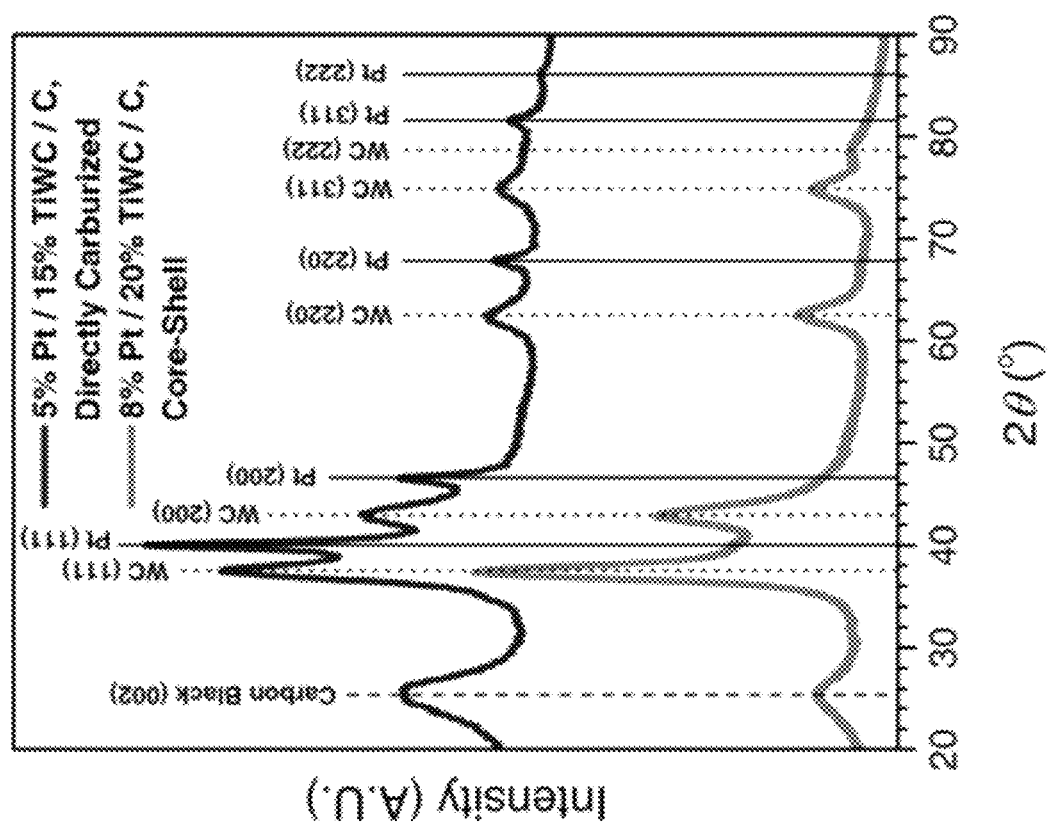
Figure 10F:
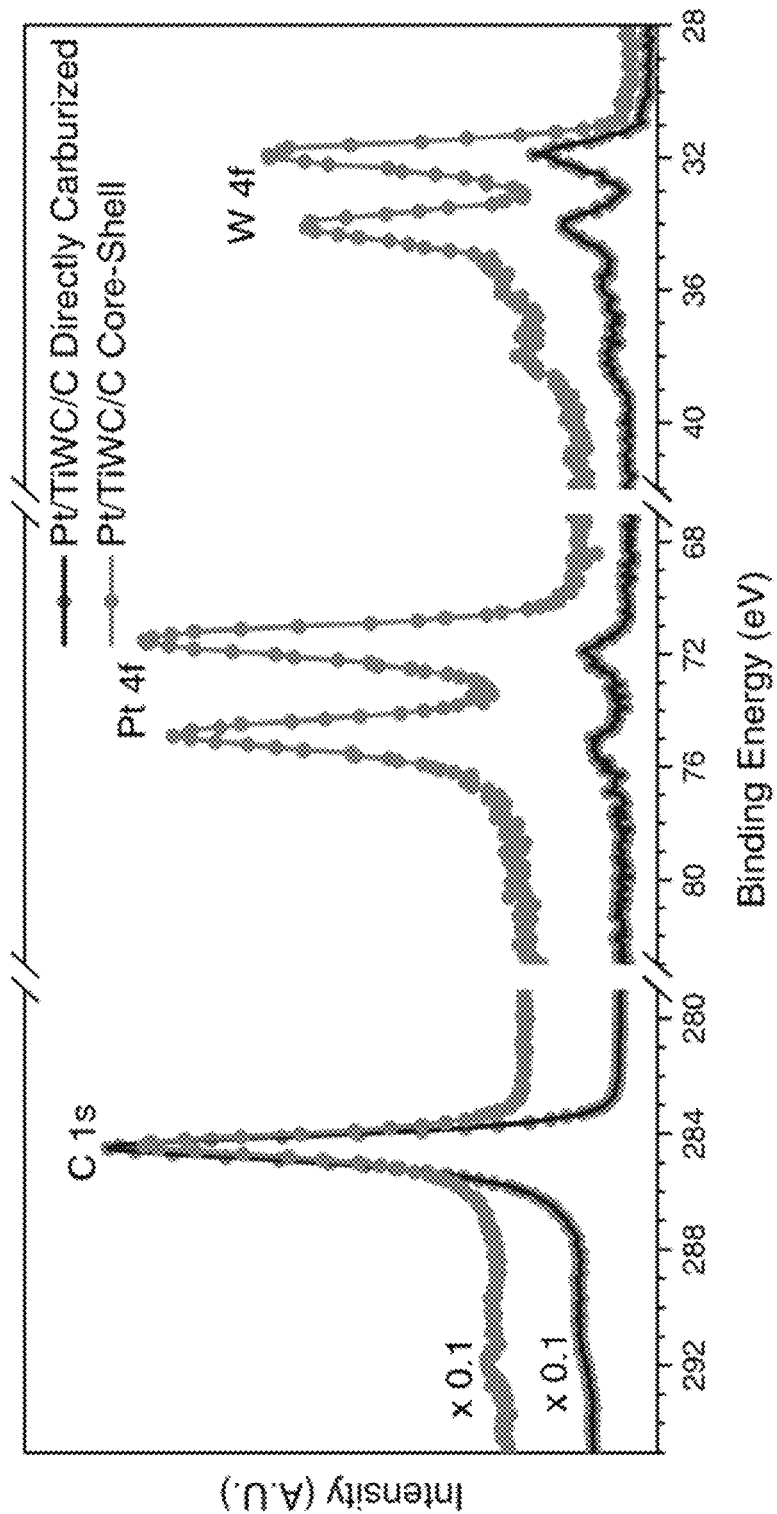
Figure 11A:
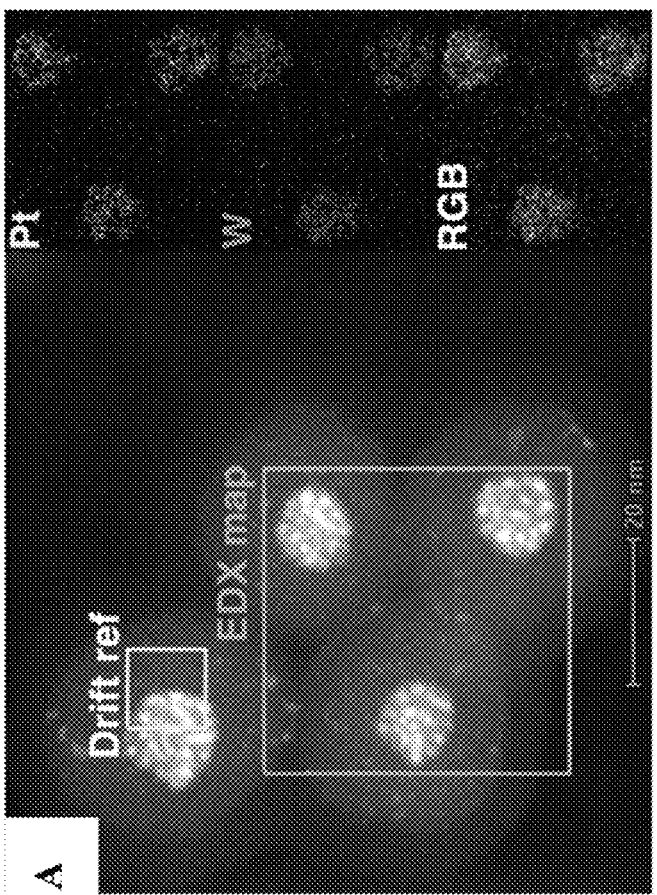
FIGS. 11A-11B show structural changes in $SiO_2/(NH_4)_2PtCl_6/WO_x$ system during carburization.
Figure 11B:
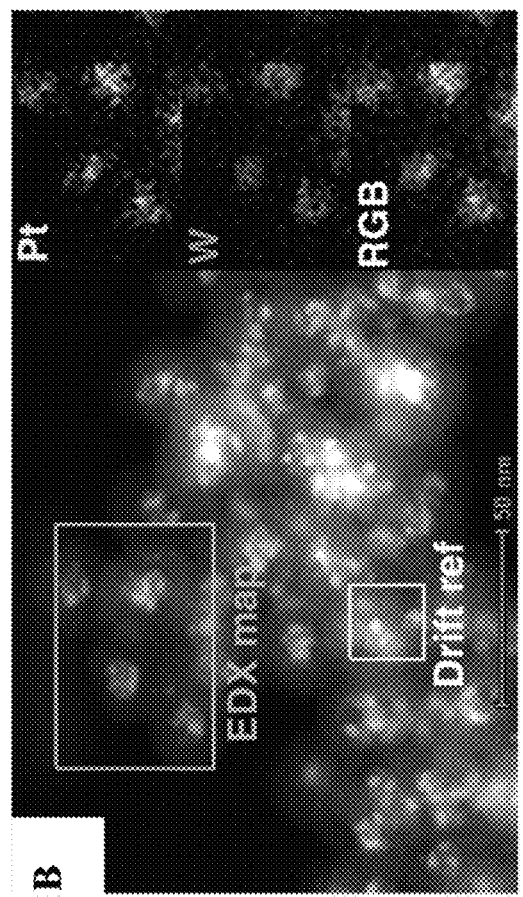
Figure 32:
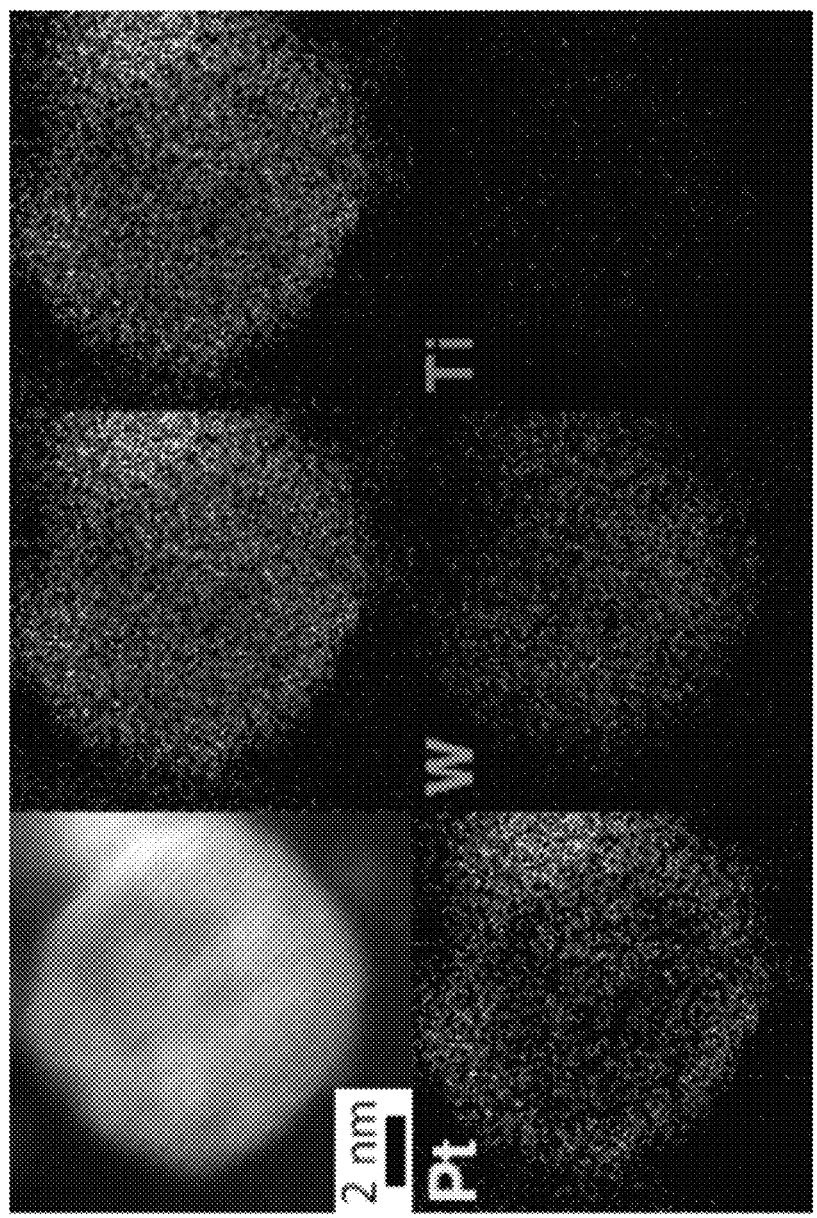
FIG. 32 shows microscopic evidence of Pt$_{C-S}$ stability after cycling.
Figure 33A:
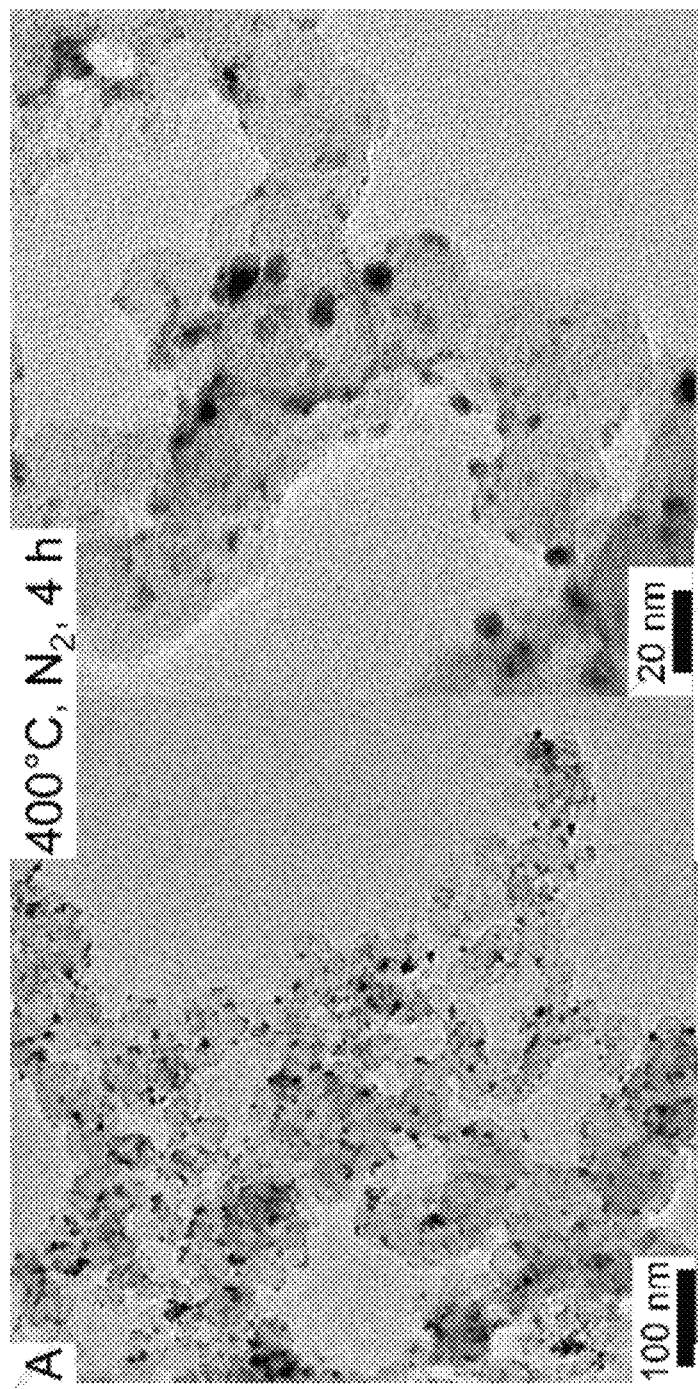
FIGS. 33A-33F show microscopic analysis of Pt$_{sub-ML}$ after various heat treatments.
Figure 33B:
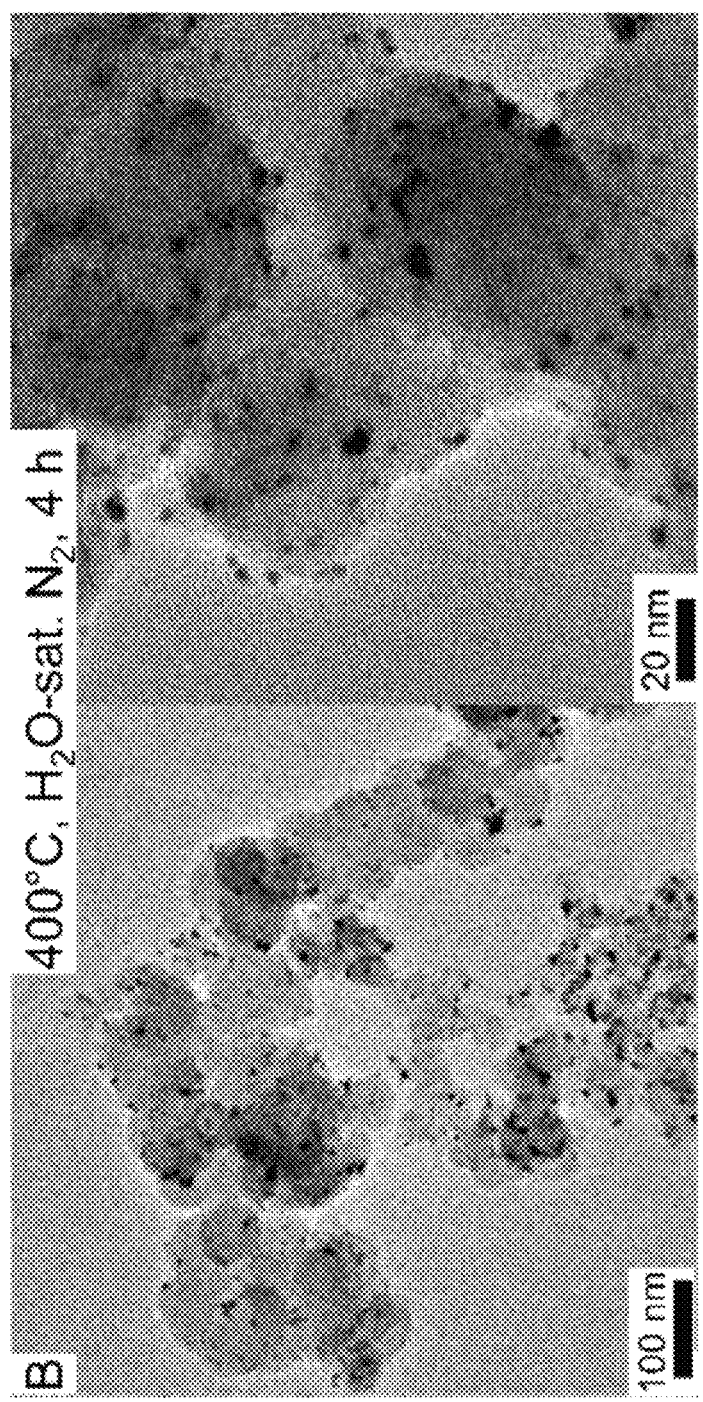
Figure 33C:
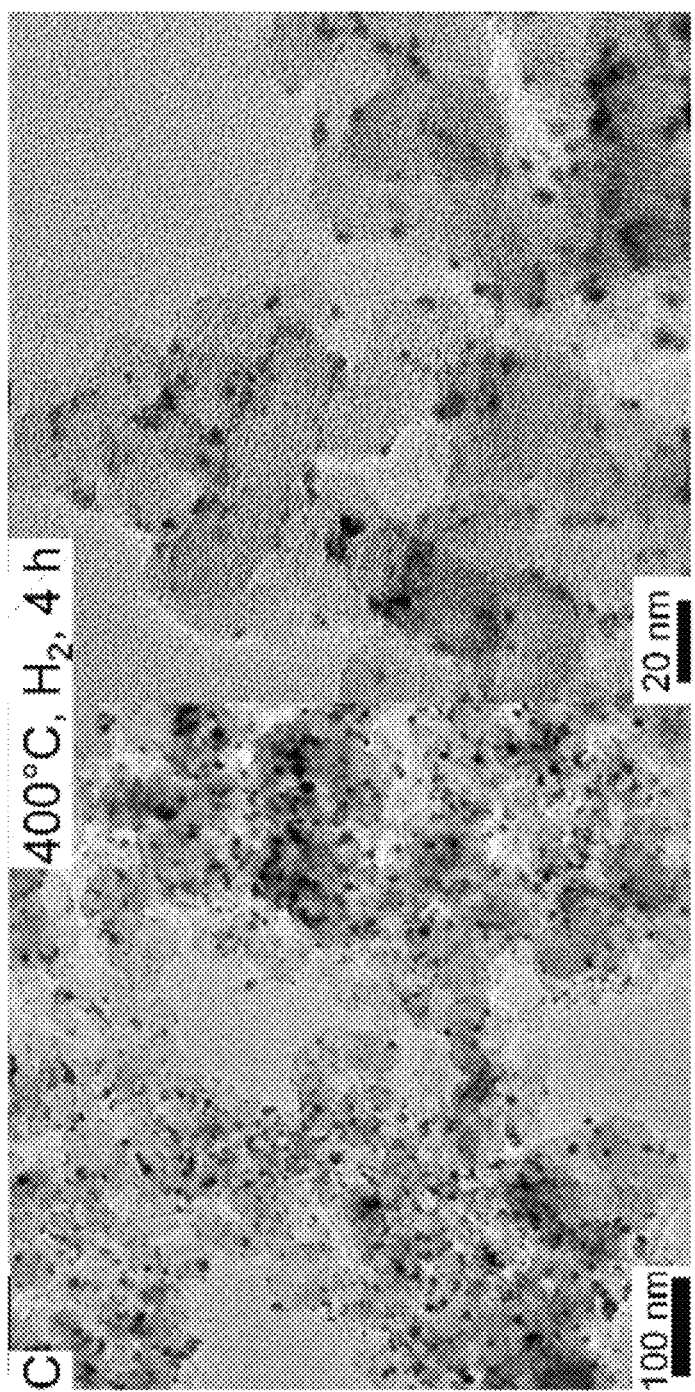
Figure 33D:
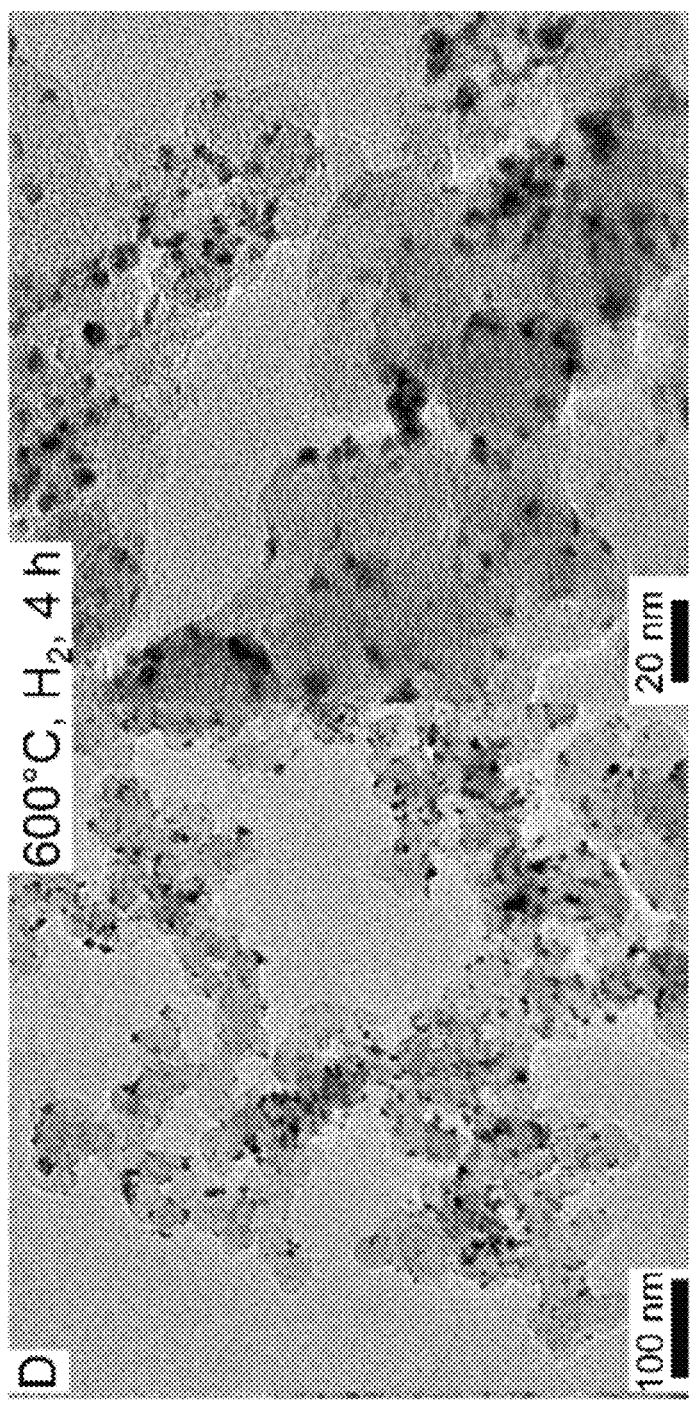
Figure 33E:
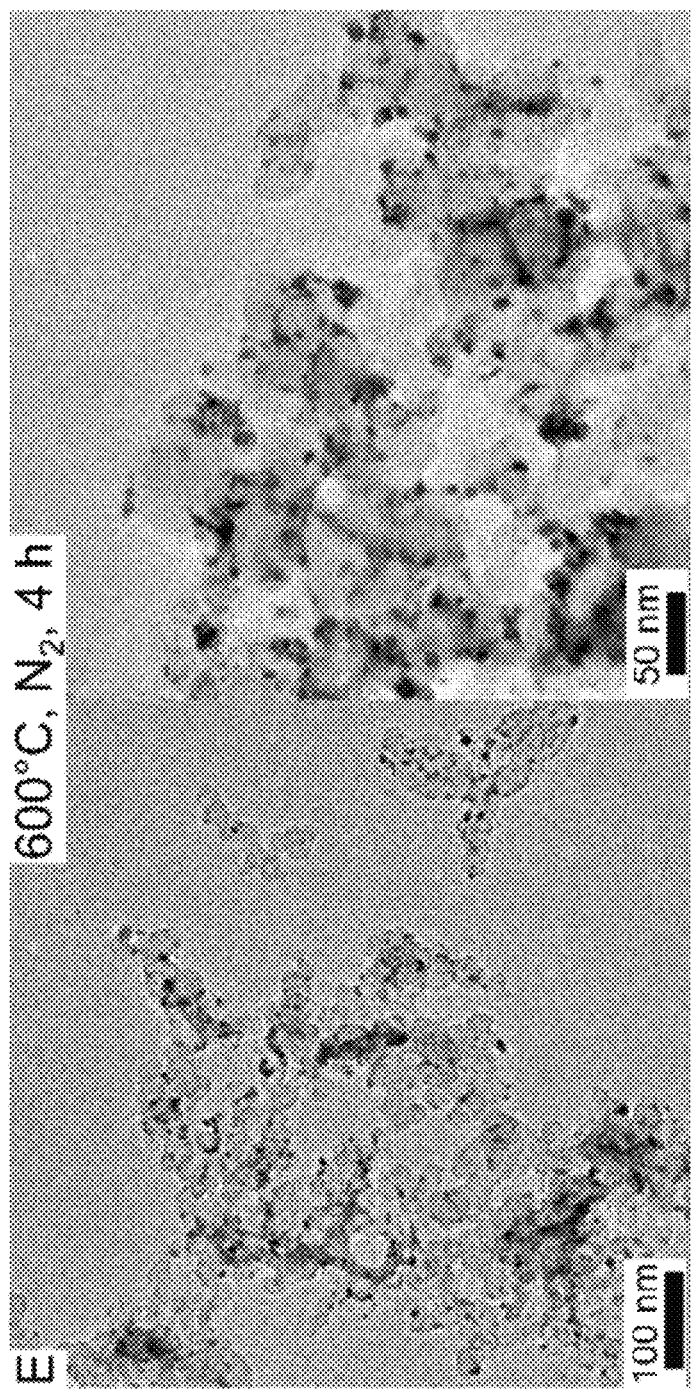
Figure 33F:
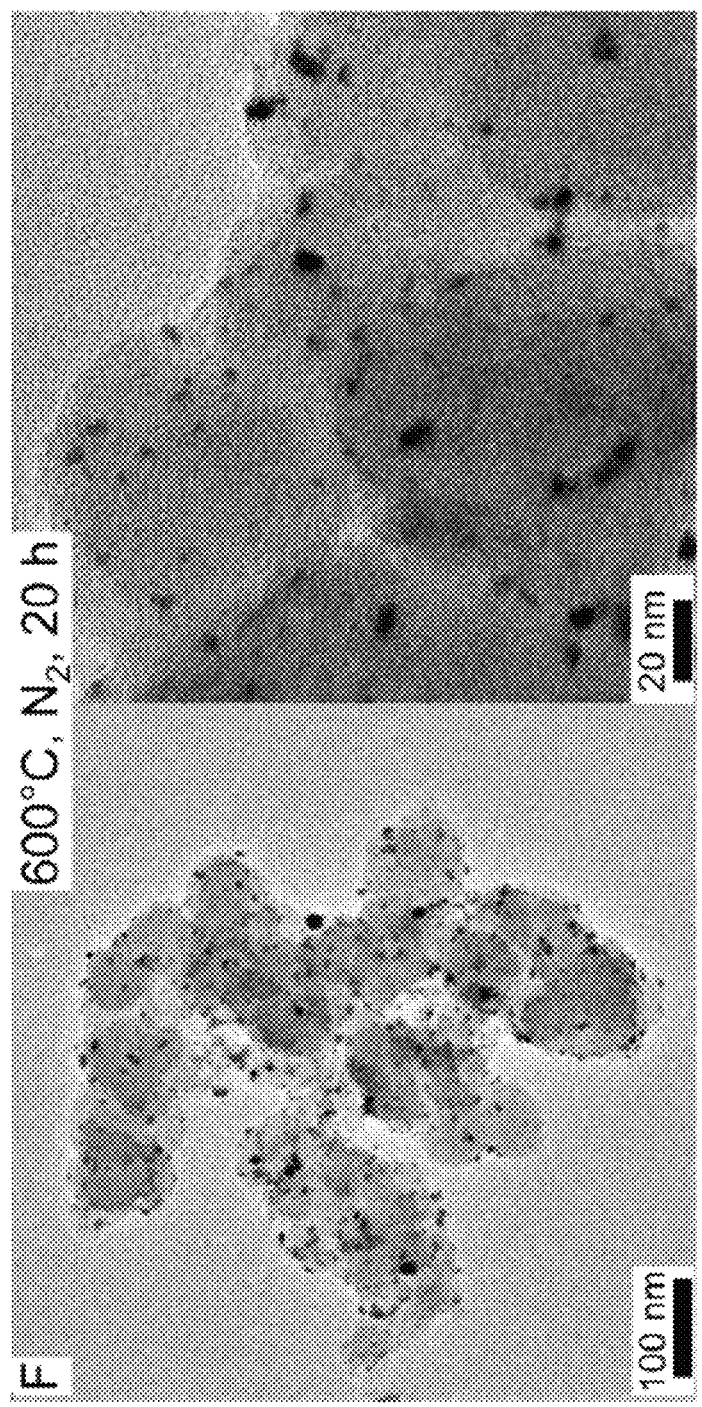

No appreciable deactivation via particle sintering was observed for the core-shell materials after 10,000 cycles (FIG. 9G). HR-STEM and EDX mapping of $Pt_{C-S}$ after stability cycling show a highly crystalline composite nanoparticle with an intact Pt shell and a well-alloyed TiWC core (FIGS. 9G and 32). FIG. 32 shows HR-STEM and EDX map of $Pt_{C-S}$ after stability cycling from −50 mV to 600 mV.

The individual Pt, W, and Ti maps are shown as well as an overlay of all three elements and an overlay of just Pt and W.

The improved stability of the core-shell materials is attributed both to the predicted strong binding of the NM shell to the metal-terminated WC surface and to the lower surface free energies of large nanoparticles relative to the surface free energies of ultrasmall nanoparticles. See, E. F. Holby, W. Sheng, Y. Shao-Horn, D. Morgan, *Energy Environ. Sci.* 2, 865 (2009), which is incorporated by reference in its entirety.

Remarkably, the high temperature self-assembly process employed here is general and permits comprehensive control of the entire core-shell architecture for a variety of early and late transition metals (FIG. 42). Using TiWC cores, we successfully synthesized nanoparticles with varying sizes (3-10 nm), mono- and bimetallic shell compositions (Ru, Rh, Ir, Pt, and Au), and NM coverages (ca. 0.5-3 ML) (FIGS. 14-16 and 42A).

Figure 14:
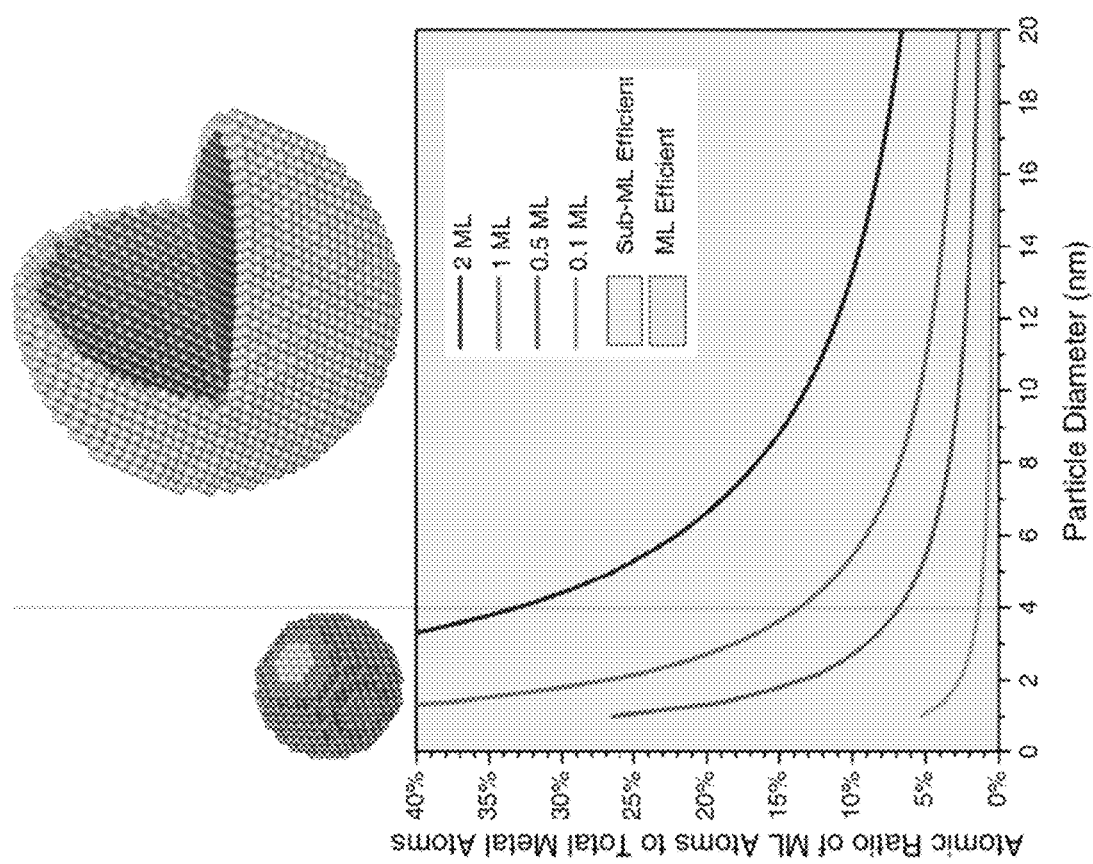
FIG. 14 shows core-shell NP design space.
Figures 15A, 15B, 15C:
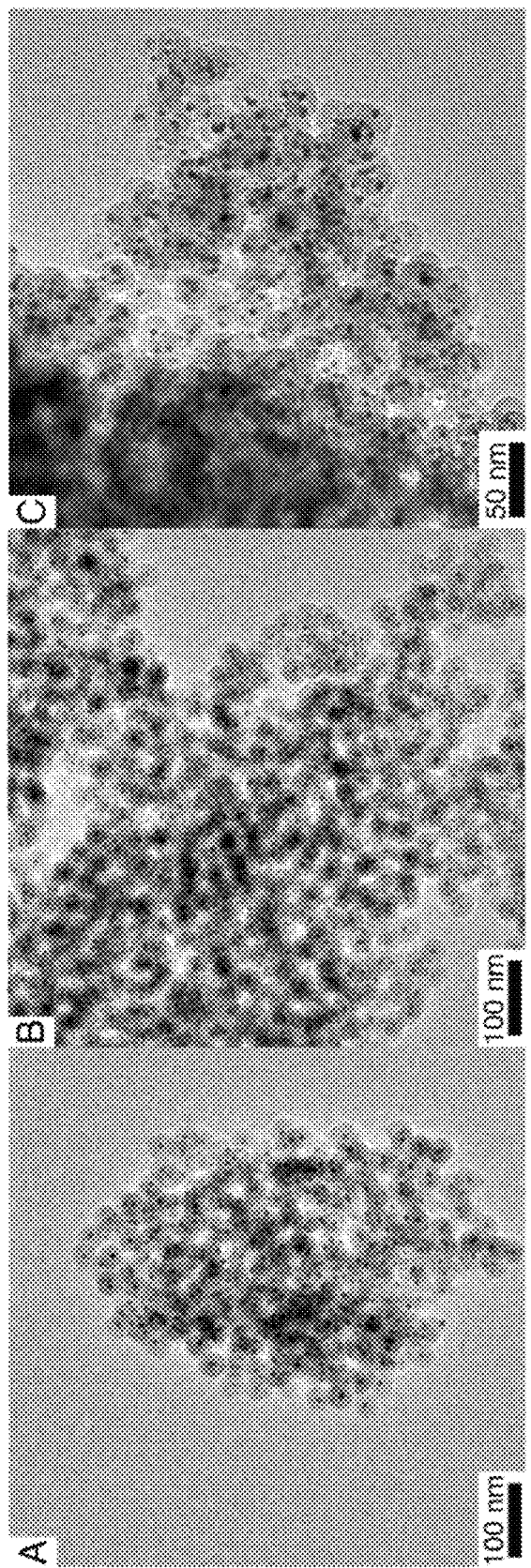
Figures 15D, 15E, 15F:
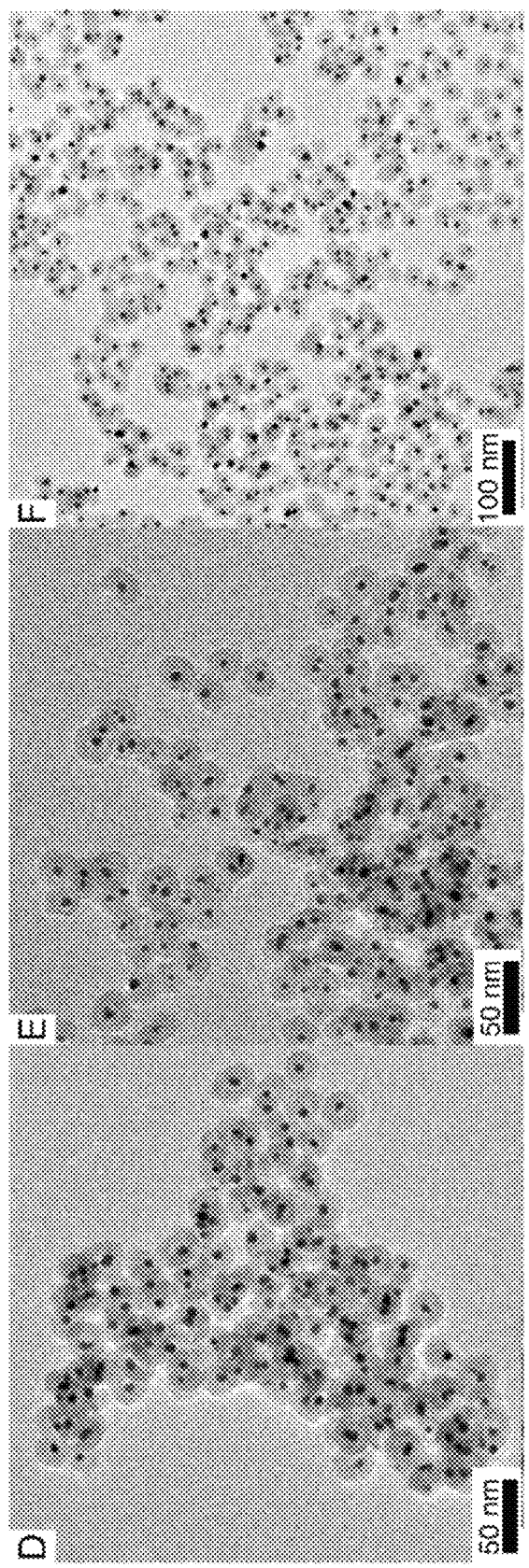
Figures 16A, 16B, 16C:
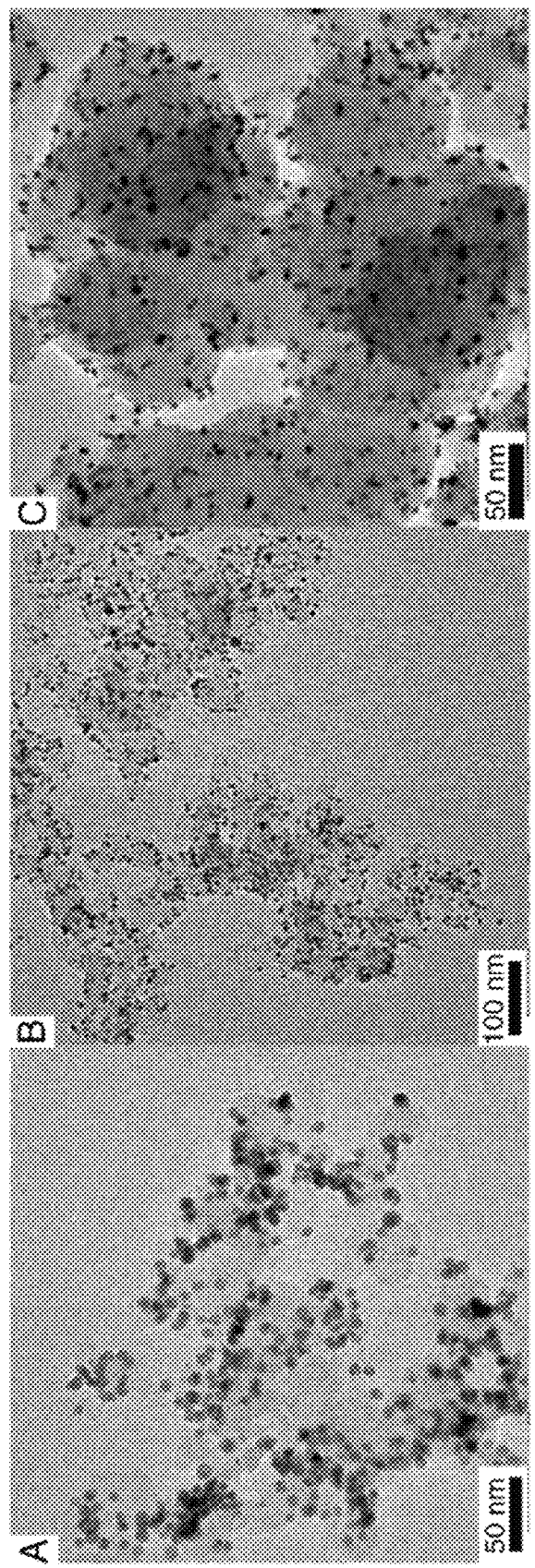
FIGS. 16A-16I show TEM analysis of NPs with varying shell composition supported on carbon.
Figures 16D, 16E, 16F:
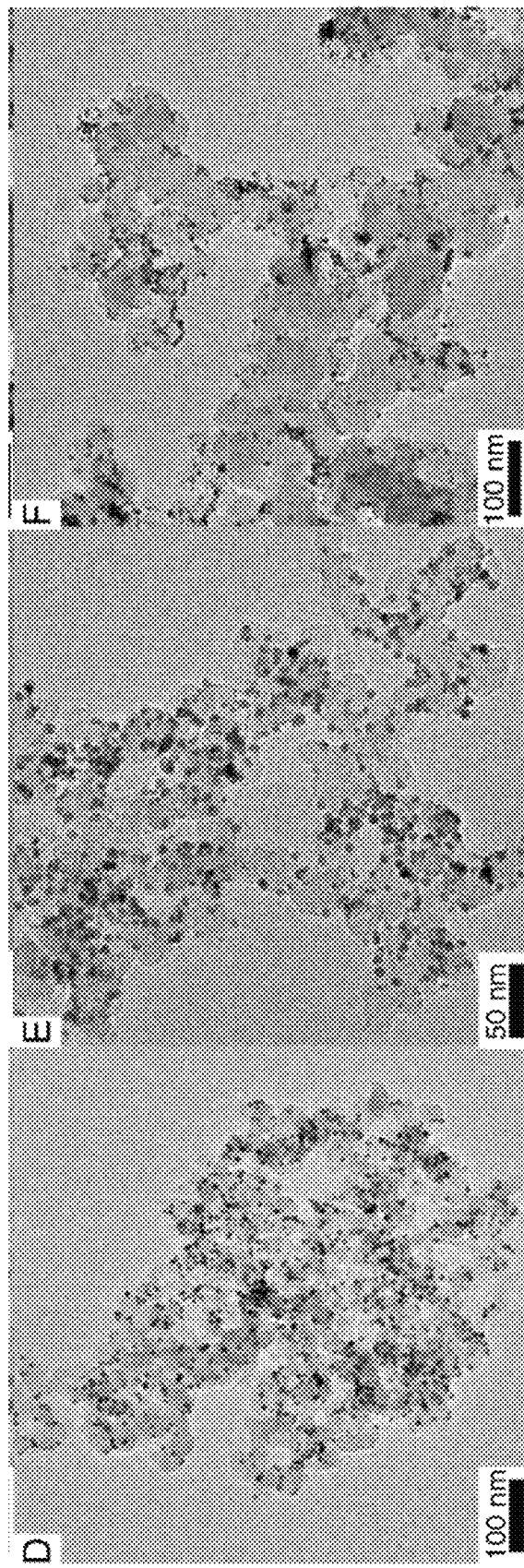
Figures 16G, 16H, 16I:
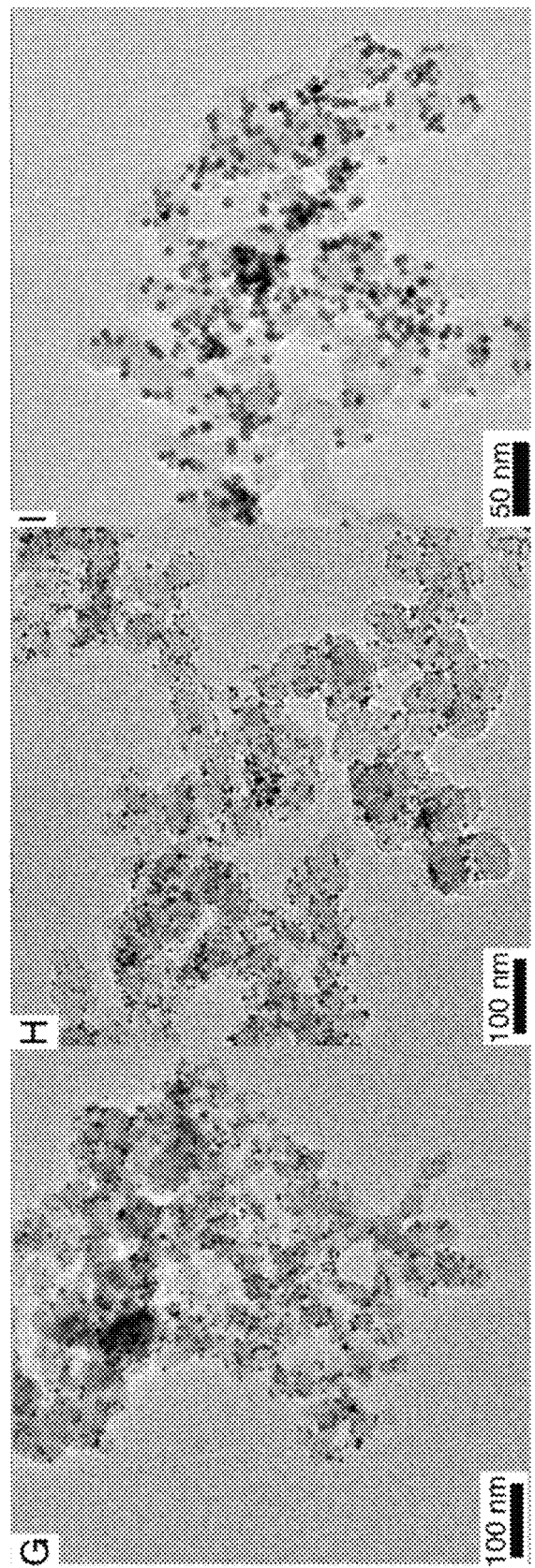
Figure 17:
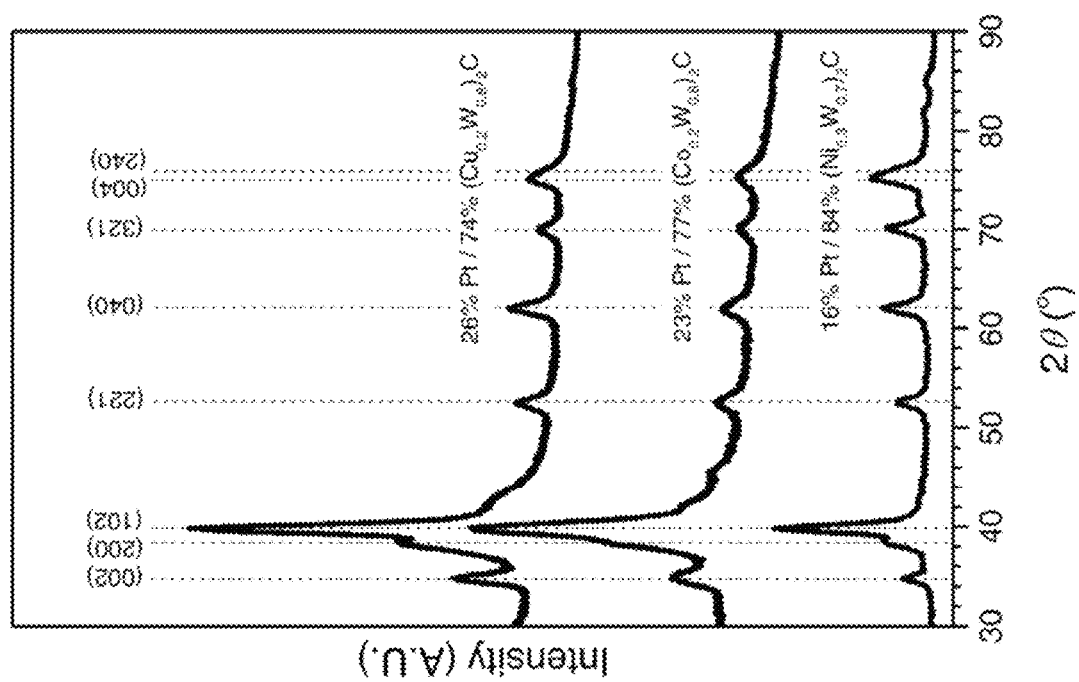
FIG. 17 shows PXRD diffractograms of NM/TMC core-shell NPs where the TMC core is crystallized in a semicarbide lattice.

FIG. 14 shows atomic ratio of surface ML coverage to the total number of metal atoms in the NP versus total NP diameter. Small core-shell NPs with sub-ML NM surface coverages offer complete NM dispersion while also offering bifunctional surfaces with exposed NM sites and TMC sites accessible for catalytic transformations. However, small core-shell NPs with complete ML NM coatings cannot offer substantial NM loading reductions. As such, this regime is designated as "Sub-ML Efficient." For large NPs, complete MlL and multilayer NM surface coverages can still result in substantial reductions in NM loadings and are more appropriate for applications in electrocatalysis where durability is a significant challenge. As such, this regime is designated as "MIL Efficient."

This figure can also be used to estimate the regime of MIL coverage for various NM/TMC core-shell NPs synthesized using the new method reported here. For instance, a 4 nm core-shell NP consisting of 7% NM and 93% TMC (metals basis) has ~0.5 ML NM surface coverage. A 4 nm NP consisting of 13% NM and 87% TMC has ~1 ML NM surface coverage, while a 6 nm NP consisting of 22% NM and 82% TMC has ~2 ML NM surface coverage. An 8 nm NP consisting of 30% NM and 70% TMC has ~3 ML NM surface coverage. These are the typical synthetic regimes targeted in the current study.

FIGS. 15A-15I show TEM images for a representative selection of different NM/TMC core-shell NPs encapsulated in silica after carburization at 900° C. in a 15% $CH_4$/85% $H_2$ atmosphere. All percentages are based on total metals basis as determined by ICP; (A) 6.1±0.9 nm 26% $Pt_{0.6}Rh_{0.4}$/74% $Ti_{0.1}W_{0.9}C$, (B) 6.4±1.0 nm 27% $Pt_{0.5}Ru_{0.5}$/73% $Ti_{0.1}W_{0.9}C$, (C) 5.7±1.1 nm 25% $Pt_{0.8}Ir_{0.2}$/75% $Ti_{0.2}W_{0.8}C$, (D) 6.1±1.0 nm 17% $N_{0.93}Au_{0.07}$/83% $Ti_{0.1}W_{0.9}C$, (E) 9.7±2.0 nm 27% $Pt_{0.7}Au_{0.3}$/73% $Ti_{0.2}W_{0.8}C$, (F) 7.7±1.4 nm 28% Pt/72% $Ti_{0.1}W_{0.9}C$ ($Pt_{C-S}$), (G) 2.9±0.6 nm 13% Au/87% $Ti_{0.3}W_{0.7}C$, (H) 3.5±1.0 nm 6% Au/94% $Ti_{0.2}W_{0.8}C$, and (I) 3.7±1.3 nm 4% Pt/96% $Ti_{0.2}W_{0.8}C$.

FIG. 16A-16I show TEM images for a representative selection of different NM/TMC core-shell NPs supported on Vulcan® XC-72r carbon black after removal of the silica template; (A) 7.7±1.4 nm 28% Pt/72% $Ti_{0.1}W_{0.9}C$ NPs supported on carbon ($Pt_{C-S}$), (B) 7.1±1.4 nm 21% Pt/79% $Ti_{0.1}W_{0.9}C$ NPs supported on carbon, (C) 2.9±0.6 nm 13% Au/87% $Ti_{0.1}W_{0.9}C$ NPs supported on carbon, (D) 6.1±0.9 nm 26% $Pt_{0.6}Ru_{0.4}$/74% $Ti_{0.1}W_{0.9}C$ NPs supported on carbon, (E) 5.7±1.1 nm 25% $Pt_{0.8}Ir_{0.2}$/75% $Ti_{0.2}W_{0.8}C$ NPs supported on carbon, (F) 6.1±1.0 nm 17% $N_{0.93}Au_{0.07}$/83% $Ti_{0.1}W_{0.9}C$ NPs supported on carbon, (G) 4.4±0.8 nm 14% $Pt_{0.6}Ru_{0.4}$/86% $Ti_{0.2}W_{0.8}C$ NPs supported on carbon, (H) 6.4±1.0 nm 27% $Pt_{0.5}Ru_{0.5}$/73% $Ti_{0.1}W_{0.9}C$ NPs supported on carbon, and (I) 6.7±1.0 nm 27% $N_{0.67}Ru_{0.33}$/83% $Ti_{0.1}W_{0.9}C$ NPs supported on carbon ($PtRu_{C-S}$).

Figures 22A, 22B:
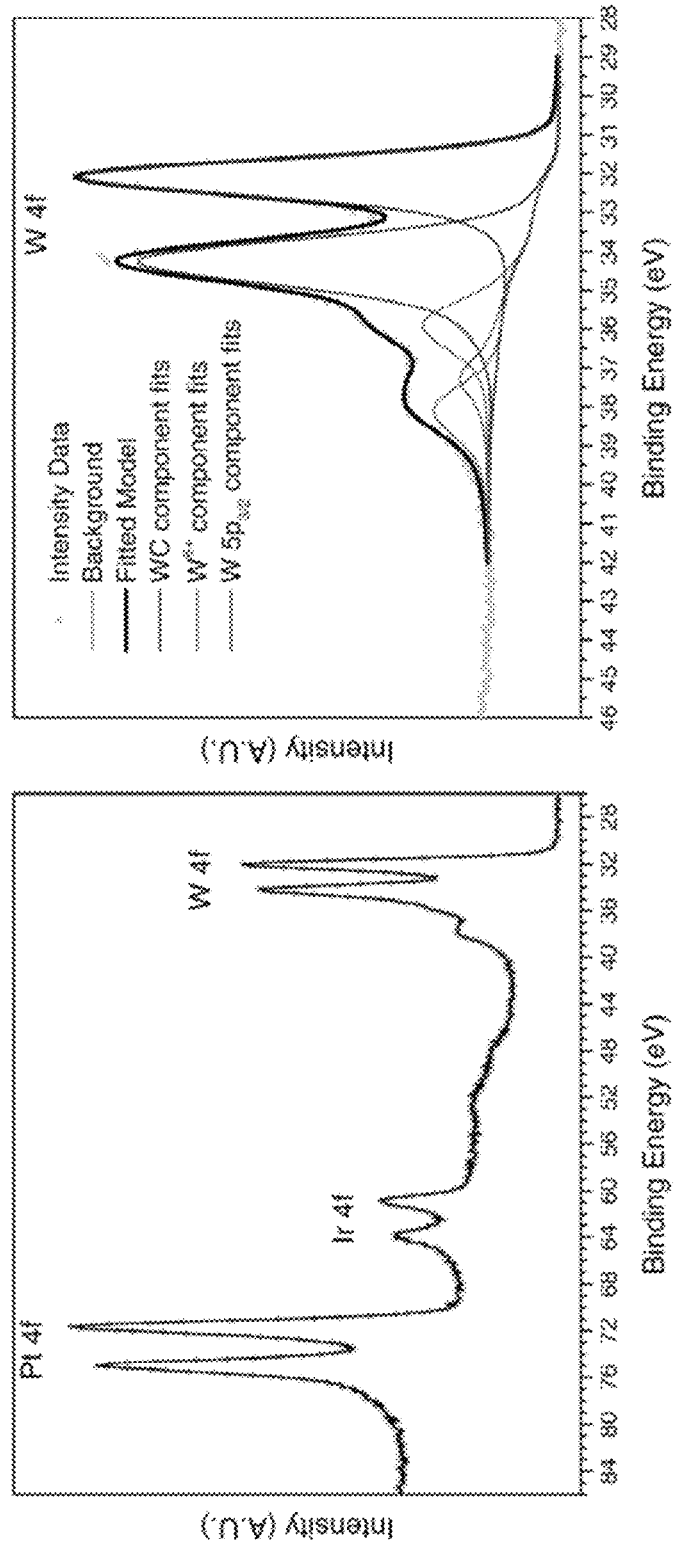
FIGS. 22A-22D show XPS analysis of PtIr/TiWC NPs.
Figure 22D:
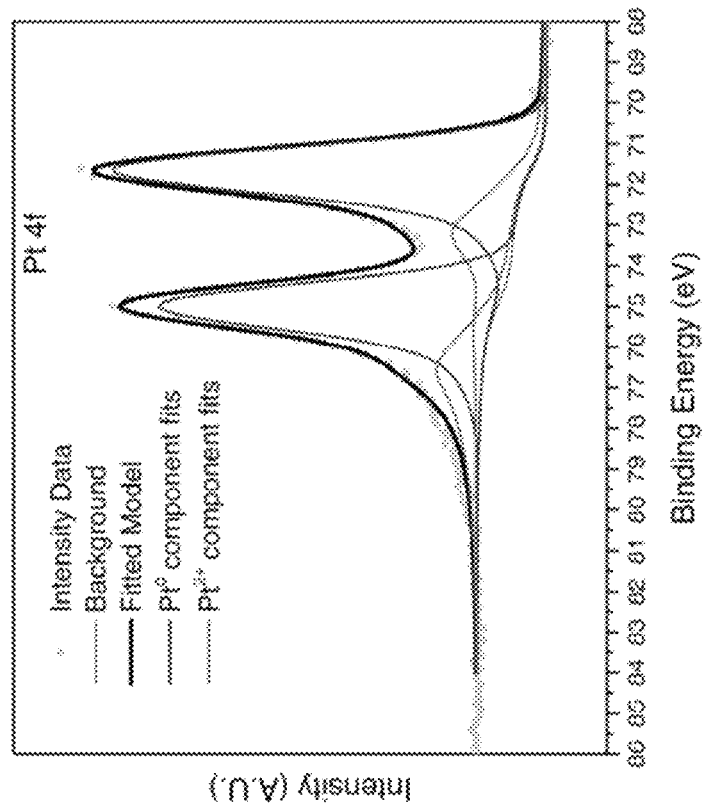
Figure 22C:
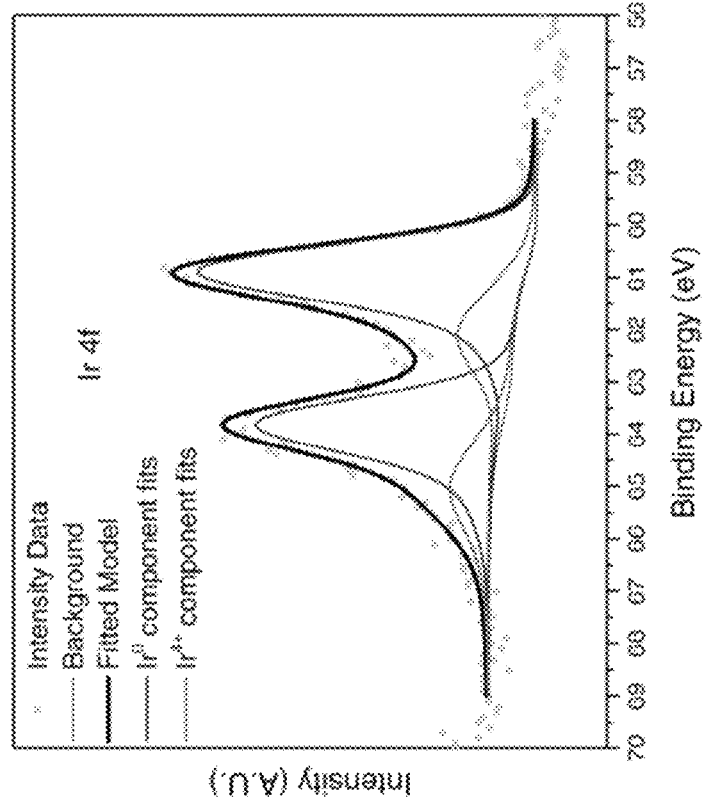
Figures 23A, 23B:
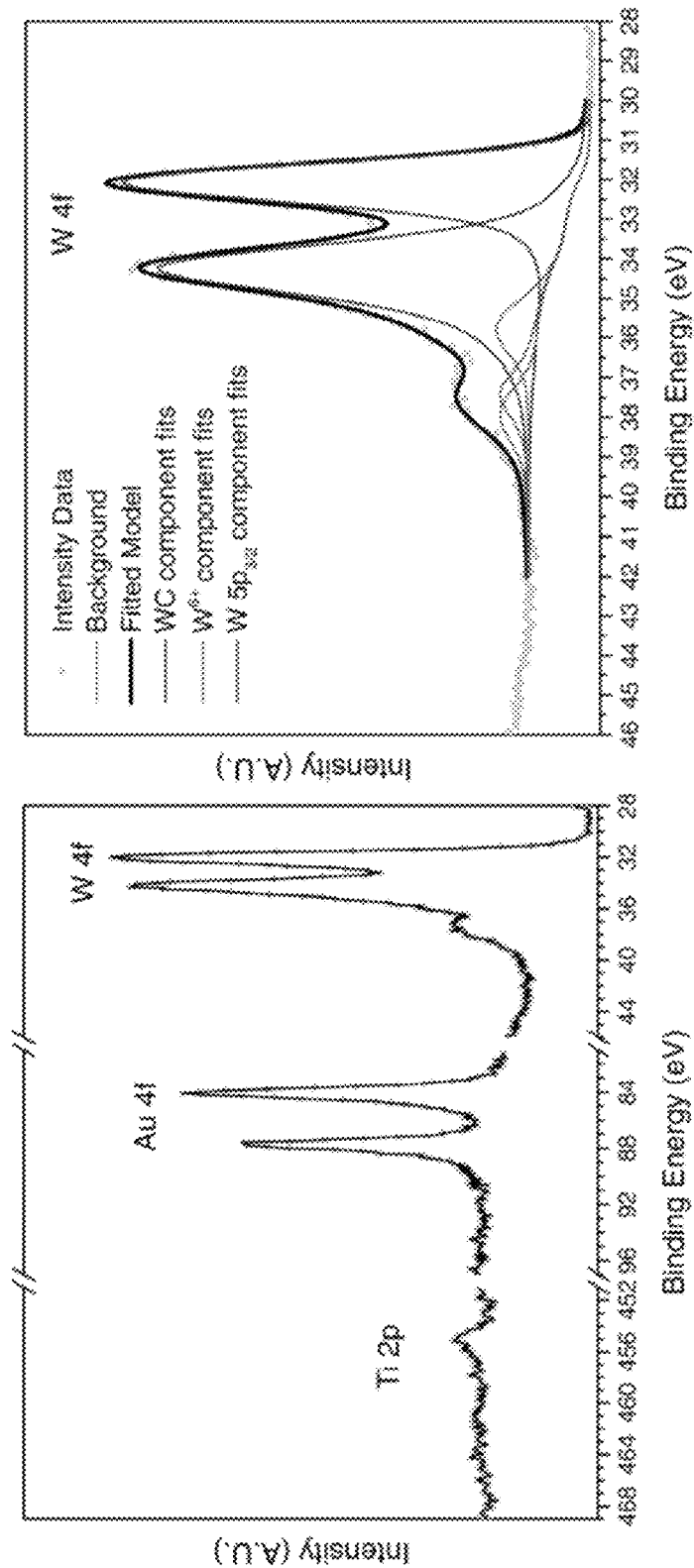
FIGS. 23A-23D show XPS analysis of Au/TiWC NPs.
Figure 23D:
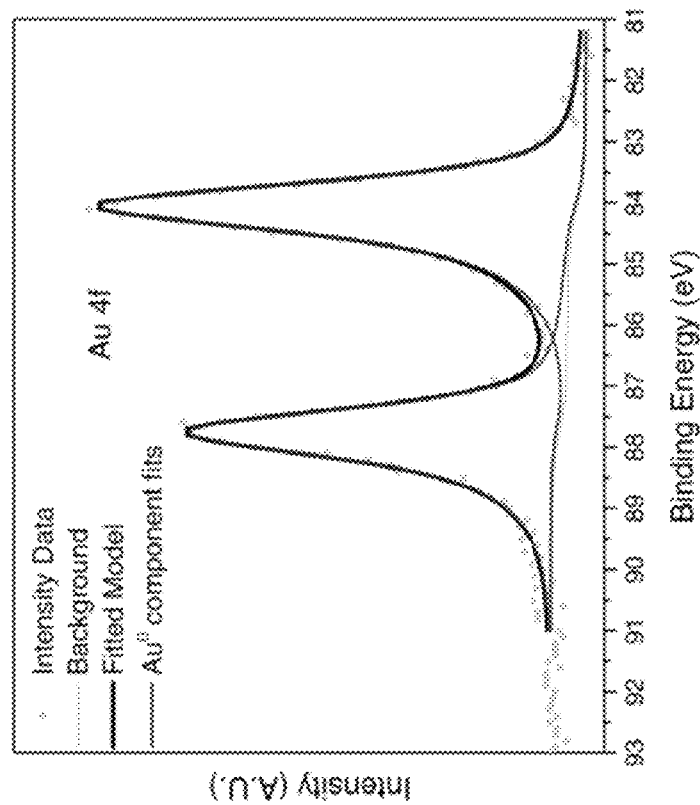
Figure 23C:
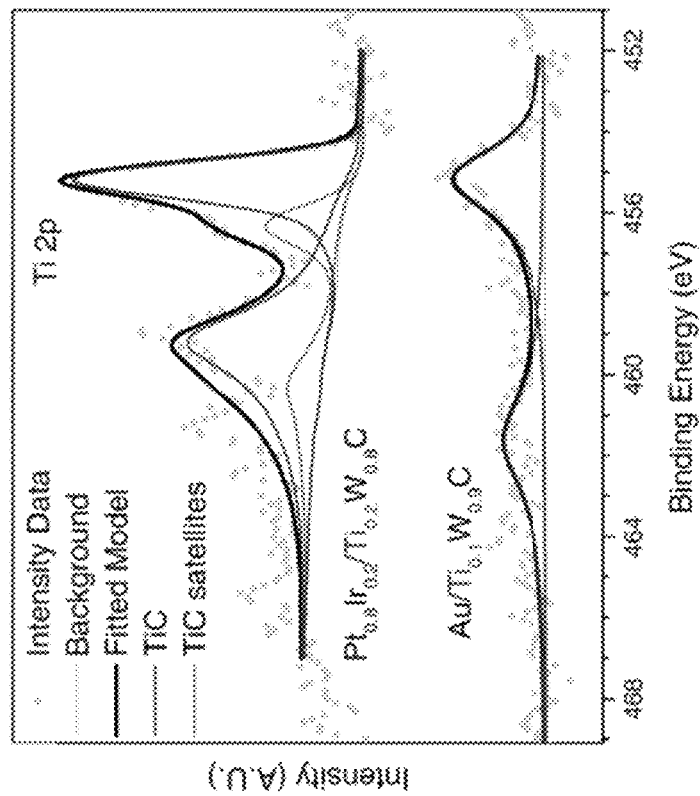

All materials crystallized into a phase-pure fcc WC lattice and displayed enhanced surface NM:TiW ratios, consistent with core-shell structures (FIGS. 21-23 and Table 5). FIG. 23C shows XPS peak deconvolution of the Ti 2p spectrum. The Ti 2p spectrum is difficult to deconvolute for three reasons: the atomic sensitivity factor is low for ejected Ti 2p photoelectrons, the Ti concentration is low in the carbide cores, and the Ti signal is screened by the overlayer of noble metals. For these reasons, the Ti 2p spectrum for $Pt_{0.8}Ir_{0.2}$/$Ti_{0.2}W_{0.8}C$ is shown. This a representative core-shell material with a higher core percentage of Ti. In cases where the core percentage is 10%, a deconvolution cannot be performed and instead an estimate of the Ti composition is obtained from simple integration as shown for the Ti 2p spectrum for Au/$Ti_{0.1}W_{0.9}C$.

Figure 18A:
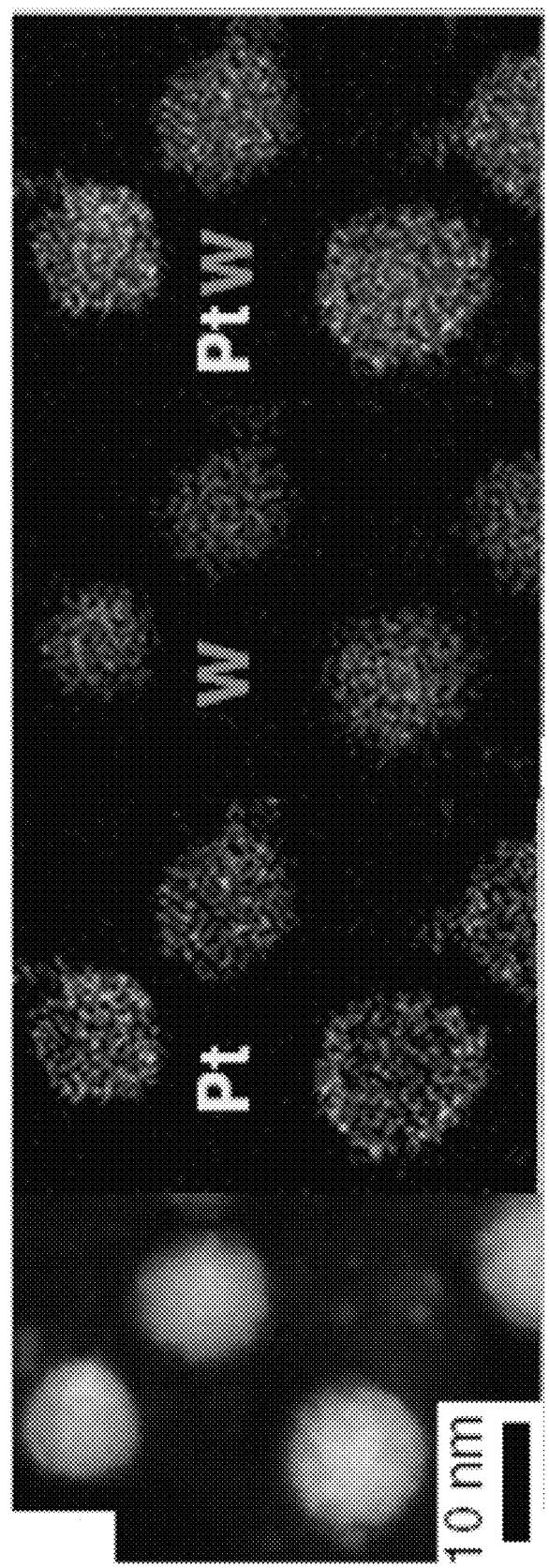
Figure 18F:
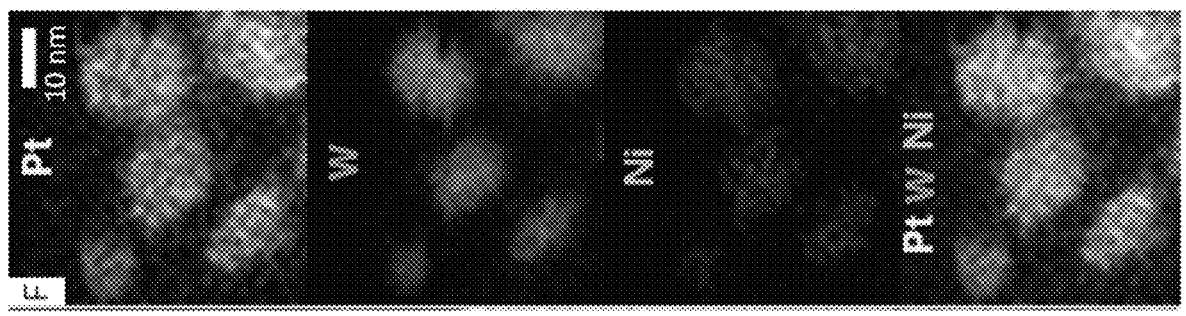
Figure 19D:
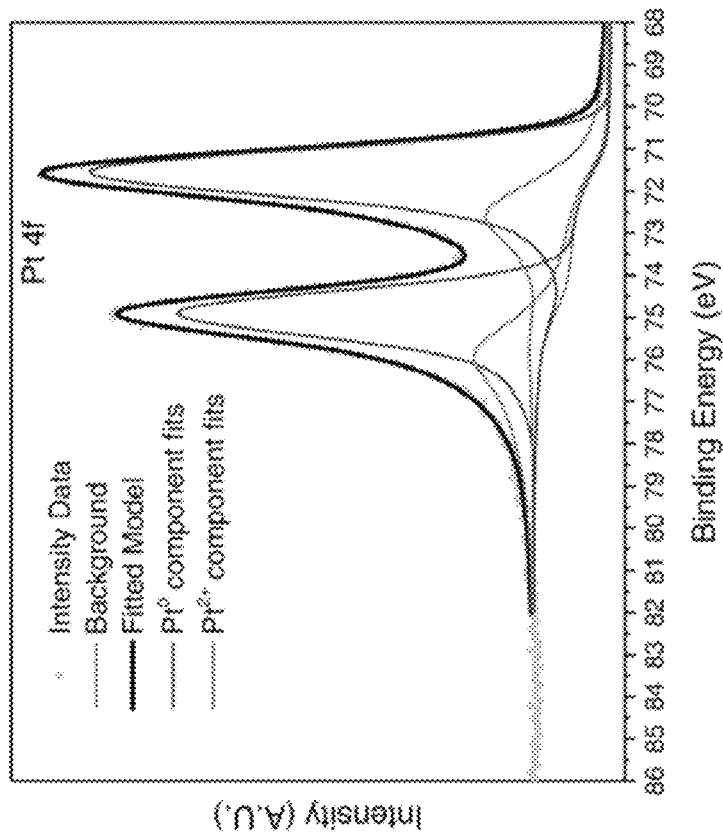
Figure 19C:
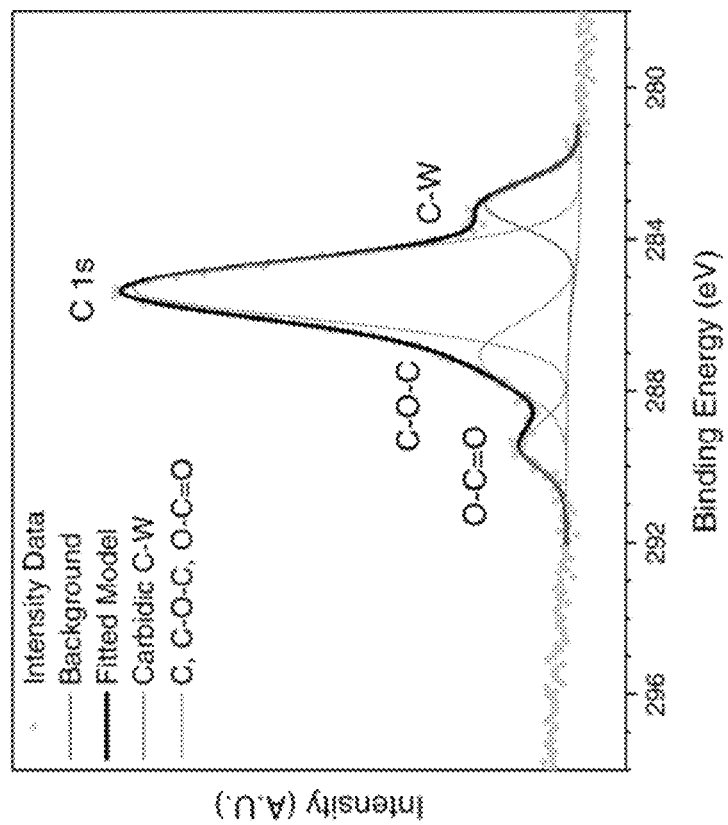
Figures 20A, 20B:
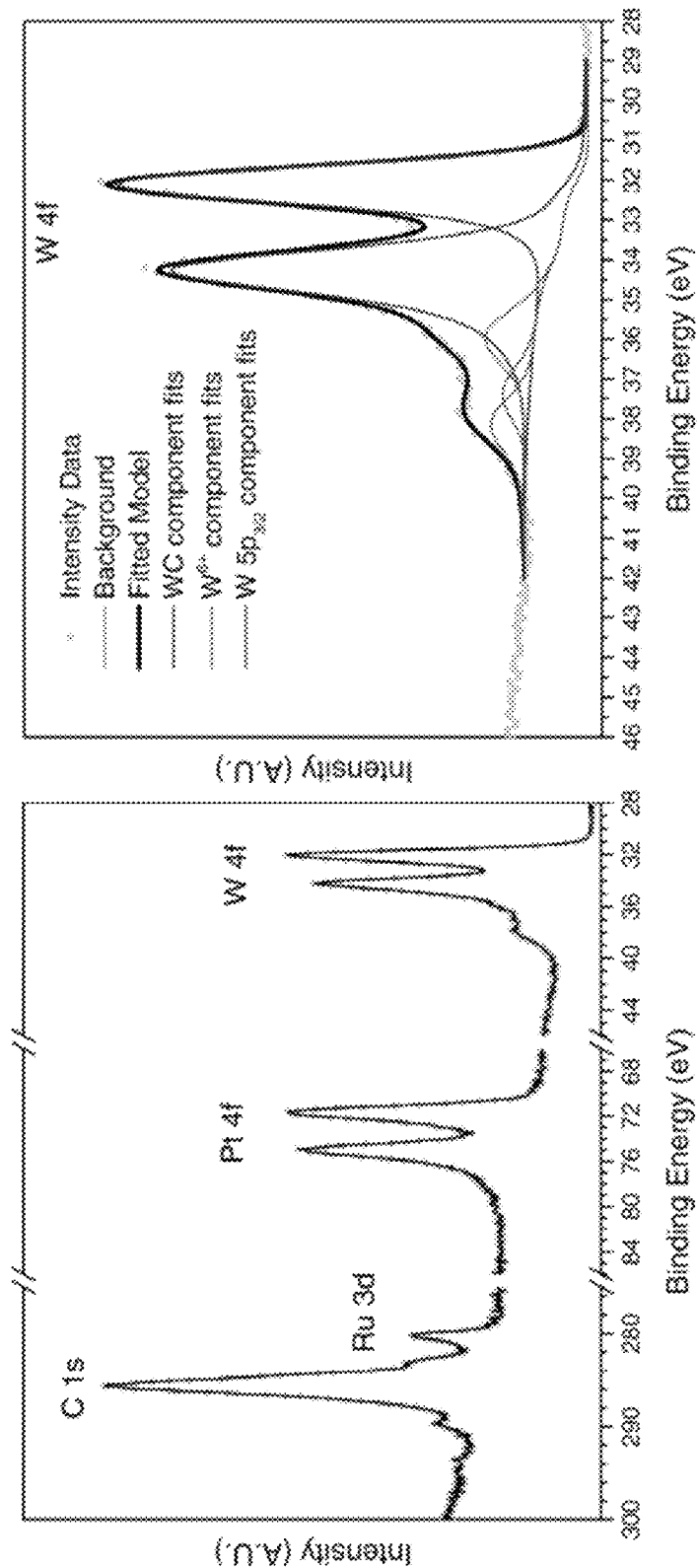
FIGS. 20A-20D show XPS analysis of $PtRu_{C-S}$.
Figures 20C, 20D:
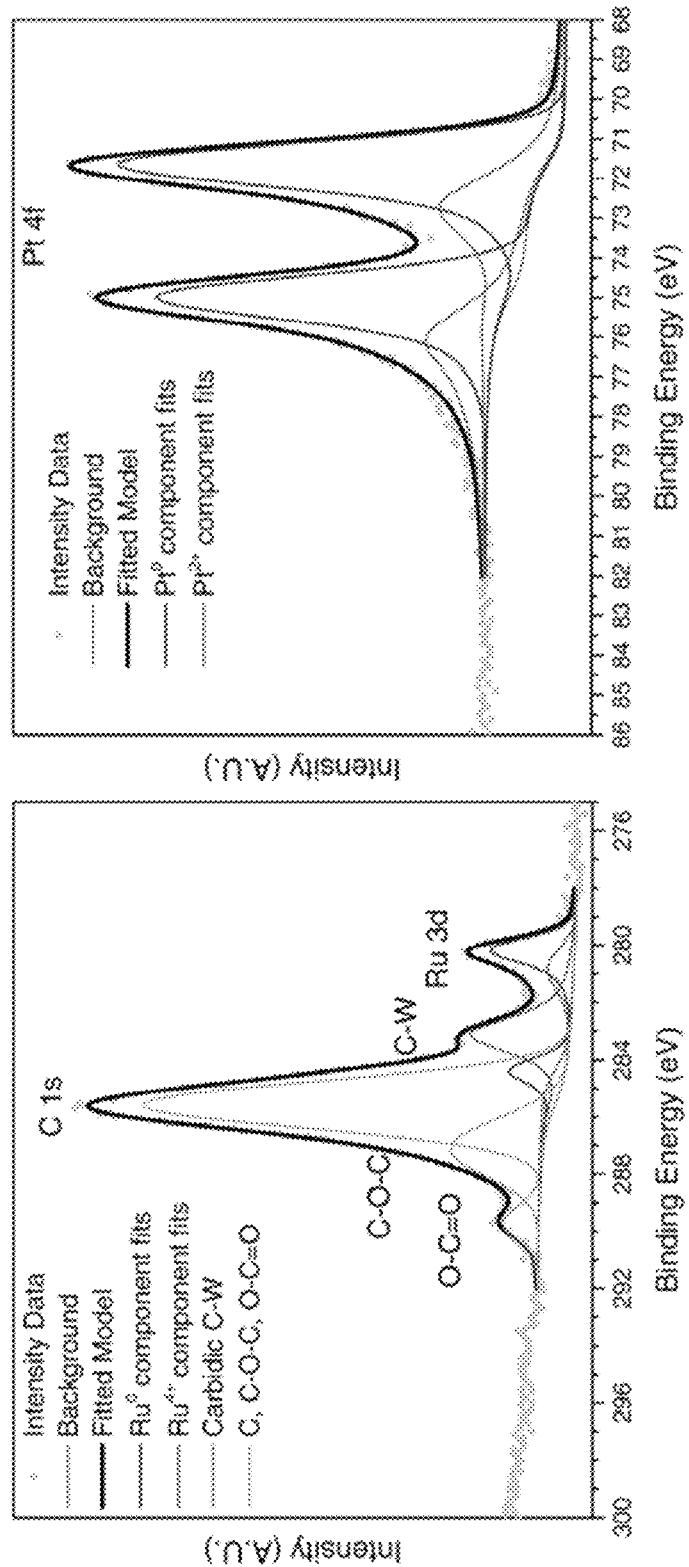
Figure 21B:
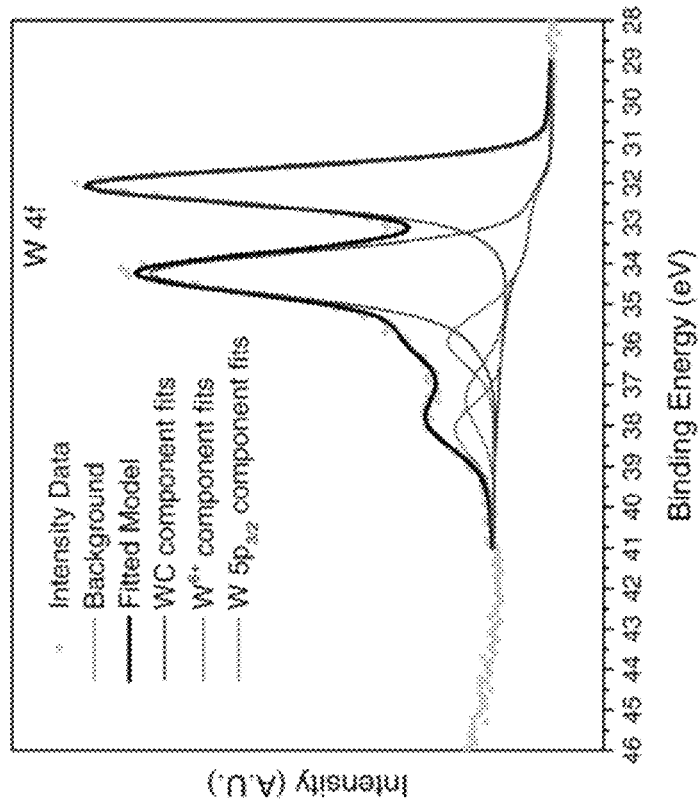
FIGS. 21A-21D show XPS analysis of PtRh/TiWC NPs.
Figure 21A:
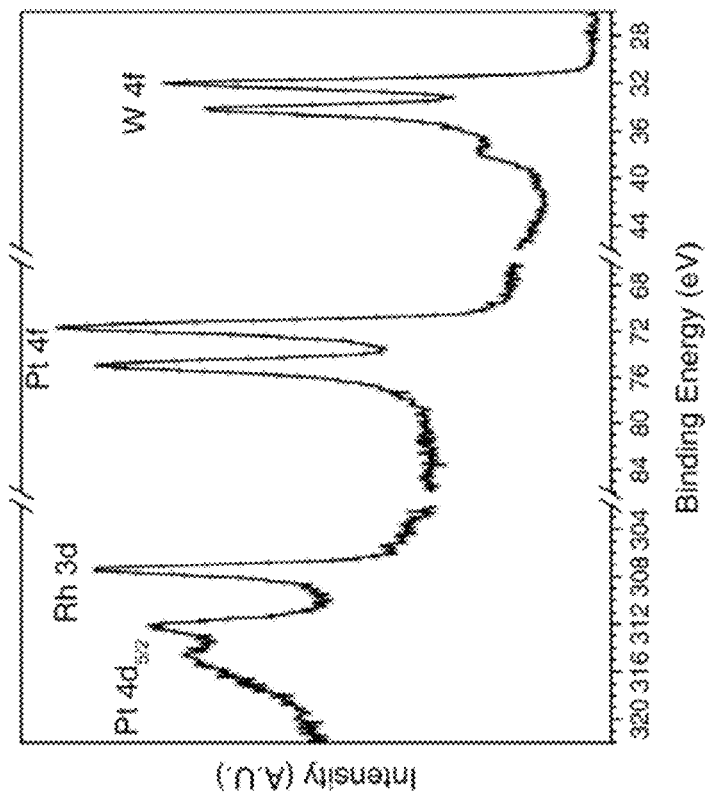
Figure 21D:
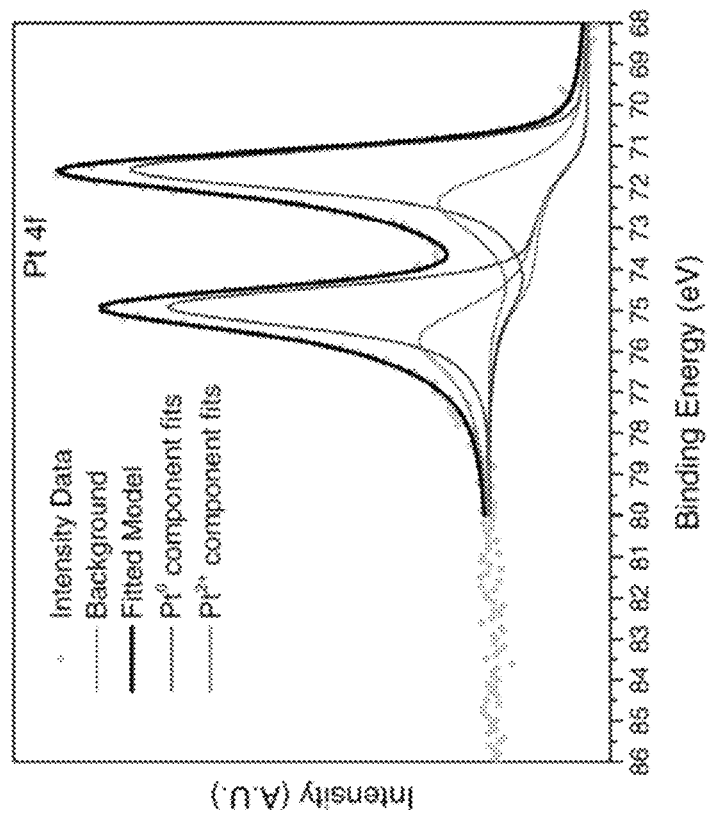
Figure 21C:
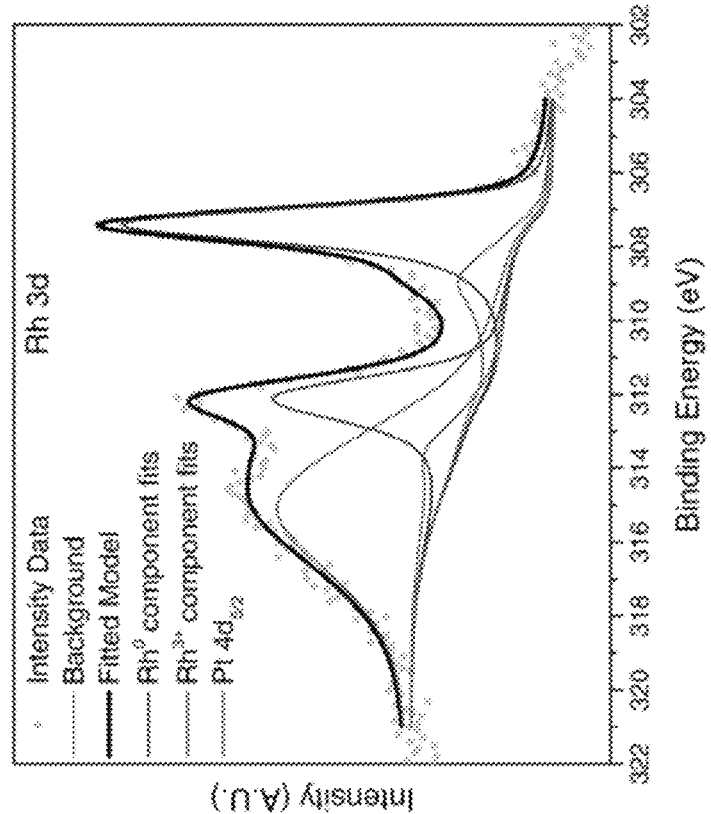
Figures 24A, 24B:
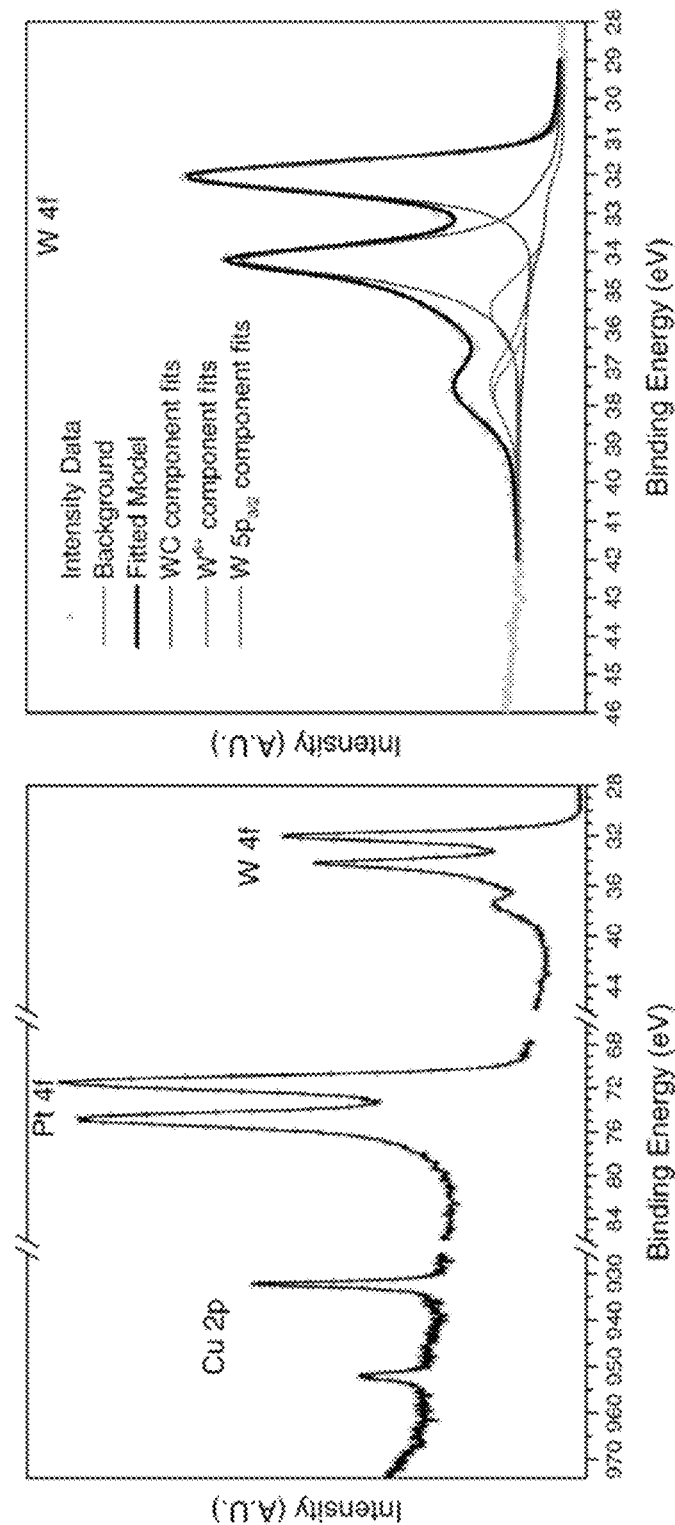
FIGS. 24A-24D show XPS analysis of Pt/CuWC NPs.
Figures 24C, 24D:
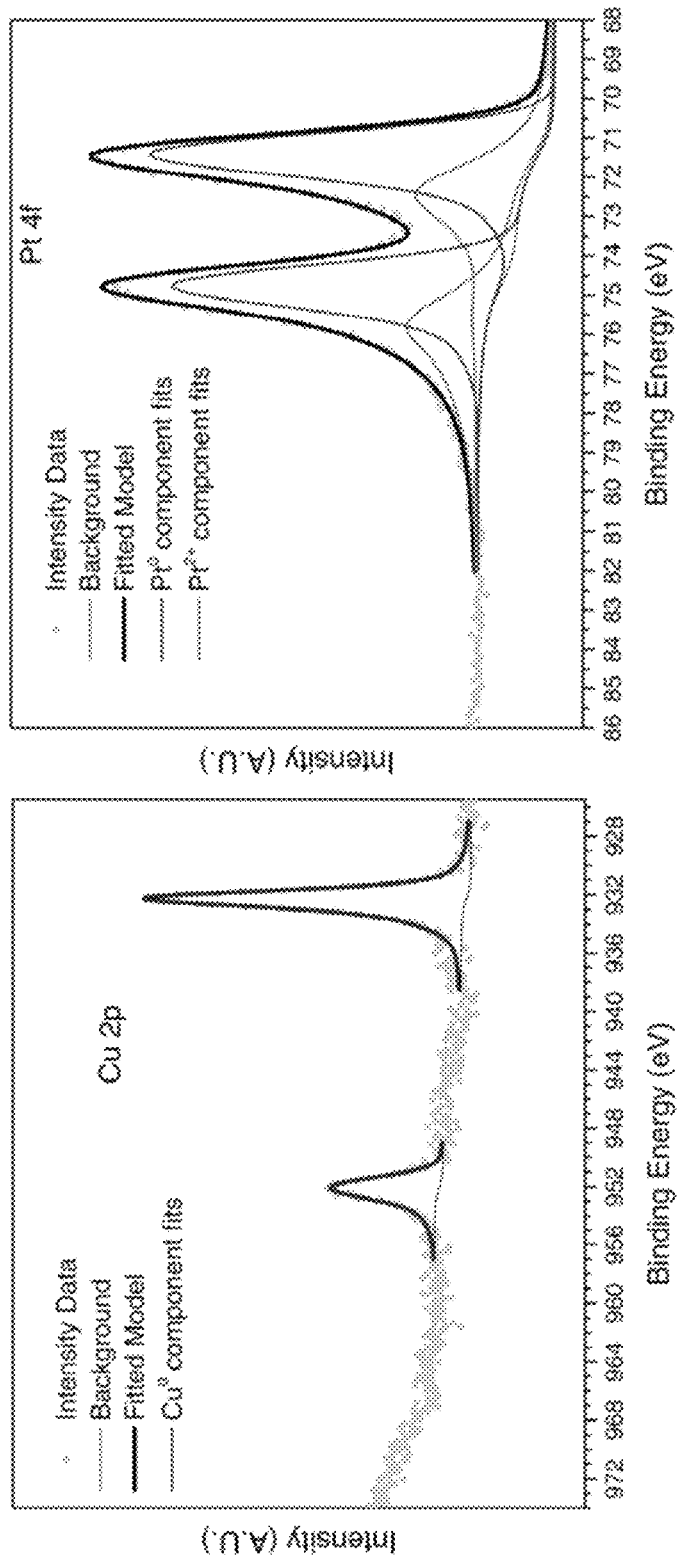
Figures 42C, 42D:
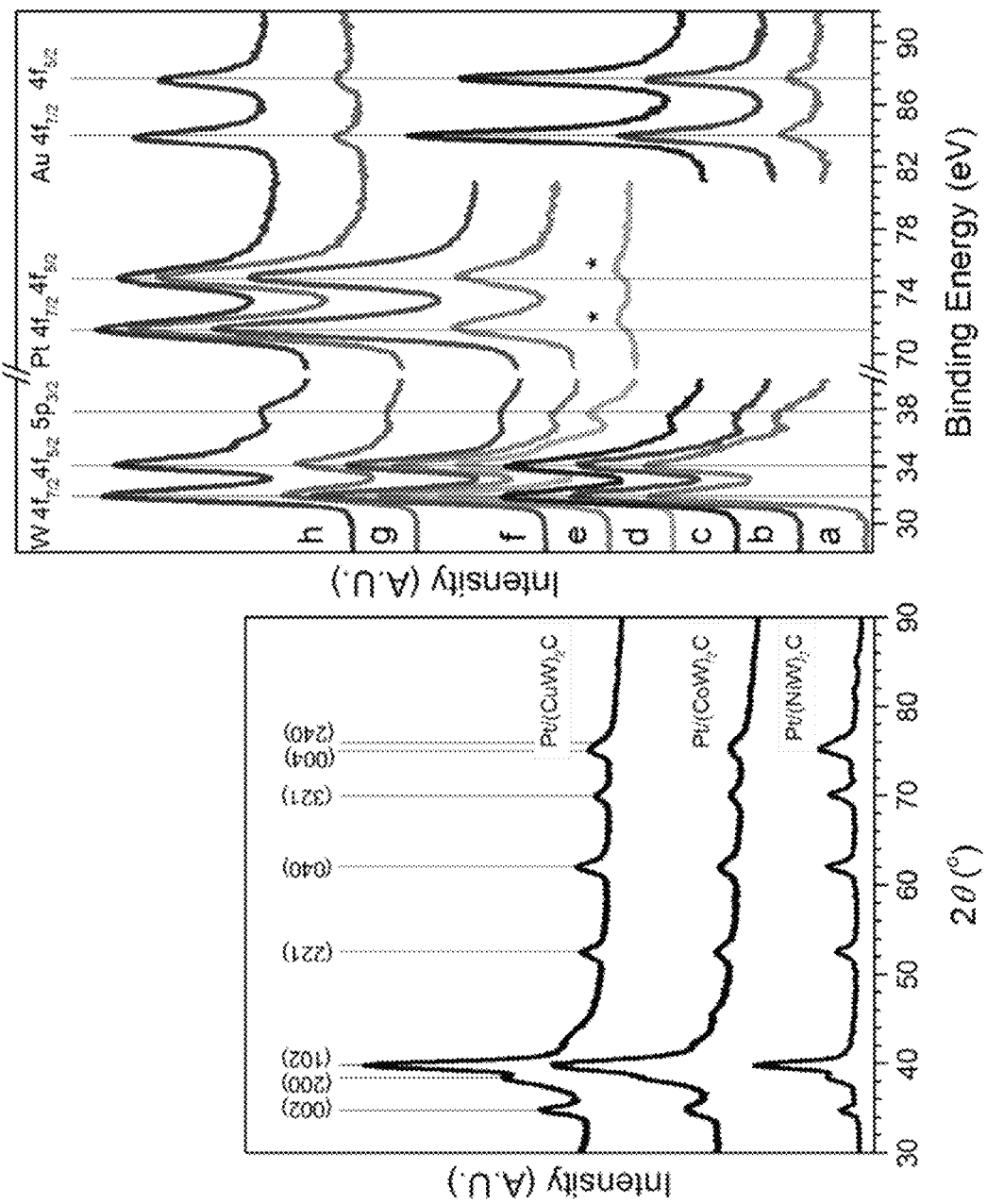
Figure 43B:
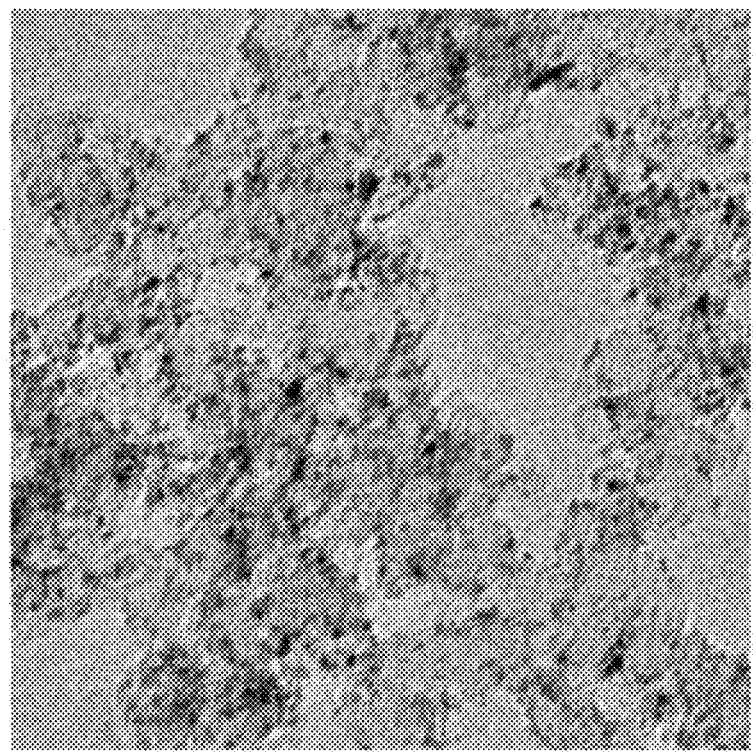
FIGS. 43A-43F show transmission electron micrographs of carbon-supported TiWC (FIG. 43A), <0.01 ML Pt/TiWC (FIG. 43B), 0.05 ML Pt/TiWC (FIG. 43C), 0.25 ML Pt/TiWC (FIG. 43D) and 2 ML Pt/TiWC (FIG. 43E). The scale bar shown in FIG. 43A applies to all micrographs from FIG. 43A to FIG. 43E.
Figure 43A:
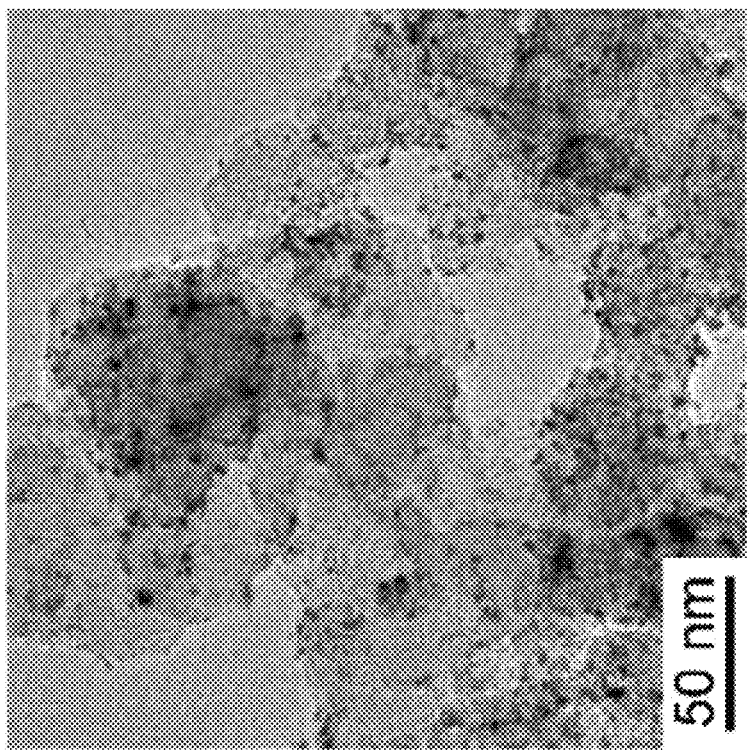
Figure 43D:
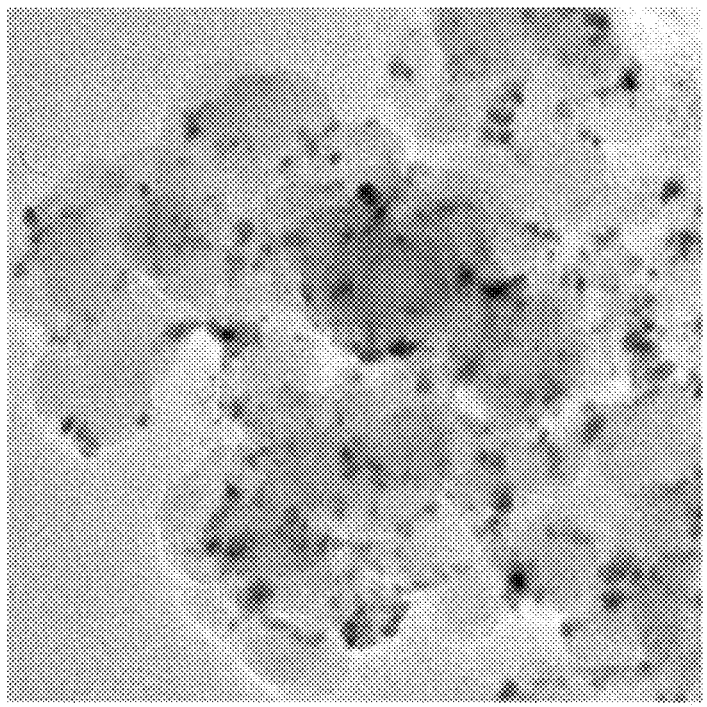
Figure 43C:
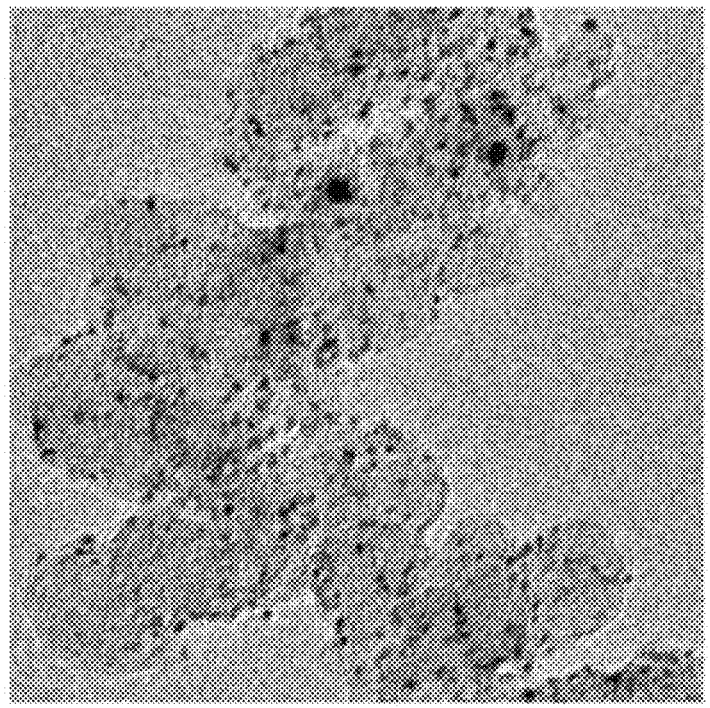
Figures 43E, 43F:
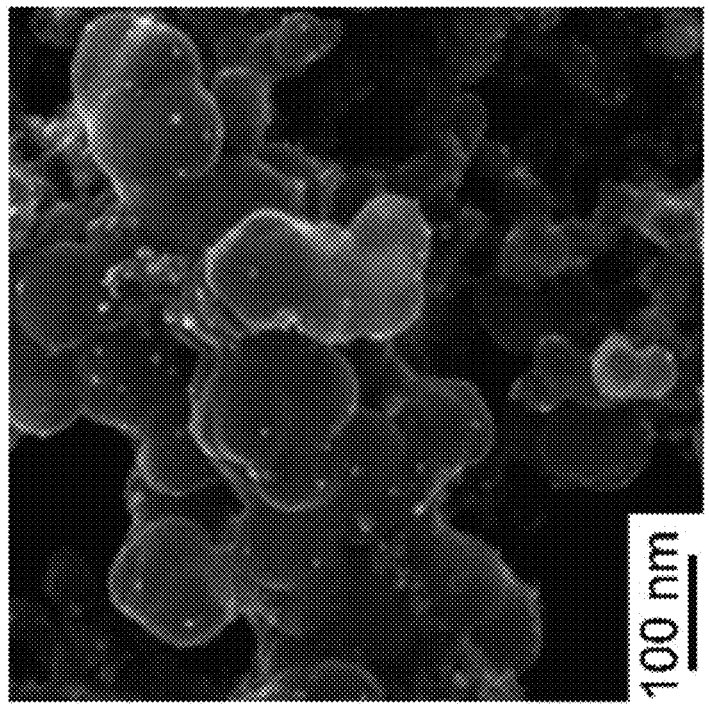
Figures 45A, 45B:
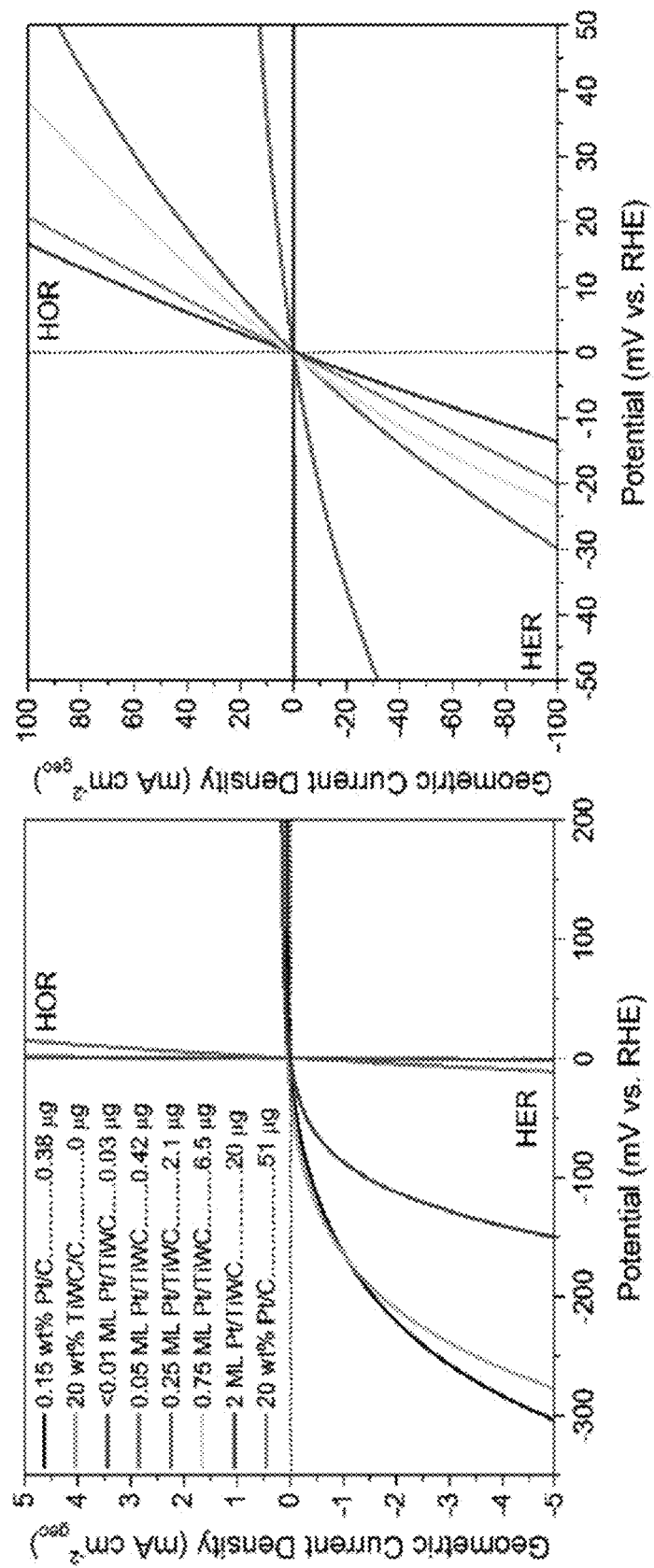
FIGS. 45A-45D show LSVs (FIGS. 45A and 45B) and Tafel plots (FIGS. 45C and 45D) obtained for supported catalysts in 1.0 M HClO$_4$ at 10 mV s$^{-1}$ at 30° C. The legend shown in FIG. 45A applies to FIGS. 45B-45C. All materials were loaded at the same total mass per geometric surface area (255 µg$_{cat}$ cm$^{-2}$$_{geo}$); the masses listed in FIG. 45A refer to the geometric Pt mass loadings for each catalyst and apply to FIGS. 45B-45D.
Figure 45D:
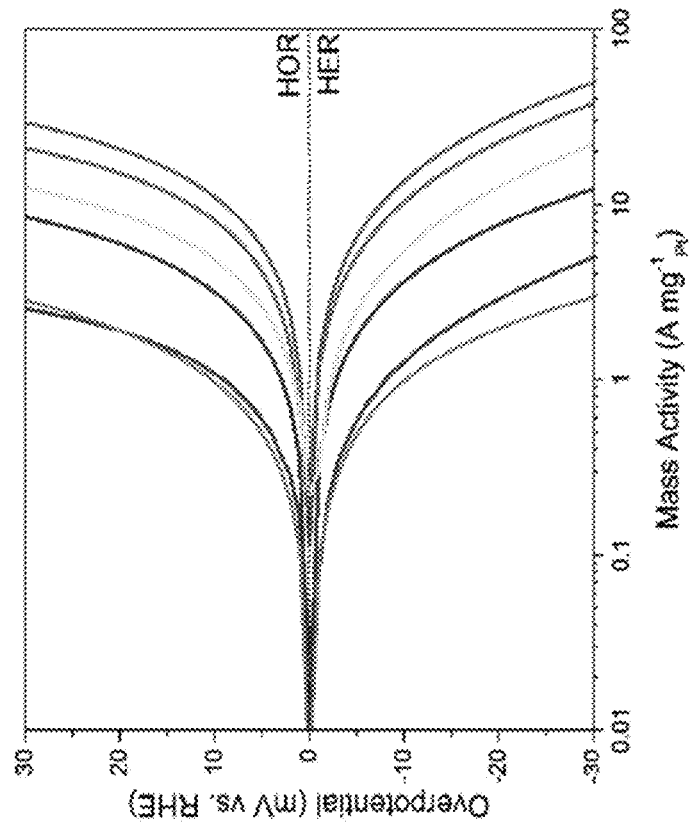
Figure 45C:
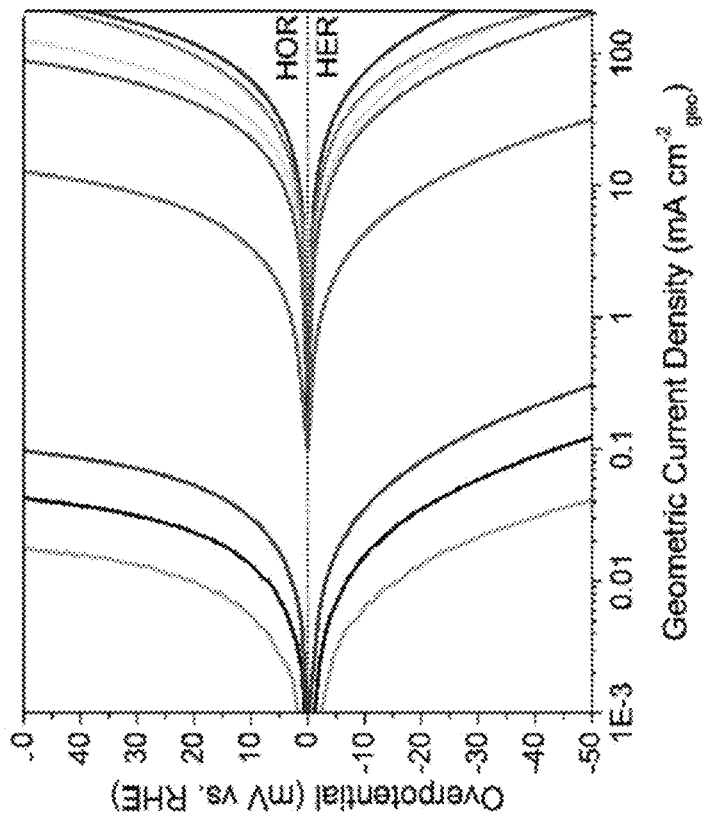
Figure 46A:
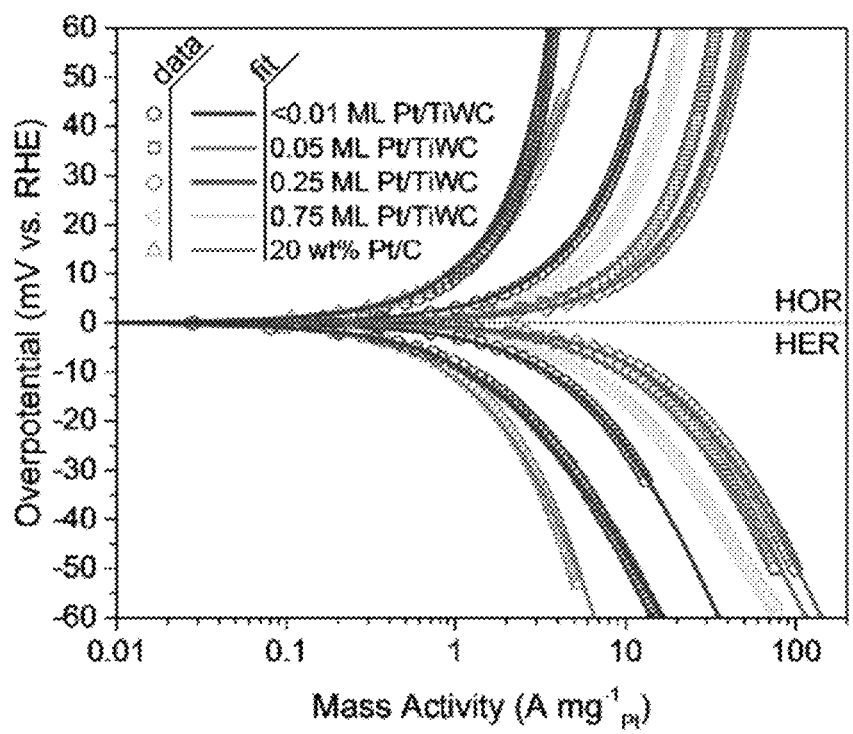
FIG. 46A shows Tafel plots and their fits to the Butler-Volmer equation obtained in 1.0 M HClO$_4$ at 10 mV s$^{-1}$ at 30° C.
Figure 46B:
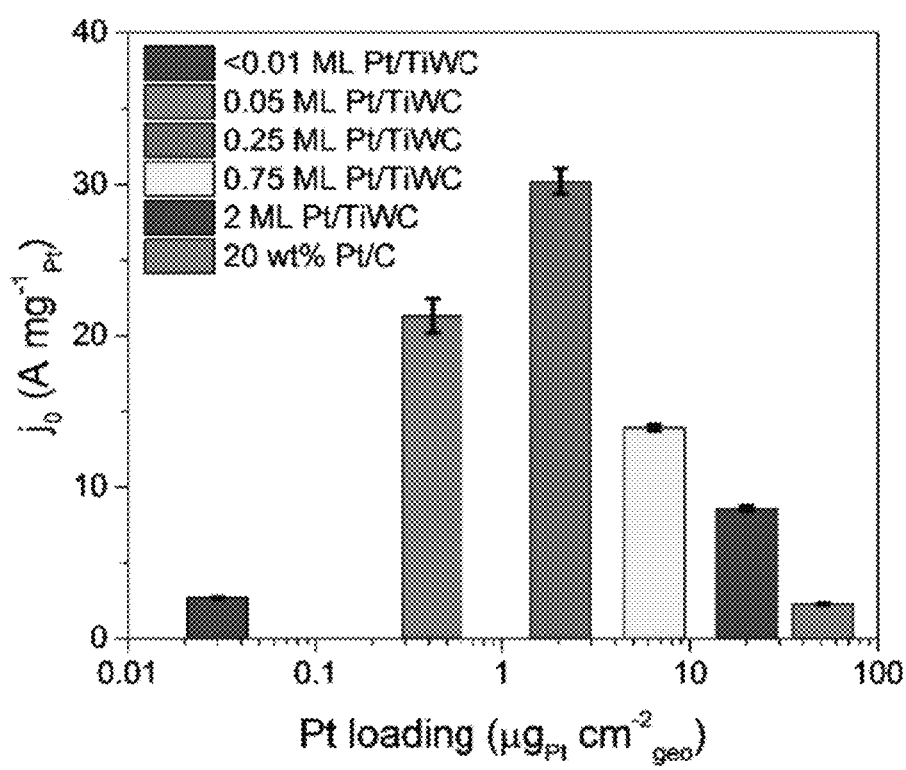
FIG. 46B shows exchange current density (j$_0$) derived from the fits vs. Pt loading for supported catalyst.
Figure 47A:
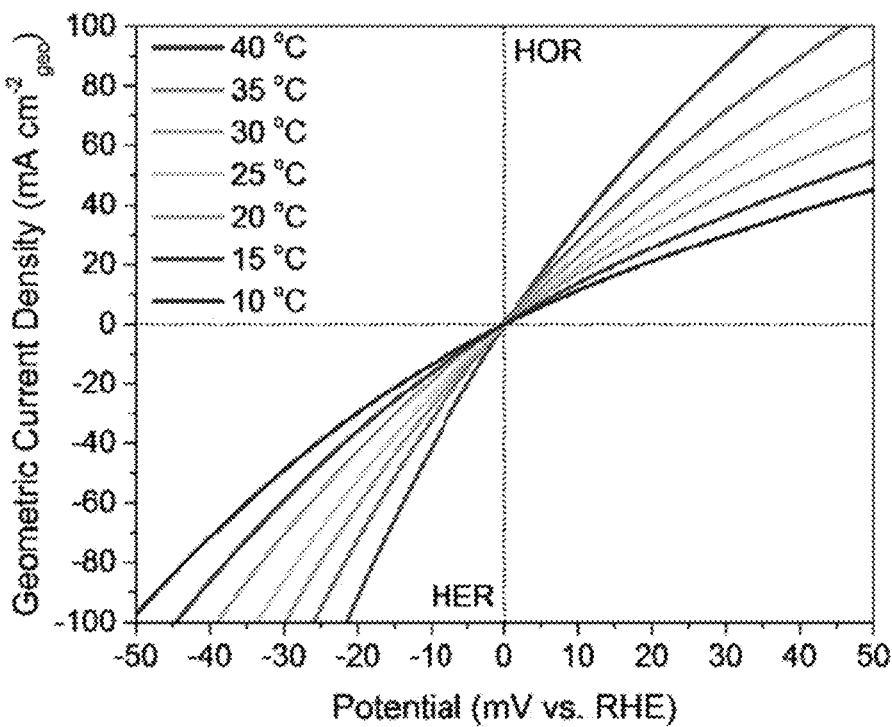
FIGS. 47A-47B show LSVs (FIG. 47A) and plot of log(j$_0$) vs 1000/T (FIG. 47B) obtained for 0.25 ML Pt/TiWC catalyst in 1.0 M HClO$_4$ at 10 mV s$^{-1}$ at varying temperatures (10-40° C.).
Figure 47B:
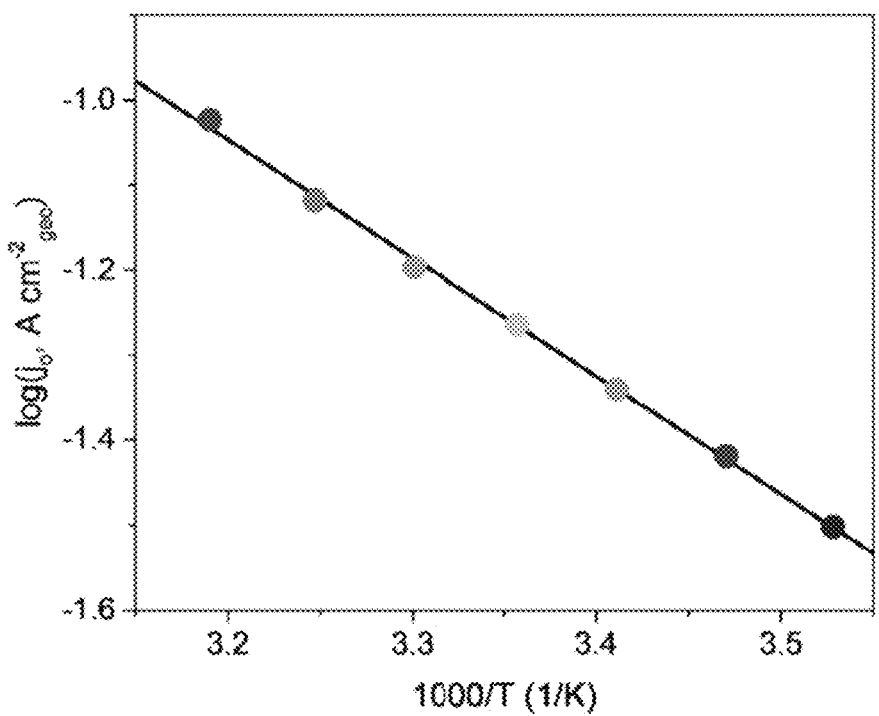
Figure 48B:
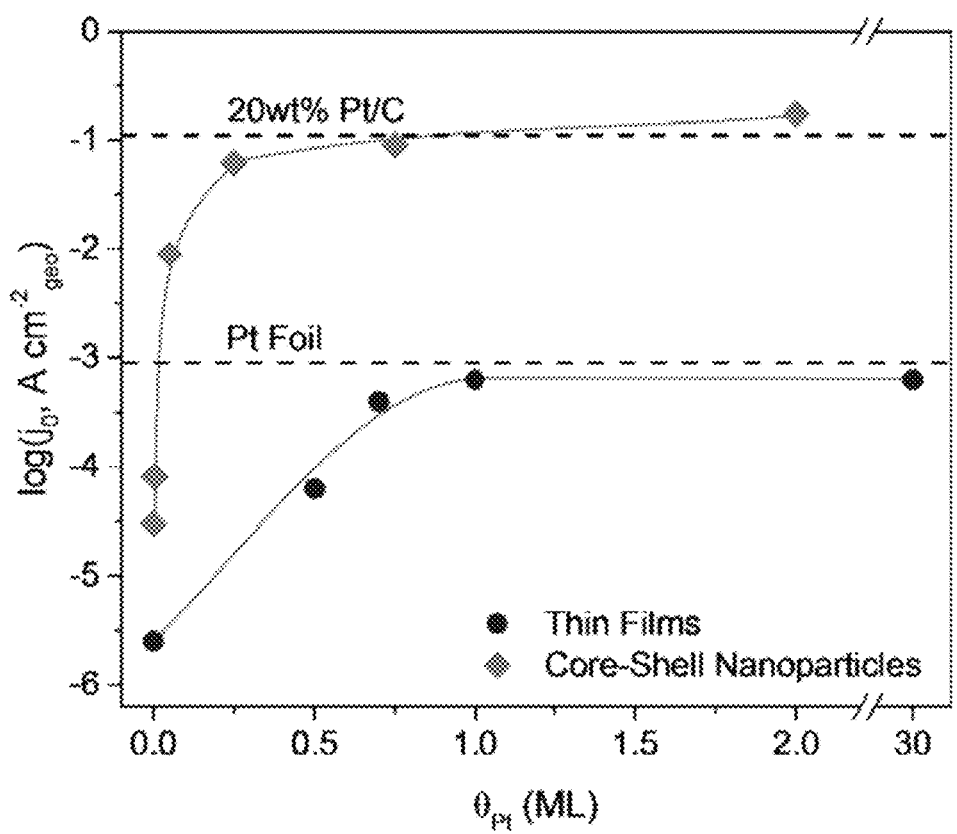
FIG. 48 shows the effect of Pt coverage ($\theta_{Pt}$) on the HER activity of core-shell Pt/TiWC supported catalysts used in this work in comparison with the WC thin film study reported previously in D.V. Esposito, et al. *Angew. Chem. Int. Ed.*, 2010, 49, 9859.
Figure 49A:
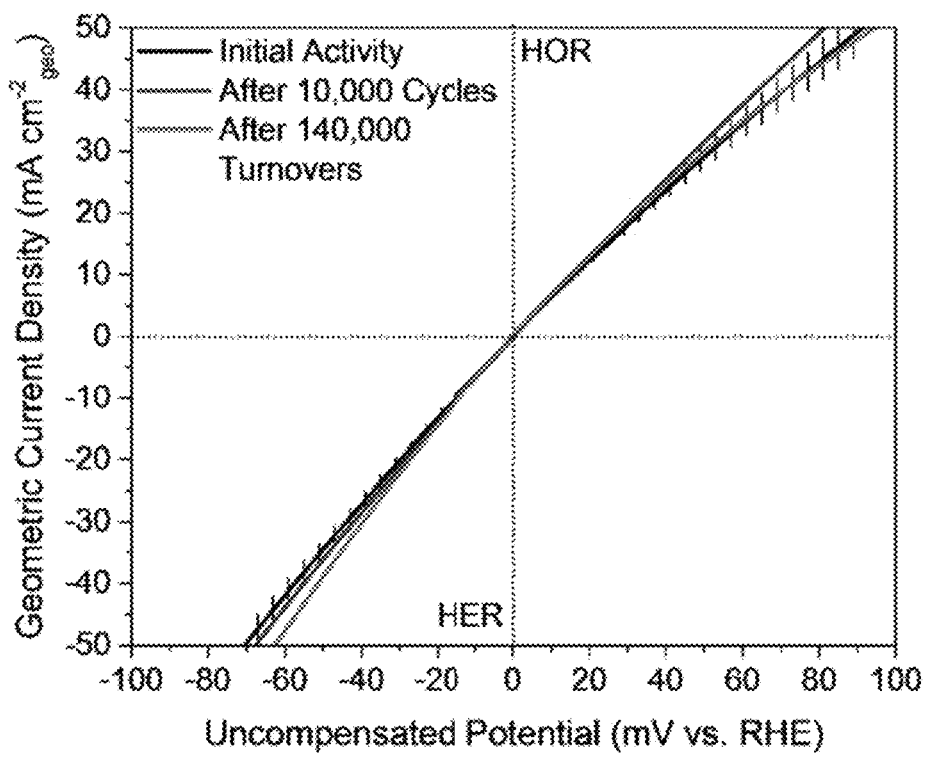
FIG. 49A shows LSVs obtained for 0.25 ML Pt/TiWC catalyst in 1.0 M HClO$_4$ at 10 mV s$^{-1}$ at 30° C. before and after cycling and chronopotentiometry studies. The initial activity LSVs were averaged over 5 replicate electrode mountings.
Figure 49B:
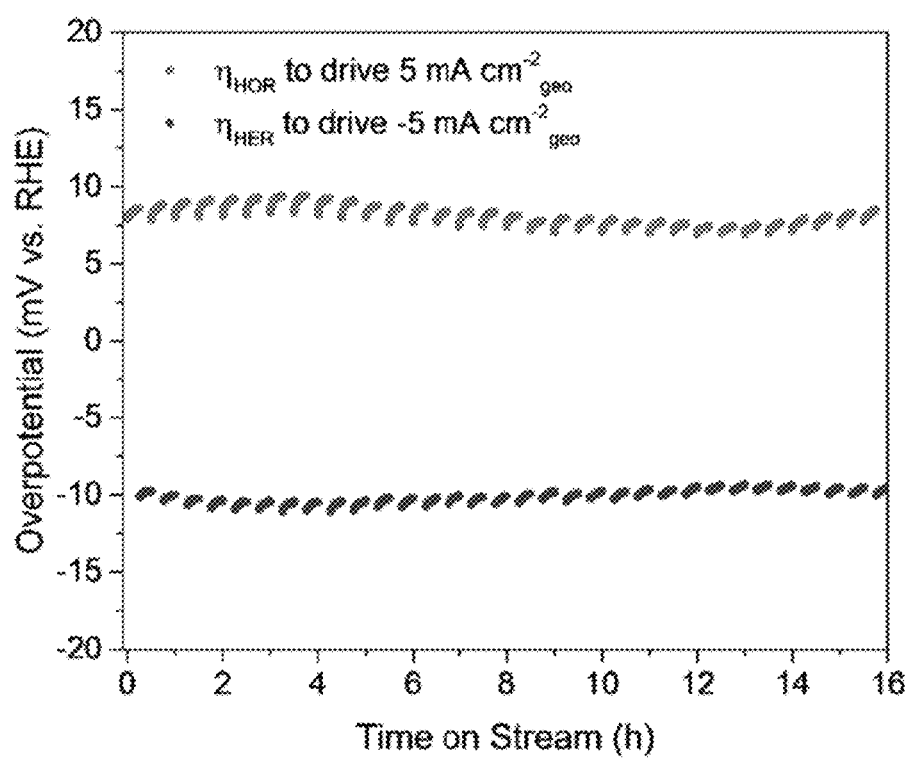
FIG. 49B shows chronopotentiometry studies for 0.25 ML Pt/TiWC catalyst involving over 140,000 turnovers on a mol H2 mol$^{-1}$ Pt basis. Cycling conditions: 10,000 cycles at 100 mV s$^{-1}$ from −50 mV to 600 mV in 1.0 M HClO$_4$. Chronopotentiometry conditions: +5 mA cm$^{-2}$$_{geo}$ for 15 min followed by −5 mA cm$^{-2}$$_{geo}$ for 15 min for 16 h, uncompensated.
Figure 50:
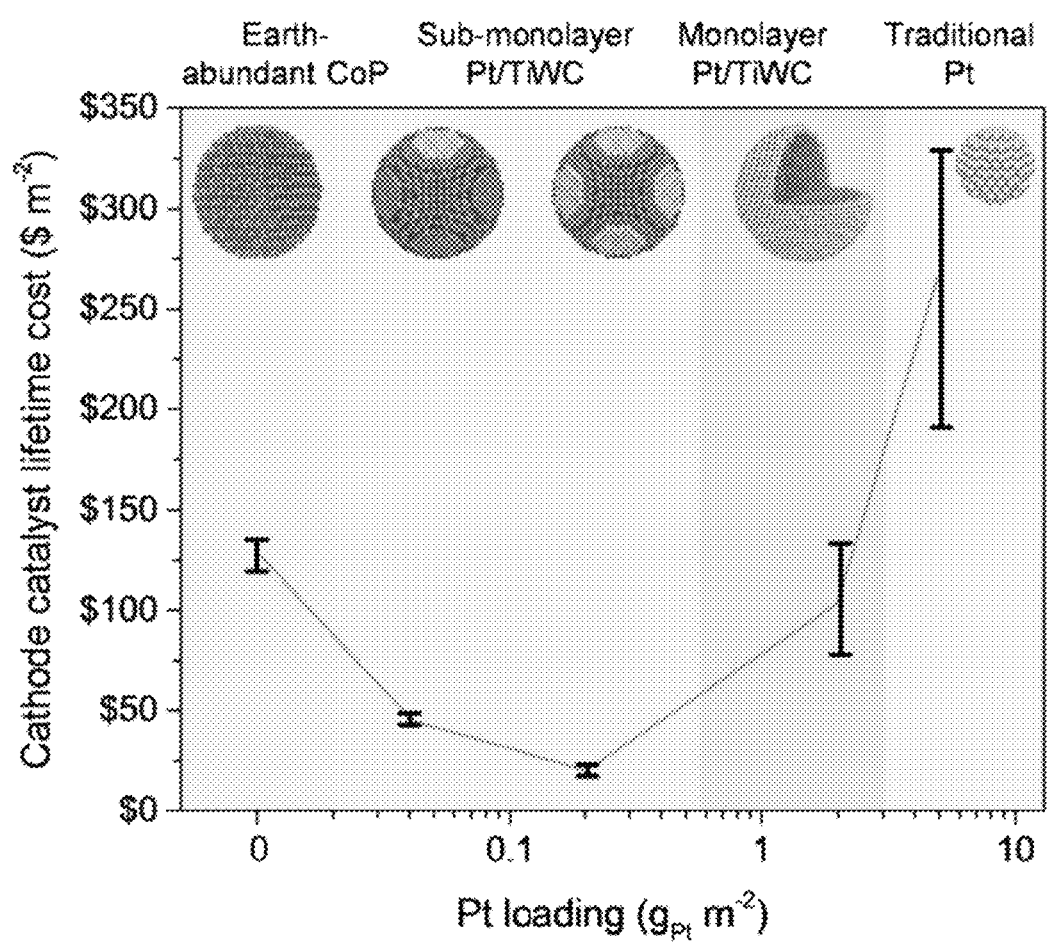
FIG. 50 shows a technoeconomic comparison of earth-abundant CoP catalyst with Pt-containing catalysts expressed as HER cathode catalyst lifetime cost vs. Pt loading. Error bars represent prediction intervals with 95% confidence.
Figure 51:
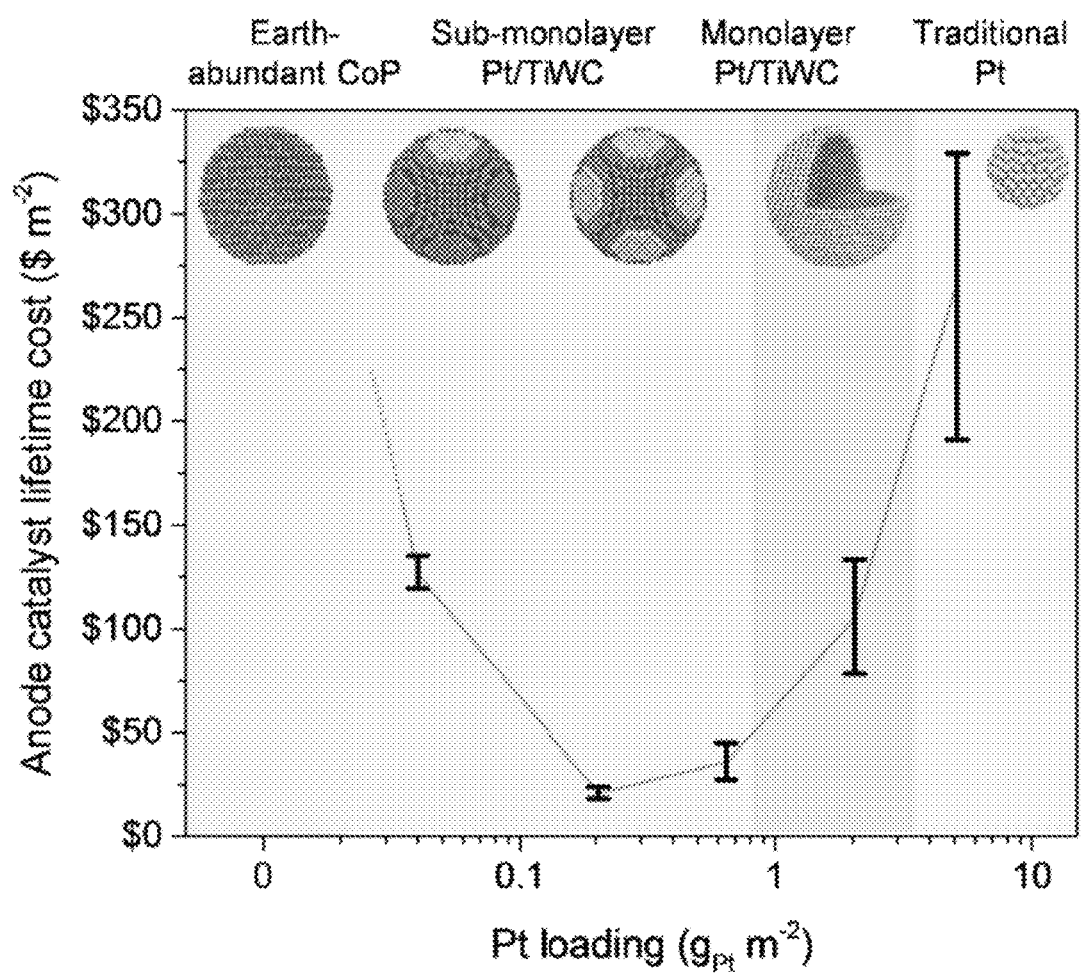
FIG. 51 shows a technoeconomic comparison of earth-abundant CoP catalyst with Pt-containing catalysts expressed as HOR anode lifetime cost vs. Pt loading. Error bars represent prediction intervals with 95% confidence.

Similarly, NM shells self-assemble onto bimetallic semi-carbide cores such as $(Cu_{0.2}W_{0.8})_2C$, $(Co_{0.2}W_{0.8})_2C$, and $(Ni_{0.3}W_{0.7})_2C$. The PXRD patterns of these core materials are representative of phase-pure semicarbide lattices (PDF #00-020-1315) (FIG. 42C), and STEM-EDX mapping of Pt/$(Cu_{0.2}W_{0.8})_2C$ nanoparticles shows distinct Pt shells (FIGS. 18 and 42B). The respective Pt:CuW ratios measured by XPS and ICP were 52% and 26%, respectively (FIG. 24).

TABLE 5

Chemical composition of core-shell materials.
Bulk chemical composition determined by ICP and surface chemical composition derived using deconvoluted XPS spectra shown in FIGS. 19-24, and 8F.

| Material | ICP-determined bulk composition | | | XPS-determined surface composition | | | Estimated number of ML |
|---|---|---|---|---|---|---|---|
| | NM ratio | TMC ratio | NM:TMC ratio | NM ratio | TMC ratio[1] | NM:TMC ratio | |
| Au/TiWC | Au | $Ti_{0.10}W_{0.90}$ | 6% | Au | N.R. | 7% | ~0.5 |
| Au/TiWC | Au | $Ti_{0.18}W_{0.82}$ | 13% | Au | $Ti_{0.12}W_{0.88}$ | 22% | ~1 |
| Au/TiWC | Au | $Ti_{0.14}W_{0.86}$ | 29% | Au | N.R. | 37% | ~2-3 |
| Pt/TiWC | Pt | $Ti_{0.08}W_{0.92}$ | 3% | Pt | N.R. | 6% | <0.5 |
| Pt/TiWC | Pt | $Ti_{0.10}W_{0.90}$ | 9% | Pt | N.R. | 26% | ~1 |
| $Pt_{C-S}$ | Pt | $Ti_{0.10}W_{0.90}$ | 28% | Pt | $Ti_{0.10}W_{0.90}$ | 49% | ~2-3 |
| Pt/CuWC | Pt | $Cu_{0.23}W_{0.77}$ | 26% | Pt | $Cu_{0.22}W_{0.78}$ | 52% | ~2-3 |
| $PtRu_{C-S}$ | $Pt_{0.66}Ru_{0.33}$ | $Ti_{0.11}W_{0.89}$ | 27% | $Pt_{0.76}Ru_{0.24}$ | $Ti_{0.10}W_{0.90}$ | 43% | ~2-3 |
| PtRh/TiWC | $Pt_{0.57}Rh_{0.43}$ | $Ti_{0.13}W_{0.87}$ | 26% | $Pt_{0.59}Rh_{0.41}$ | $Ti_{0.13}W_{0.87}$ | 52% | ~2-3 |

TABLE 5-continued

Chemical composition of core-shell materials.
Bulk chemical composition determined by ICP and surface chemical composition derived
using deconvoluted XPS spectra shown in FIGS. 19-24, and 8F.

| | ICP-determined bulk composition | | | XPS-determined surface composition | | | Estimated |
|---|---|---|---|---|---|---|---|
| Material | NM ratio | TMC ratio | NM:TMC ratio | NM ratio | TMC ratio[1] | NM:TMC ratio | number of ML |
| PtIr/TiWC | $Pt_{0.81}Ir_{0.19}$ | $Ti_{0.21}W_{0.79}$ | 25% | $Pt_{0.81}Ir_{0.19}$ | $Ti_{0.18}W_{0.82}$ | 45% | ~2-3 |
| PtAu/TiWC | $Pt_{0.93}Au_{0.07}$ | $Ti_{0.11}W_{0.89}$ | 26% | $Pt_{0.94}Au_{0.06}$ | N.R. | 55% | ~2-3 |
| PtAu/TiWC | $Pt_{0.69}Au_{0.31}$ | $Ti_{0.18}W_{0.82}$ | 27% | $Pt_{0.73}Au_{0.27}$ | $Ti_{0.16}W_{0.84}$ | 45% | ~2-3 |

N.R.—not reported as in some spectra the Ti 2p signal was not useable to estimate the surface intensity of Ti for reasons discussed in FIG. 22.
For multilayer core-shell NM/TMC NPs, the XPS-derived NM:TMC atomic ratio is much higher than the bulk NM:TMC ratio determined by ICP. Consistent with the PXRD data, TEM images, and STEM-EDX maps, this suggests a core-shell configuration in which the NM MLs screen the XPS signal of the sub-surface TMC core (see, D. V. Esposito et al., *Angew. Chem. Int. Ed.* 49, 9859-9862 (2010), which is incorporated by reference in its entirety). Concurrently, the close agreement between the XPS- and ICP-determined concentrations of elements in bimetallic cores confirms that they are equally screened by NMs. Similarly, the equivalent bimetallic NM composition determined by these two techniques indicates little partitioning of NMs into the carbide core.

The RME method also allows control of the NM shell thickness from sub-monolayer (ca. 0.5 ML) to multilayer (ca. 3 ML) coverages for mono- and heterometallic systems (FIG. 42D). For each material, the XPS-determined surface NM:TiW ratio was higher than the ICP-determined bulk NM:TiW ratio. Consistent with core-shell nanoparticles of varying shell monolayer coverages, the extent of this surface ratio enhancement correlates with the monolayer coverage, ranging from 1-3% at sub-monolayer coverages to 10-20% at multilayer coverages (Table 5). Unlike Au surfaces, the surface of Pt is well-known to passivate with a PtO layer, which is detectable as $Pt^{2+}$ with XPS. As the monolayer coverage decreased in the Pt/TiWC system (FIG. 42D, spectra f to d), the Pt 4f signals shifted to higher binding energies, reaching 72.3 and 75.7 eV for the sub-monolayer sample. The sole presence of PtO suggests the absence of any subsurface Pt. This sub-monolayer sample (denoted $Pt_{subML}$) could have important applications in thermal catalysis where both WC and Pt surface functionalities are accessible for catalytic transformations. Notably, when $Pt_{subML}$ was supported on carbon and heated to 400° C. and 600° C. in different atmospheres ($H_2$, dry $N_2$, or $H_2O$-saturated $N_2$), neither sintering nor discrete fcc Pt crystallites were detectable using PXRD, and an enriched Pt:W ratio showing only $Pt^{2+}$ surface species was observed with XPS (FIGS. 33, 34, 35, and 41). Collectively, TMC nanoparticles coated with NM monolayers offer new, highly tunable pathways for decreasing NM loading requirements while increasing activity and stability in thermal and electrocatalysis.

FIG. 33 shows TEM images of 20 wt % carbon-supported 4% Pt/96% $Ti_{0.1}W_{0.9}C$ NPs (denoted as $Pt_{subML}$) after various heat treatments in different atmospheres.

Figure 34B:
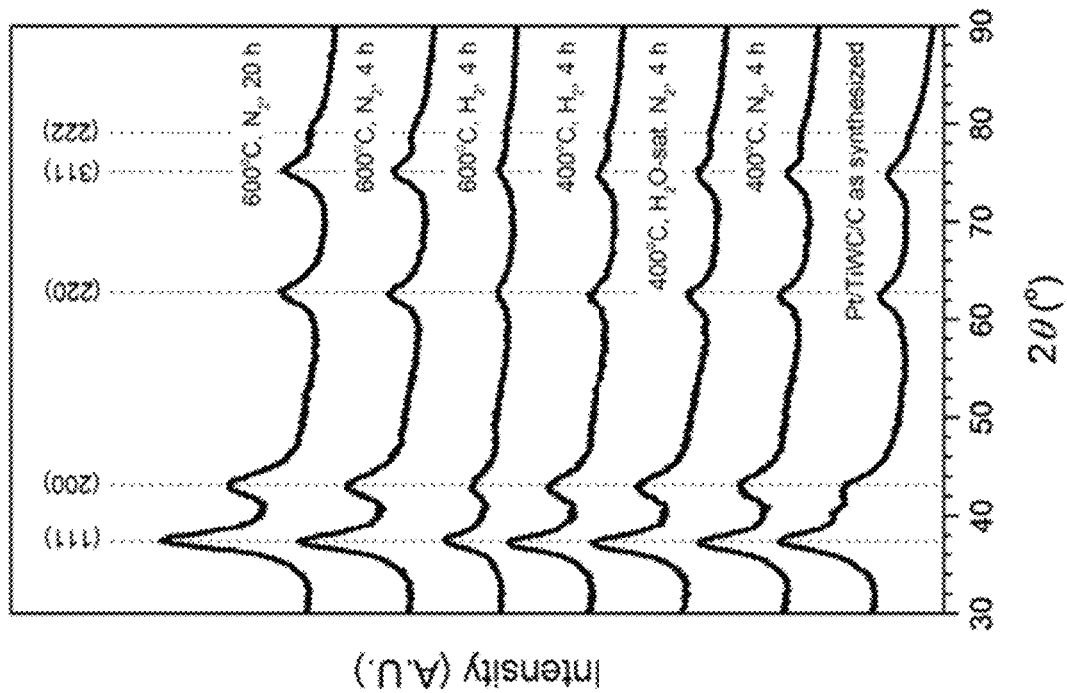
FIGS. 34A-34B show PXRD analysis of Pt$_{comm}$ and Pt$_{sub-ML}$ after various heat treatments.
Figure 34A:
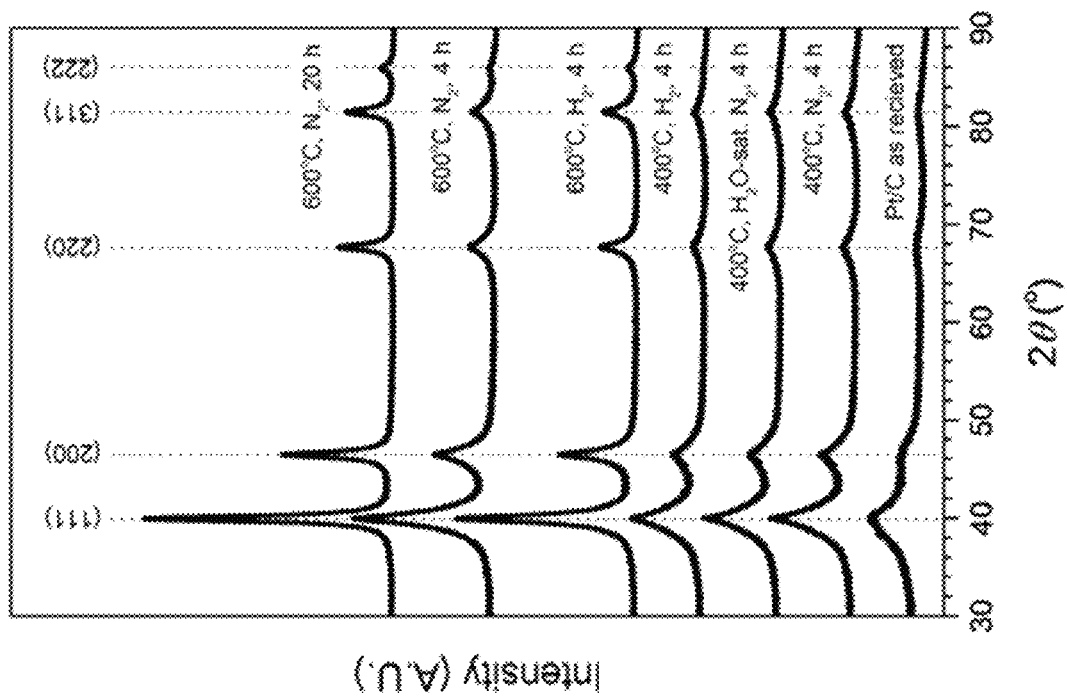

FIG. 34 shows PXRD diffractograms of $Pt_{comm}$ (FIG. 34A) and $Pt_{sub-ML}$ (FIG. 34B) heated to 400 or 600° C. in different atmospheres ($H_2$, dry and wet $N_2$ flow) for 4 or 20 h.

Figures 35A, 35B:
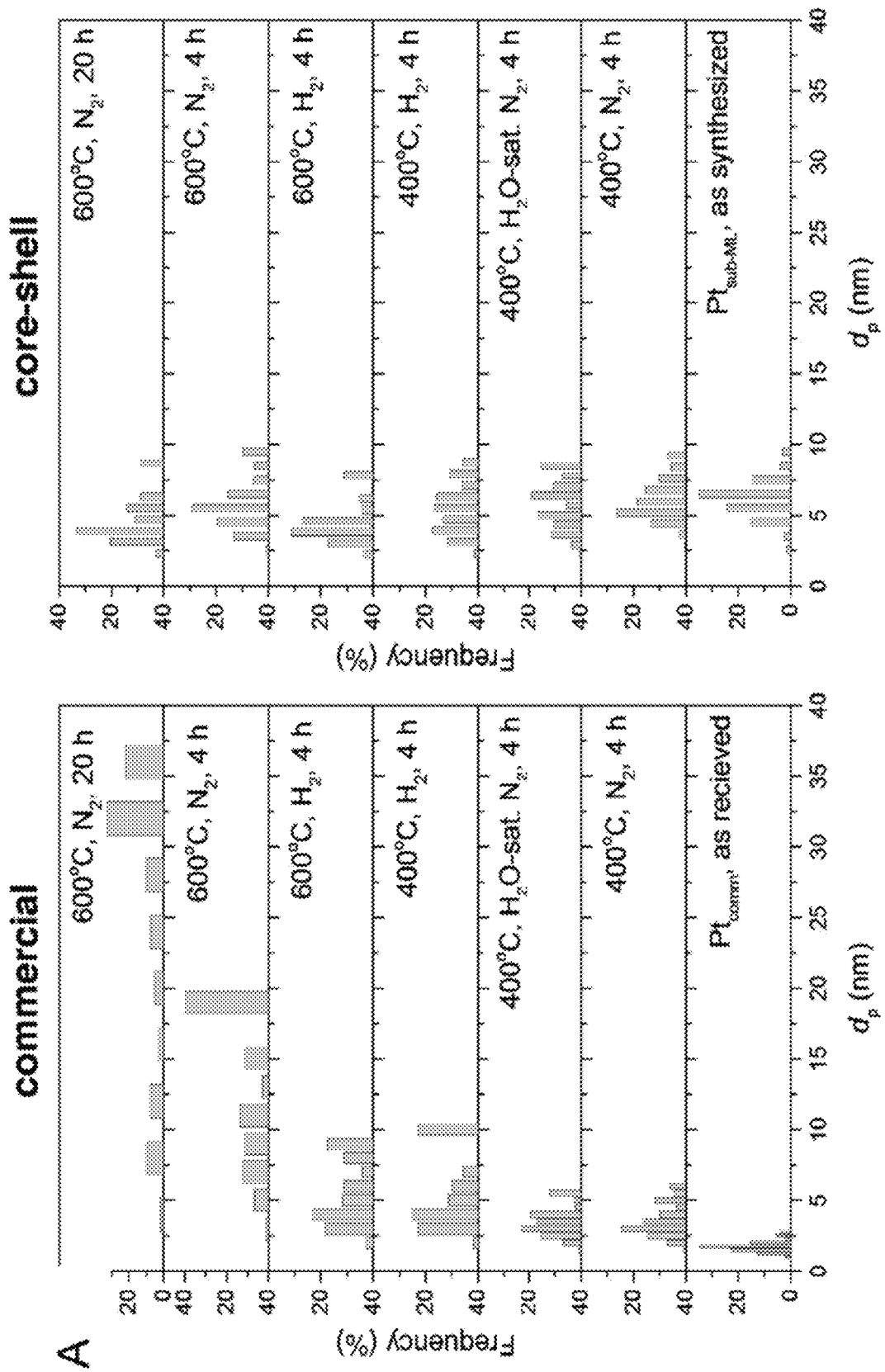
FIGS. 35A-35B show impact of various heat treatments on the PSDs of Pt$_{comm}$ and Pt$_{sub-ML}$.
Figure 36:
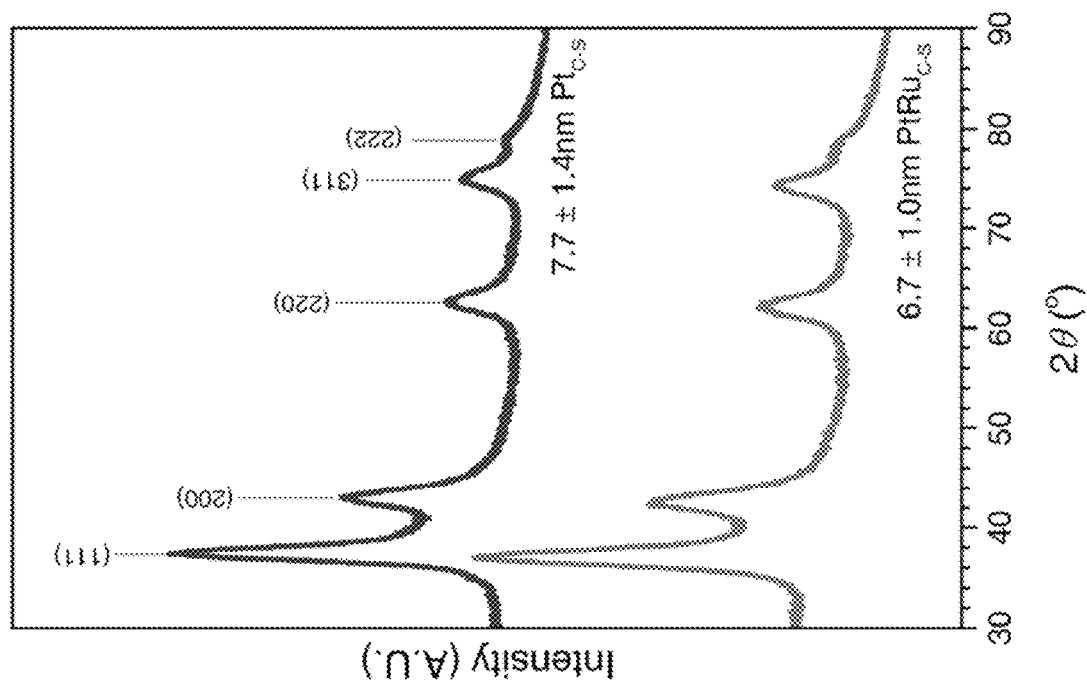
FIG. 36 shows PXRD comparison between Pt$_{C-S}$ and PtRu$_{C-S}$.

FIG. 35 shows Volume-weighted particle size distribution (PSD) plots for $Pt_{comm}$ (FIG. 35A) and $Pt_{sub-ML}$ (FIG. 35B) after various heat treatments in different atmospheres. Note that the x-axis varies from 0 to 40 nm in FIG. 35A and from 0 to 10 nm in FIG. 35B. The PSDs were determined from at least 200 nanoparticles from several images taken across the TEM grids.

Figure 41:
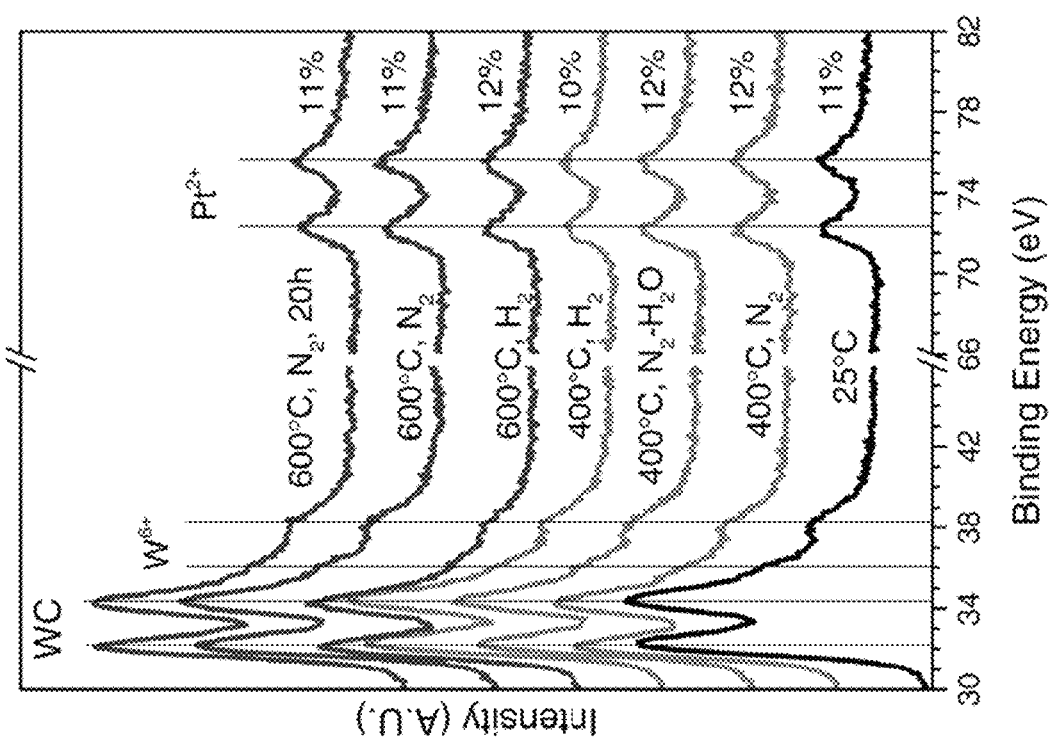
FIG. 41 shows XPS analysis of Pt$_{sub-ML}$ after various heat treatments.

FIG. 41 shows XPS study of the thermal stability of $Pt_{sub-ML}$ held in various atmospheres for 4 or 20 h and then passivated at room temperature. The percentages shown correspond to the XPS-determined Pt:W ratios. The ICP-determined bulk Pt:W ratio was 5%.

As disclosed herein, nanoparticles comprising a transition metal oxide core and a noble metal shell can be transformed into nanoparticles comprising a core including transition metal carbide, transition metal nitride, transition metal boride, transition metal sulfide, or transition metal phosphide, by carrying out the transformation in an immobilizing matrix, such as an inert inorganic matrix, for example, silica, alumina, germania, zirconia, or ceria.

A three-step method that allows for the production of non-sintered, surface impurity-free, ultrasmall nanoparticles including a core including transition metal carbide, nitride, sulfide, boride or phosphide that can be highly loaded onto a desired support is disclosed. For example, transition metal oxide nanoparticles can be encapsulated at room temperature within an inorganic matrix. The encapsulated transition metal oxide core of the nanoparticles can then be transformed to transition metal carbide, nitride, sulfide, boride or phosphide nanoparticles, for example, by carburization, nitridization, phosphorization, boridization or sulfidization in an appropriate atmosphere. Depending on the ultimate use of the transition metal carbide, nitride, phosphide, boride or sulfide nanoparticles, the inorganic matrix can be removed, for example, by room-temperature dissolution, to yield either a nanodispersion of nanoparticles or supported nanoparticles.

Nanoparticles can have a core/shell structure where the core includes a transition metal carbide, transition metal nitride or transition metal phosphide. The transition metal carbide can be a pure carbide or a mixed carbide, for example, a transition metal oxy carbide. Oxycarbides can be synthesized with any bulk carbon:oxygen stoichiometry. At low bulk oxygen concentrations, the tungsten moieties can be oxidized by oxygen without oxidation of the intercalated carbon moieties. These compositions can be prepared by exposing a carbide to an oxidizing atmosphere at elevated temperatures over long time periods. High bulk oxygen concentrations are typical for incompletely oxidized carbide materials in which local domains of tungsten moieties are oxidized with complete oxidation and removal of carbon via carbon dioxide release. Other localized moieties are incompletely oxidized and still contain intercalated carbons, giving an overall bulk carbon content that is low. Such materials are typically not isotropic and can be prepared by rapid heating and cooling in an oxidizing atmosphere via a furnace, a microwave, or using localized electric arc-based methods in a liquid environment.

The transition metal nitride can be a pure nitride or a mixed nitride, for example, a transition metal oxy nitride. The transition metal phosphide can be a pure phosphide or a mixed phosphide, for example, a transition metal oxy phosphide. For example, the transition metal carbide can be titanium carbide, zirconium carbide, hafnium carbide, vanadium carbide, niobium carbide, tantalum carbide, chromium carbide, molybdenum carbide, tungsten carbide, titanium oxy carbide, zirconium oxy carbide, hafnium oxy carbide, vanadium oxy carbide, niobium oxy carbide, tantalum oxy carbide, chromium oxy carbide, molybdenum oxy carbide, or tungsten oxy carbide. In another example, the transition metal nitride can be titanium nitride, zirconium nitride, hafnium nitride, vanadium nitride, niobium nitride, tantalum nitride, chromium nitride, molybdenum nitride, tungsten nitride, titanium oxy nitride, zirconium oxy nitride, hafnium oxy nitride, vanadium oxy nitride, niobium oxy nitride, tantalum oxy nitride, chromium oxy nitride, molybdenum oxy nitride or tungsten oxy nitride. In another example, the transition metal phosphide can be titanium phosphide, zirconium phosphide, hafnium phosphide, vanadium phosphide, niobium phosphide, tantalum phosphide, chromium phosphide, molybdenum phosphide, tungsten phosphide, titanium oxy phosphide, zirconium oxy phosphide, hafnium oxy phosphide, vanadium oxy phosphide, niobium oxy phosphide, tantalum oxy phosphide, chromium oxy phosphide, molybdenum oxy phosphide or tungsten oxy phosphide.

In addition, because a carburizing, nitridizing, sulfidizing, phosphidizing or boridizing atmosphere can be used to make the materials described herein, it is theoretically possible to synthesize any interstitial carbide provided an element has a naturally occurring carbide, nitride, or phosphide, and the formation of this material occurs below the onset of densification and crystallization of the inorganic matrix. For example, the inorganic matrix can be alumina, silica, germania, zirconia, or ceria. The synthesized materials can include carbides, nitrides, or phosphides of Group III (scandium, yttrium, or lutetium, but not including lawrencium), and all 3d transition metals including scandium, yttrium, vanadium, chromium, manganese, iron, cobalt, nickel, copper, or zinc. While the platinum group metals, rhenium and technetium can form carbides and nitrides, the synthesis would require conversion at high pressures and temperatures (e.g., ~2000K), conditions in which any known inorganic matrices would have near zero porosity, meaning the method as described herein would not work unless other matrix materials were developed that could support pores at the conversion temperatures.

F-block metals can also be used to make the materials described wherein, but these can be rare and have limited application. The notable exceptions are carbides, nitrides, and phosphides of lanthanum, cerium, neodymium or samarium. However, all of the lanthanides form stable carbides, nitrides, and phosphides at low temperatures, making them amenable to the removable ceramic coating method described herein. Neodymium is as abundant as nickel and iron in the earth's crust and its carbides, nitrides, and phosphides form at low temperature and have interesting optical and magnetic properties. Samarium phosphide is a unique small-band gap n-type semiconductor. The method could theoretically allow for the synthesis of ultrasmall samarium phosphide nanoparticles as this can be done below 1000 centigrade. Samarium isopropoxide is a commercially available and inexpensive.

For example, the core of the nanoparticle can have a composition of formula (I)

$$M1_x M2_y M3_z X1_{w1} X2_{w2} \qquad (I)$$

in which each of M1, M2 and M3, independently, is an transition metal element from the group consisting of group 3, group 4, group 5, group 6, 3d block, or f block, and each of X1 and X2, independently, is selected from the group consisting of O, C, N and P, at least one of X1 and X2 being C, N or P. Each of x, y, w1, w2, and z is a number between 0 and 1, where at least one of x, y, z, w1 and w2 is not zero and the combination of x, y, z, w1 and w2 complete the valence requirements of the formula. The transition metal element can include Ti, Zr, Hf, V, Nb, Ta, Cr, Mo and W.

The size of such nanoparticle can be less than 20 nm, less than 10 nm, less than 5 nm, less than 3 nm or less than 1 nm.

The nanoparticles with a metal oxide or metal core and a noble metal shell can be encapsulated in the inorganic matrix, reduced to a metal in a reducing atmosphere, and then carburized, nitridized, sulfidized, or phosphidized. For example, the metal oxide core can be reduced to metal in a carburizing atmosphere, such as a methane/hydrogen atmosphere, a carbon monoxide-based atmosphere, an ethane-based atmosphere, etc. and further carburized to metal carbides. In another example, metal oxide core can be nitridized in a nitridizing atmosphere, such as an ammonia-based atmosphere. In another example, metal oxide core can be phosphidized in a phosphidizing atmosphere, such as a phosphine-based atmosphere. In another example, metal oxide core can be phosphidized by mixing one reverse microemulsion with ammonium metatungstate (AMT) and a second reverse microemulsion with ammonium phosphate to make ammonium phosphotungstate, coating directly with an inorganic matrix in-situ, calcining at to make/transition metal oxide nanoparticles in the inorganic matrix, and reducing to make transition metal phosphide nanoparticles in the inorganic matrix. Transition metal boride core can also be prepared similarly by flowing diborane gas. Transition metal boride core can also exist for most of the d-block metals, including W and Ni. Nickel boride is a hydrogenation catalyst and is also ferromagnetic. The inorganic matrix can be removed, as necessary. The cores including transition metal carbonitrides, carbophosphides, or nitrophosphides can also be synthesized in appropriate conditions.

The inorganic matrix can include ceramics, silicates, glasses, aluminum silicates, alkali aluminum silicates, potassium silicates, sodium silicates, silicon carbides, silicon nitrides, cementitious materials, titanium oxides, aluminum oxides, magnesium oxides, boron oxides, phosphorus oxides, germanium oxides, indium oxides, tin oxides, zirconium oxides, cerium oxides or other matrix materials. The percentage of the transition metal can be greater than 1%, greater than 10%, greater than 20%, greater than 30%, or great than 40% in the inorganic matrix.

The inorganic coating matrix can be made by, for example, one of the following methods. The inorganic matrix can be made by wet chemical methods using a matrix precursor, or by atomic layer deposition. For example, an alumina layer can be created with Atomic Layer Deposition using trimethyl aluminum and water. When 60 cycles were performed, a uniform 8 nm coating of alumina was obtained on a $WO_3/Al_2O_3$ sample. The material can then be reduced and carburized to form $Al_2O_3/\alpha\text{-}WC/Al_2O_3$. The $WO_3$ can initially be supported on other catalysts as well such as titania, ceria, silica, zirconia, or zeolites such as ZSM-5. In addition to alumina layers using trimethyl aluminum, other inorganic oxide overlayers can be prepared from other standard ALD precursors, such as tris(cyclopentadienyl) cerium, tetrakis(dimenthylamino)hafnium, silicon(IV) chloride, tetrakis(dimethylamino)titanium(IV), or tetrakis(dimethylamino)zirconium(IV).

Matrix precursors can be selected from a metal oxide precursors, such as a metal halide or alkoxide, titanium alkoxide, an aluminum alkoxide, a silicon alkoxide, a magnesium alkoxide, a boron alkoxide, a phosphorus alkoxide, a germanium alkoxide, an indium alkoxide, a tin alkoxide, a zirconium alkoxide, or mixtures thereof. The metal oxide precursor can be obtained commercially or prepared by contacting a metal halide with an alcohol. The precursor can then be formed into an inorganic matrix through controlled hydrolysis. The inorganic matrix is itself a metal oxide, and therefore all of the techniques described for making the nanoparticles also apply to the inorganic matrix. The matrix can be made colloidally, within a reverse microemulsion, within a microemulsion, using a sol-gel technique, or solvothermally. This disclosure describes the Brij/heptane/water reverse microemulsion system to coat NM/TMO NPs with silica. Unlike other systems (such as Igepal), this method makes it possible to encapsulate a plethora of ultrasmall NM/TMO NPs within discreet silica nanospheres, in a highly efficient manner. In general, any silicon precursor can be used. Tetraethyl orthosilicate (TEOS), a metal alkoxide, can be chosen for the purpose because it is inexpensive and highly pure. It slowly hydrolyzes in water to form a silica polymer network (the inorganic matrix). The speed at which this polymer network forms can be controlled by adding a catalyst (either an acid or a base). A "slow" reaction is typically preferred to ensure uniform encapsulation of the nanoparticles or uniform incorporation of a precursor.

The "removable ceramic coating method" presented here offers the ability to synthesize ultrasmall, metal-terminated, non-sintered monometallic and heterometallic transition metal carbides that can be stored as a nanodispersion or dispersed at any desired loading on a support of interest. The method can be extended to manufacture other NM/TMX nanoparticles with monometallic and heterometallic carbides, nitrides, phosphides, borides, and sulfides core by using the corresponding gaseous reactive precursor.

EXAMPLES

Materials

Reverse microemulsions were prepared from anhydrous n-heptane (Sigma-Aldrich, 99%, stored under ambient conditions), polyoxyethylene (4) lauryl ether (Sigma-Aldrich, Brij® L4, average $M_n$ ~362), ammonium hydroxide solution (Sigma-Aldrich, 28-30%), and deionized (DI) water (18.2 MΩ·cm). For syntheses involving the precipitation of Ir and Rh chloride salts, ammonium chloride (Sigma-Aldrich, 99.5%) was also added. Monometallic and heterometallic transition metal oxide (TMO) nanoparticles (NPs) were obtained by co-hydrolysis of commercially available metal alkoxides and metal alkoxides prepared from commercially available metal chloride salts. These consisted of tungsten (IV) chloride (Strem Chemicals, 97%) prepared with anhydrous isopropanol (IPA, Sigma-Aldrich, 99.5%), titanium (IV) isopropoxide (Sigma-Aldrich, 97%), cobalt (II) isopropoxide (Alfa Aesar), nickel (II) methoxyethoxide (Alfa Aesar, 5% w/v), and copper (II) isopropoxide (Alfa Aesar, 98%). The metal oxide NPs were coated with noble metals (NM) using as-received commercially available hydrated noble metal chloride ($NMCl_x$) salts. These consisted of ruthenium (III) chloride hydrate (Strem Chemicals, 99.9% Ru), rhodium (III) chloride hydrate (Strem Chemicals, 38-41% Rh), iridium (III) chloride hydrate (Strem Chemicals, 99.9% Ir), chloroplatinic acid (Strem Chemicals, 99.9%), and chloroauric acid (Strem Chemicals, 99.8%). The $NMCl_x$/TMO NPs were coated with silica nanospheres upon hydrolysis of tetraethyl orthosilicate (Sigma-Aldrich, 99%).

The materials were carburized in a methane/hydrogen atmosphere (Airgas, uhp grade 5). The silica shells were removed using 1% HF diluted in ethanol (200 proof) prepared from 48 wt % HF in $H_2O$ solution (Sigma-Aldrich, 99.99% trace metals basis). The NM/TMC NPs were supported on carbon black (Cabot, Vulcan® XC-72r) or dispersed using oleylamine (Sigma-Aldrich, 70%).

Stock electrolyte solutions were prepared from DI water (18.2 MΩ·cm), perchloric acid (GFS chemicals Veritas® double distilled, 70%), and methanol (Sigma-Aldrich traceSELECT®, 99.9%). The electrolyte solutions were degassed with argon (Airgas, uhp grade 5), hydrogen (Airgas, uhp grade 5), and carbon monoxide (Airgas, uhp grade 3). 0.1 M NaOH solution was prepared from DI water and NaOH pellets (Sigma-Aldrich, 99.99% trace metals basis). Commercial 20 wt % Pt (denoted as $Pt_{comm}$) and 20 wt % (1:1) PtRu (denoted as $PtRu_{comm}$) catalysts supported on Vulcan® were supplied by Premetek (Wilmington, DE).

Synthesis

Preparation of the tungsten alkoxide precursor: The tungsten precursor stock solution was prepared from commercial $WCl_4$ by addition of anhydrous isopropanol (IPA). Under constant stirring, 10 mL of anhydrous IPA was injected into a round bottom flask containing 5.0 g of $WCl_4$ under a continuous $N_2$ purge at 60° C. in a well-ventilated fume hood. Within the first minute, the grey-green $WCl_4$ transitions to a purple intermediate and then to a black-brown liquid. The residual liquid was allowed to slowly evaporate at 60° C. under a constant $N_2$ purge, leaving a black-brown solid. This procedure was repeated two additional times with 20 mL of anhydrous IPA to remove any residual HCl. The final product was diluted by addition of 100 mL of anhydrous IPA and stored under inert conditions.

Preparation of titanium, copper, and cobalt alkoxide precursors: Stock solutions of titanium (IV) isopropoxide (TiIPO), copper (II) isopropoxide (CuIPO), and cobalt (II) isopropoxide (CoIPO), were prepared by diluting the commercially available isopropoxides with anhydrous isopropanol to a final concentration of 5% w/v for TiIPO and 1% w/v for CuIPO and CoIPO. This step resulted in a slurry for CuIPO and CoIPO solutions.

Synthesis of $SiO_2$/$NMCl_x$/TMO NPs: A reverse microemulsion (RME) was prepared under constant stirring in ambient conditions by mixing 240 mL of n-heptane, 54 mL of Brij-L4® surfactant, 7.8 mL of ultrapure deionized water, and 1.4 mL of $NH_4OH$ solution, resulting in an optically transparent and colorless RME. In the synthesis involving Ir or Rh, $NH_4Cl$ was dissolved in ultrapure deionized water before addition into the emulsion (molar ratio of $NH_4Cl$ to Rh or Ir=6:1).

A metal alkoxide mixture was prepared by mixing aliquots of the metal alkoxide stock solutions in the desired ratio. Under ambient conditions without the need for a Schlenk line, the metal alkoxide mixture was diluted with 120 mL of n-heptane. The diluted metal alkoxide mixture was then added to the RME under constant mixing over the span of a few minutes. The RME was allowed to mix under ambient conditions for 4 h to form bimetallic transition metal oxide (TMO) NPs. During this time, the RME remained optically transparent for all syntheses, but the color varied depending on the metals used and the metal ratios. This solution will be referred to as the TMO RME.

While the TMO RME was reacting, a separate RME containing noble metal salts, further referred to as the NM RME, was prepared. For this synthesis, commercially available hydrated noble metal chloride salts dissolved in 1 mL of ultrapure deionized water were rapidly injected to a mixture of 46 mL of n-heptane with 7.2 mL of Brij-L4® surfactant to obtain an optically transparent RME of various colors depending on the noble metals employed.

The NM RME was gravity-fed dropwise over ~30 min to the TMO RME under constant mixing to form the NM/TMO RME. After 4 h of mixing the NM/TMO RME remained optically transparent. Next, 1.5 mL of tetraethyl orthosilicate (TEOS) was added rapidly to the NM/TMO RME and allowed to react for 16.5 h. During this time, the NM/TMO RME gradually became translucent.

After 16.5 h, 300 mL of methanol was added rapidly to the RME under constant mixing to precipitate the $SiO_2$/NM/TMO NPs. After 15 min, the mixing was stopped and the $SiO_2$/NM/TMO NPs were allowed to flocculate and sediment over 1 h to form a three-phase mixture: a heptane-rich upper phase, a methanol-rich middle phase, and the $SiO_2$/NM/TMO NP precipitant on the bottom. The NPs were obtained by decanting off the top two layers and centrifuging the remaining slurry at 4,000 rpm. The wet cake was then redispersed in acetone to remove residual surfactant and centrifuged at 6,000 rpm. The acetone was then removed and the $SiO_2$/NM/TMO wet cake was dried under a stream of $N_2$. The product cake was then stored under ambient conditions. The above standard synthesis produces ca. 600 mg of recovered $SiO_2$/NM/TMO product. For most syntheses explored in this work, all of the quantities reported were doubled to obtain >1 g of product. Table 1 details the exact quantities of reagents used and the composition of the resulting products, determined using ICP-MS.

Carburization of $SiO_2$/NM/TMO NPs: Approximately 500 mg of as-synthesized $SiO_2$/NM/TMO powder was spread into an alumina crucible and purged with $N_2$ for 30 min in a tubular furnace. The inlet gas was then switched to 130 $cm^3$(STP)/min of $H_2$ and 23 $cm^3$(STP)/min of $CH_4$. Using a 2° C./min ramp rate, the furnace was then heated to 900° C. and held for 5 h. During the final 30 min, the flowrate of $CH_4$ was turned off. The furnace was then allowed to cool naturally with the lid closed under 130 $cm^3$(STP)/min of $H_2$ to room temperature. Once at room temperature, the furnace was purged with $N_2$ bubbled through an $H_2O$ saturator for 2 h at 95 $cm^3$(STP)/min and then passivated using a 1% $O_2$/99% $N_2$ mixture for 2 h. After passivation, the samples were stored in a dry $N_2$ glovebox.

For samples containing Ru, Rh, or Ir, the tubular furnace was heated to 1000° C. under 130 sccm of $H_2$ and 23 sccm of $CH_4$. Once 1000° C. was reached, the methane flow was stopped and the samples were held at 1000° C. for 30 min under 130 sccm of $H_2$ before cooling to room temperature and passivating normally.

Removing $SiO_2$ to obtain NM/TMC nanodispersions or supported NM/TMC: To remove the encapsulating $SiO_2$ shells, ~60 mg of $SiO_2$/NM/TMC powder was added to a well-mixed solution of 10 mL of degassed ethanol and 200 μL of reagent-grade 48 wt % aqueous HF solution prepared such that the molar ratio of HF:$SiO_2$ was approximately 6:1. Furthermore, 600 μL of 70% technical grade oleylamine or a high surface area support, such as carbon black, were added to obtain a nanodispersion or a supported catalyst, respectively. After 18 h at room temperature and constant mixing, the NM/TMC was recovered by centrifuging at 6,000 rpm and rinsed thoroughly with degassed ethanol and degassed water. The powder was dried under vacuum and stored in a dry $N_2$ glovebox.

Characterization

Transmission Electron Microscopy (TEM) and Scanning Transmission Electron Microscopy (STEM) was performed on a JEOL 2010F equipped with a field emission gun (FEG) operating at 200 kV. Magnifications of obtained images ranged from 25,000× to 600,000×. STEM was performed using high-angle annular dark field (HAADF) mode.

Aberration-Corrected STEM with EDX Mapping/Linescans was performed on an FEI equipped with a CEOS probe-side aberration corrector operated at 200 kV, with a probe convergence angle of 24.5 mrad. HAADF mode was used for imaging, with probe current of ~25 pA, and spatial resolution <0.1 nm. EDS spectrum images were taken (EDAX EDS detector, 128 eV resol.) with a probe current ~200-780 pA, and spatial resolution ~0.16-0.29 nm. Sample preparation for STEM included dispersion in ethanol or acetone, ultra-sonication for 30 min, and then deposition onto carbon copper TEM grids. STEM samples were plasma cleaned for 15 min before loading into the microscope.

X-ray Photoelectron Spectroscopy (XPS) was performed on a PHI Versaprobe II equipped with a multichannel hemispherical analyzer and a monochromatic aluminum anode X-ray source operating at 100 W with a 100 μm beam scanned over a 1.4 mm line across the sample surface. A dual-beam charge neutralization system was used with an electron neutralized bias of 1.2 eV and an argon ion beam energy of 10 eV. All spectra were charge corrected by referencing the adventitious C 1s signal to 284.7 eV. Samples were prepared by mounting powders onto electrically conductive copper tape. For unsupported nanodispersions, the nanodispersions were dispersed in DI water without the use of any ligands or capping agents. The nanodispersion was then dripped onto the copper tape and the water was evaporated to obtain a nanoparticle thin film.

Inductively Coupled Plasma Mass Spectrometry (ICP-MS) was performed on an Agilent 7900 ICP-MS.

Powder X-ray Diffraction (PXRD) was performed on a Bruker D8 diffractometer using Cu Kα radiation. Data were recorded in the range of 15-90° 2θ with an angular step size of 0.01° and a counting time of 0.1 s per step.

Thermogravimetric Analysis (TGA) was performed on a Q500 thermal analysis system (TA Instruments) between 25 and 800° C. (with 15 min isothermal hold at 150° C.) using a heating ramp of 5° C./min under 25 sccm of air and 5 sccm of $N_2$ flow.

Electrochemical Study

Electrochemical measurements were performed on a CH Instruments 627e potentiostat/galvanostat using a BASi RDE-2 rotating disk electrode equipped with a jacketed glass cell and PTFE cap. The cell was maintained at a constant temperature of 30.0° C. Viton® o-rings were used to seal the electrodes and bubbler into the ports of the PTFE cap. In all experiments, a platinized platinum coil was used as the counter electrode. An eDAQ Hydroflex™ Hydrogen Reference Electrode was used as the reference electrode, except for experiments involving the presence of CO in the electrolyte, in which a leak-proof 3 M NaCl Ag/AgCl reference electrode calibrated to the eDAQ hydrogen reference electrode was employed. All potentials are reported versus RHE. iR compensation was used where reported, while the uncompensated solution resistance was typically ~30Ω.

Gases were delivered to the electrochemical cell using a high surface area fritted glass bubbler and controlled using a calibrated Sierra SmartTrak® mass flow controller. For measurements involving $CO/H_2$ mixtures, the CO was delivered using a calibrated Sierra MicroTrak® ultra low flow controller.

3 mm glassy carbon (GC) disk electrodes were used as the substrate for the catalyst inks. The GC working electrodes were freshly polished using a 0.05 µm alumina suspension on a Texmet pad for 2 min in a figure eight pattern, rotating 90° every 30 sec. The electrodes were then rinsed with methanol, sonicated for 5 sec in acetone, rinsed thoroughly with DI water and dried in $N_2$ flow.

Catalyst inks were prepared from a common stock solution consisting of 50 mL of DI water, 4 mL of isopropanol, and 1 mL of 5% Nafion® 117 solution. For all experiments, the inks consisting of 3 mg of catalyst by total mass per 1 gram of solution, were sonicated for 1 hour in an ice bath. Immediately after sonicating, 6 µL droplets were loaded onto the surface of the freshly cleaned GC working electrodes. The electrodes were then dried by pulling a slow vacuum to −380 Torr, holding for 5 min, and then pulling a slow vacuum to −710 Torr and holding for 15 min to obtain an optically uniform black thin film. For the control catalysts, the NM loading was ~51 $\mu g/cm^2_{geo}$ while for the core-shell catalysts, the NM loading was ~20 $\mu g/cm^2_{geo}$. Exact loadings were determined using ICP-MS.

The working electrodes were then pre-treated by rinsing with DI water, swirling in 0.1 M NaOH solution for 2 min, and then rinsing again with copious amounts of DI water. The working electrode was always lowered into fresh electrolyte solutions under potential control at 0.1 V. The final pretreatment step consisted of 100 conditioning cyclic voltammetry (CV) scans performed from −0.05 V to 0.6 V at 200 mV/s and a rotation rate of 2500 rpm in Ar-purged 0.1 M $HClO_4$. Pt/C was conditioned by cycling from −0.05 V to 1.2 V.

The electrolyte was then switched to fresh $H_2$-purged 0.1 M $HClO_4$ for HER/HOR studies at 0, 400, 900, 1000, 1600, and 2500 rpm. These measurements were performed at 10 mV/s followed by chronoamperometry and chronopotentiometry HER studies at 2500 rpm.

Afterwards, a fresh $H_2$-purged 0.1 M $HClO_4$ electrolyte was used for CO/HOR studies. After an initial HOR scan at 2 mV/s and 1600 rpm, the working electrode was held at 0.025 V and 1600 rpm for an arbitrarily long time (e.g. 180 min) while the gas flow was switched to 99.9±0.1 mL/min $H_2$ and 100±1 µL/min of CO. Once the geometric current dropped below 0.1 mA/cm² (typically requiring approximately 2 h), an iR-compensated LSV was performed from 0.025 V to 0.6 V at 2 mV/s. A low potential of 0.025 V was used because the NM/TMC core shell materials would not saturate with CO at 0.05 V or above due to their high CO tolerance.

Finally, the electrolyte was changed to Ar-saturated 0.1 M $HClO_4$ and the working electrode was conditioned from −0.05 V to 1.0 V at 1600 rpm and 50 mV/s for 20 cycles. Next, 3 cycles from 0.025 V to 1 V at 0 rpm and 20 mV/s were performed to obtain an estimate for the $H_{upd}$-ECSA. The working electrode was then held at 0.025 V and 1600 rpm for 10 min under a pure CO purge and then for another 10 min under a pure Ar purge to remove excess CO. Immediately, 3 iR-compensated cyclic voltammograms (CVs) were performed from 0.025 V to 1.0 V at 50 mV/s.

Methanol electrooxidation (MOR) was performed in Ar-purged 1 M MeOH and 0.1 M $HClO_4$ solution at 30° C. and a rotation rate of 1000 rpm. Under these conditions, the limiting current is approximately 4.5 $A/cm^2_{geo}$. However, the measured currents in this study were at least 1.8 orders of magnitude below this limiting current. To remove excess bubbles, a rotation rate of 2500 rpm was used during high potential CV measurements and CA measurements when holding at a fixed potential of 0.6 V. After a working electrode was lowered into the MOR electrolyte, 100 conditioning scans were performed between −0.05 V and 0.6 V at 200 mV/s. Afterwards, iR-compensated CA measurements were conducted by holding the electrode at fixed potentials for 15 min intervals at 0.35 V, 0.4 V, 0.45 V, and 0.6 V. The activity was computed by averaging the current over the last minute. Then, iR-compensated CV measurements were performed by cycling between 0.025 V and 1.2 V at 50 mV/s.

Stability studies were conducted in Ar-saturated 1 M MeOH and 0.1 M HClO4 solution at 30° C. and 1000 rpm from −0.05 V to 0.6 V at 100 mV/s. During this time, the working electrode oscillated rapidly between performing HER, HOR, and MOR. After 10,000 cycles, a regeneration was attempted by thoroughly rinsing each working electrode with DI water, swirling in 0.1 M NaOH solution for 2 min at room temperature, and then rinsing again with copious amounts of DI water.

Thermal Study

4% Pt/96% $Ti_{0.1}W_{0.9}C$ supported on carbon black at 20 wt % (denoted as $Pt_{subML}$) and $Pt_{comm}$ were loaded into alumina crucibles and subjected to various heat treatments to examine the propensity towards sintering and the stability of sub-monolayer Pt loadings on the surface of TiWC NPs. Heating was always performed at 2° C./min in a 5% $H_2$/95% $N_2$ atmosphere using a quartz tubular furnace under 100 $cm^3$(STP)/min of total gas flow. Once the final temperature was reached, the atmosphere was changed to either 100% $H_2$, 100% $N_2$, or $H_2O$-saturated $N_2$ (saturated using a room-temperature saturator). The final temperature was maintained for 4 h, except for one heat study at 600° C. in 100% $N_2$ where the final temperature was held for 20 h. After the specified time had elapsed, the furnace was allowed to cool naturally with the lid closed under 100 $cm^3$ (STP)/min of whichever atmosphere was under study. Once at room temperature, the furnace was purged with $N_2$ bubbled through an $H_2O$ saturator for 2 h at 95 $cm^3$(STP)/min and then passivated using a 1% $O_2$/99% $N_2$ mixture for 2 h. After passivation, the samples were stored in a dry $N_2$ glovebox.

Theoretical Study

All calculations were performed within the DFT construct as implemented in the Vienna ab initio Simulation Package (VASP). See, G. Kresse, J. Furthmüller, *Physical Review B* 54, 11169-11186 (1996), which is incorporated by reference in its entirety. Starting with the experimentally determined crystallographic structure of fcc-WC, the lattice parameters and atomic positions were optimized using the PBEsol functional (see, J. P. Perdew, K. Burke, M. Ernzerhof, *Phys. Rev. Lett.* 77, 3865-3868 (1996), which is incorporated by reference in its entirety), with a Gamma point-centered 10×10×10 k-mesh and a 500 eV planewave cutoff. These criteria resulted in energies converged to at least 0.01 eV per atom. The [111] surface was then cut from this optimized structure. The most suitable material was determined by successive iterations to be a stoichiometric polar construction, in contrast to non-stoichiometric surface reconstructions known for other fcc materials (see, F. Finocchi, A. Barbier, J. Jupille, C. Noguera, *Phys. Rev. Lett.* 92, 136101

(2004), which is incorporated by reference in its entirety) and non-polar terminations for semiconductors (see, D. O. Scanlon et al., *J. Phys. Chem. C* 111, 7971-7979 (2007), which is incorporated by reference in its entirety). Although this termination results in a dipole across the cell, the effect is only non-trivial in semiconductors; the metallic nature of TiWC permits the use of such topology (FIG. 37).

The slab was then expanded to a 2×2×1 supercell with a 15 Å vacuum layer. Ti substitutions were then made to the crystalline slab at 10 wt % loading in W lattice sites. The slab, shown in FIG. 37, was then relaxed with respect to atomic positions using a 2×2×1 Gamma point-centered k-mesh and the same energetic cutoffs as the bulk material. The Pt layer was then built by the addition of a layer of [111] Pt on the W-terminated surface. The initial Pt positions occupied the next layer C sites. This lattice spacing was a reasonable starting point as it resulted in similar Pt—Pt distances to bulk Pt [111]. To achieve sub-monolayer loading, random Pt atoms were removed from the perfect [111] surface coating. Post-monolayers were constructed in a similar fashion, through the addition of a second depleted Pt [111] layer.

To provide a description of the surface topology of the Pt at synthetically relevant temperatures, ab initio molecular dynamics was used to introduce heat (nuclear kinetic energy) to the slab. Heating was performed from 0 to 700° C. in 0.1° C. per 5 fs time steps. The structure was then held at the terminal temperature to reach a steady-state structure. 700° C. was determined a sufficient final temperature from studies up to 1700° C., which did not alter the 700° C. steady-state structure.

The standard state for Pt was obtained by full optimization of the experimental crystal structure, using 500 eV cutoff and an 8×8×8 k-mesh. Slabs of Pt were constructed in the same fashion as WC, and TiWC. Surface binding energies were computed using a previously presented method (5). See, J. K. Nørskov et al., *J. Electrochem. Soc.* 152, J23-J26 (2005), which is incorporated by reference in its entirety.

Workfunctions were aligned using a code freely available online. See, K. T. Butler, C. H. Hendon, A. Walsh, *J. Am. Chem. Soc.* 136, 2703-2706 (2014), which is incorporated by reference in its entirety. Electronic d-band centers were aligned through the integral of the partial density of states for relevant atoms. See, B. Hammer, J. K. Nørskov, *Surface Science* 343, 211-220 (1995), which is incorporated by reference in its entirety.

Other embodiments are within the scope of the following claims.

What is claimed is:

1. A composition comprising: a plurality of nanoparticles, each nanoparticle independently comprising a transition metal ceramic core having a composition of formula (I):

$$M1_xM2_yM3_zX1_{w1}X2_{w2} \qquad (I)$$

wherein each of M1, M2 and M3, independently, is a transition metal element selected from 3d block or f block;

and each of X1 and X2, independently, is selected from the group consisting of C, B, and P, provided that at least one of X1 and X2 is selected such that the resulting compound is a boride, carbide, or phosphide of the transition metal;

wherein each of x, y, w1, w2, and z is a number between 0 and 3, where at least one of x, y, z, w1 and w2 is not zero and the combination of x, y, z, w1 and w2 completes the valence requirements of the formula; and wherein M1, M2, or M3 further comprises Zr, Hf, Nb, or Ta;

the core having a uniform composition and a monolayer shell consisting of a noble metal in direct contact with the core, the core consisting of corrosion-resistant, and electrically conductive material with a melting point that binds to the noble metal shell and is insoluble in the noble metal lattice; and each nanoparticle has a noble metal monolayer surface coverage ratio of 0.5-3.

2. The composition of claim 1, wherein the shell further comprises Sn, Pb, or any combinations thereof.

3. The composition of claim 1, wherein the size of the nanoparticle is no more than 10 nm.

4. The composition of claim 1, wherein the size of the nanoparticle is no more than 5 nm.

5. The composition of claim 1, wherein X1 is carbon, x is 1, w1 is 1, and y, z and w2 are zero.

6. The composition of claim 1, wherein M1, M2, or M3 further comprises Zr.

7. The composition of claim 1, wherein M1, M2, or M3 further comprises Hf.

8. The composition of claim 1, wherein M1, M2, or M3 further comprises Nb.

9. The composition of claim 1, wherein M1, M2, or M3 further comprises Ta.

10. The composition of claim 1, wherein the noble metal is selected from Pd, Ru, Rh, Ir, Os and Ag.

* * * * *

UNITED STATES PATENT AND TRADEMARK OFFICE
CERTIFICATE OF CORRECTION

PATENT NO. : 12,303,875 B2
APPLICATION NO. : 15/344544
DATED : May 20, 2025
INVENTOR(S) : Hunt et al.

It is certified that error appears in the above-identified patent and that said Letters Patent is hereby corrected as shown below:

In the Specification

In Column 1, Lines 10-15, delete:
"This invention was made with government support under Grant No. DE-FG02-12ER16352 and DE-SC0014058,, awarded by the Department of Energy, Office of Basic Energy Sciences, Grant No. ACI-1053575, awarded by the National Science Foundation. The government has certain rights in this invention."

And insert:
-- This invention was made with government support under DE-FG02-12ER16352 and DE-SC0008742 awarded by the U.S. Department of Energy, and ACI1053575 awarded by the National Science Foundation. The government has certain rights in the invention. --

Signed and Sealed this
Second Day of December, 2025

John A. Squires
*Director of the United States Patent and Trademark Office*